United States Patent
Hsieh et al.

(10) Patent No.: US 10,422,931 B2
(45) Date of Patent: Sep. 24, 2019

(54) IMAGE CAPTURING LENS ASSEMBLY, IMAGING APPARATUS AND ELECTRONIC DEVICE

(71) Applicant: LARGAN PRECISION CO., LTD., Taichung (TW)

(72) Inventors: Tung-Yi Hsieh, Taichung (TW); Shu-Yun Yang, Taichung (TW); Yu-Tai Tseng, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 85 days.

(21) Appl. No.: 15/869,233

(22) Filed: Jan. 12, 2018

(65) Prior Publication Data

US 2018/0275320 A1 Sep. 27, 2018

Related U.S. Application Data

(60) Provisional application No. 62/475,917, filed on Mar. 24, 2017.

(51) Int. Cl.
| | |
|---|---|
| *G02B 3/14* | (2006.01) |
| *G02B 13/18* | (2006.01) |
| *G02B 15/00* | (2006.01) |
| *G02F 1/29* | (2006.01) |
| *G02B 13/00* | (2006.01) |

(52) U.S. Cl.
CPC ............. *G02B 3/14* (2013.01); *G02B 13/004* (2013.01); *G02B 13/0035* (2013.01); *G02B 13/0045* (2013.01); *G02B 13/18* (2013.01); *G02B 15/00* (2013.01); *G02F 1/29* (2013.01); *G02F 2001/294* (2013.01)

(58) Field of Classification Search
CPC .......... G02B 3/14; G02B 13/18; G02B 15/00; G02F 1/29
See application file for complete search history.

(56) References Cited

U.S. PATENT DOCUMENTS

| | | |
|---|---|---|
| 7,777,972 B1 | 8/2010 | Chen et al. |
| 8,369,029 B2 | 2/2013 | Tang et al. |
| 8,817,391 B2 | 8/2014 | Chen |
| 9,140,877 B2 | 9/2015 | Tsai et al. |
| 2002/0181126 A1 | 12/2002 | Nishioka |
| 2012/0262806 A1 | 10/2012 | Huang |
| 2017/0054883 A1 | 2/2017 | Sharma et al. |

*Primary Examiner* — Jack Dinh
(74) *Attorney, Agent, or Firm* — McClure, Qualey & Rodack, LLP

(57) ABSTRACT

An image capturing lens assembly includes a focus tunable component and an imaging lens system. The imaging lens system includes a plurality of lens elements, wherein each of the lens elements has an object-side surface facing towards an object side of the imaging lens system and an image-side surface facing towards an image side of the imaging lens system, and at least one surface of at least one of the lens elements includes at least one inflection point.

30 Claims, 36 Drawing Sheets

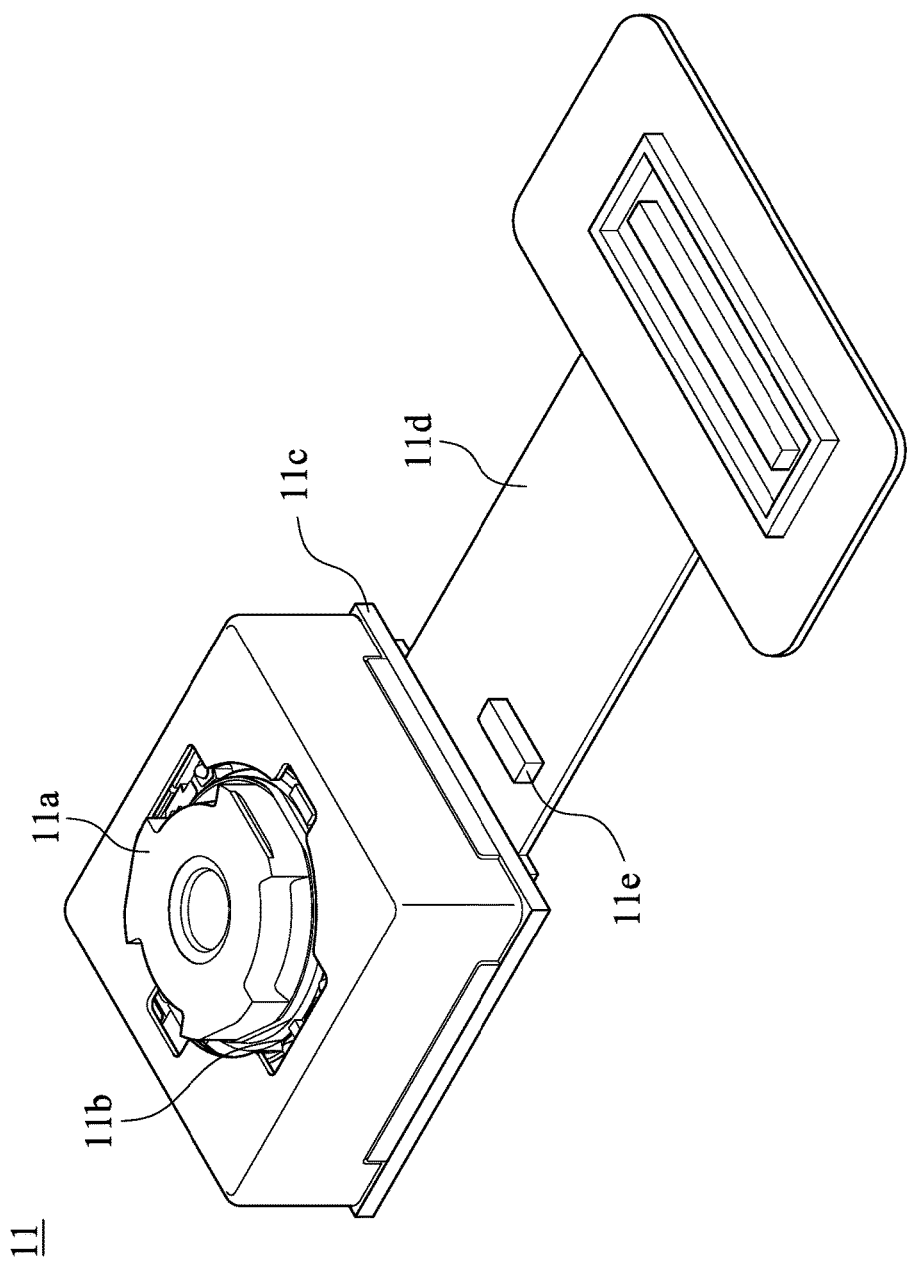

IMAGE CAPTURING LENS ASSEMBLY, IMAGING APPARATUS AND ELECTRONIC DEVICE

RELATED APPLICATIONS

This application claims priority to U.S. Provisional Application Ser. No. 62/475,917, filed Mar. 24, 2017, which is herein incorporated by reference.

BACKGROUND

Technical Field

The present disclosure relates to an image capturing lens assembly and an imaging apparatus. More particularly, the present disclosure relates to an image capturing lens assembly and an imaging apparatus with compactness applicable to electronic devices.

Description of Related Art

With the wider application of photographing modules, specifications of lens assemblies in response to market demands are becoming diverse and strict. The size of products is hard to reduce due to the restrictions of shapes and materials of lens elements in conventional photographing modules, and it is also hard to keep a balance among molding of lens elements, assembling convenience and system sensitivity. Moreover, a lens assembly with auto-focus ability can adjust the focal length thereof depending on the imaged object location, and therefore obtain clear image on an image surface as well as increase resolution of the image and optimize the image quality. Hence, one lens assembly featuring compactness, easily assembling property and high image quality will fully satisfy market specifications and demands. The lens assembly can be applied to various kinds of electronic devices, such as intelligent electronic devices, multiple lens devices, wearable devices, digital cameras, image recognition systems, entertainment systems, mobile devices, sporting cameras and intelligent home assisting systems.

SUMMARY

According to one aspect of the present disclosure, an image capturing lens assembly includes a focus tunable component and an imaging lens system. The imaging lens system includes a plurality of lens elements, wherein each of the lens elements has an object-side surface facing towards an object side of the imaging lens system and an image-side surface facing towards an image side of the imaging lens system, and at least one surface of at least one of the lens elements includes at least one inflection point. When a focal length of the image capturing lens assembly is f, an f-number of the image capturing lens assembly is Fno, a focal length of the focus tunable component is ft, a variation of a refractive power of the focus tunable component is $|\Delta(f/ft)|$, and a focal length of the imaging lens system is fi, the following conditions are satisfied:

$$|fi| < |ft|;$$

$$0 < |\Delta(f/ft)| < 0.18; \text{ and}$$

$$1.20 < Fno < 2.60.$$

According to another aspect of the present disclosure, an imaging apparatus includes the image capturing lens assembly of the aforementioned aspect, and an image sensor, wherein the image sensor is disposed on an image surface of the image capturing lens assembly.

According to still another aspect of the present disclosure, an electronic device includes the imaging apparatus of the aforementioned aspect.

BRIEF DESCRIPTION OF THE DRAWINGS

The present disclosure can be more fully understood by reading the following detailed description of the embodiment, with reference made to the accompanying drawings as follows:

FIG. 21D is a system schematic view of an imaging apparatus of FIG. 21A;

DETAILED DESCRIPTION

Figure 1:
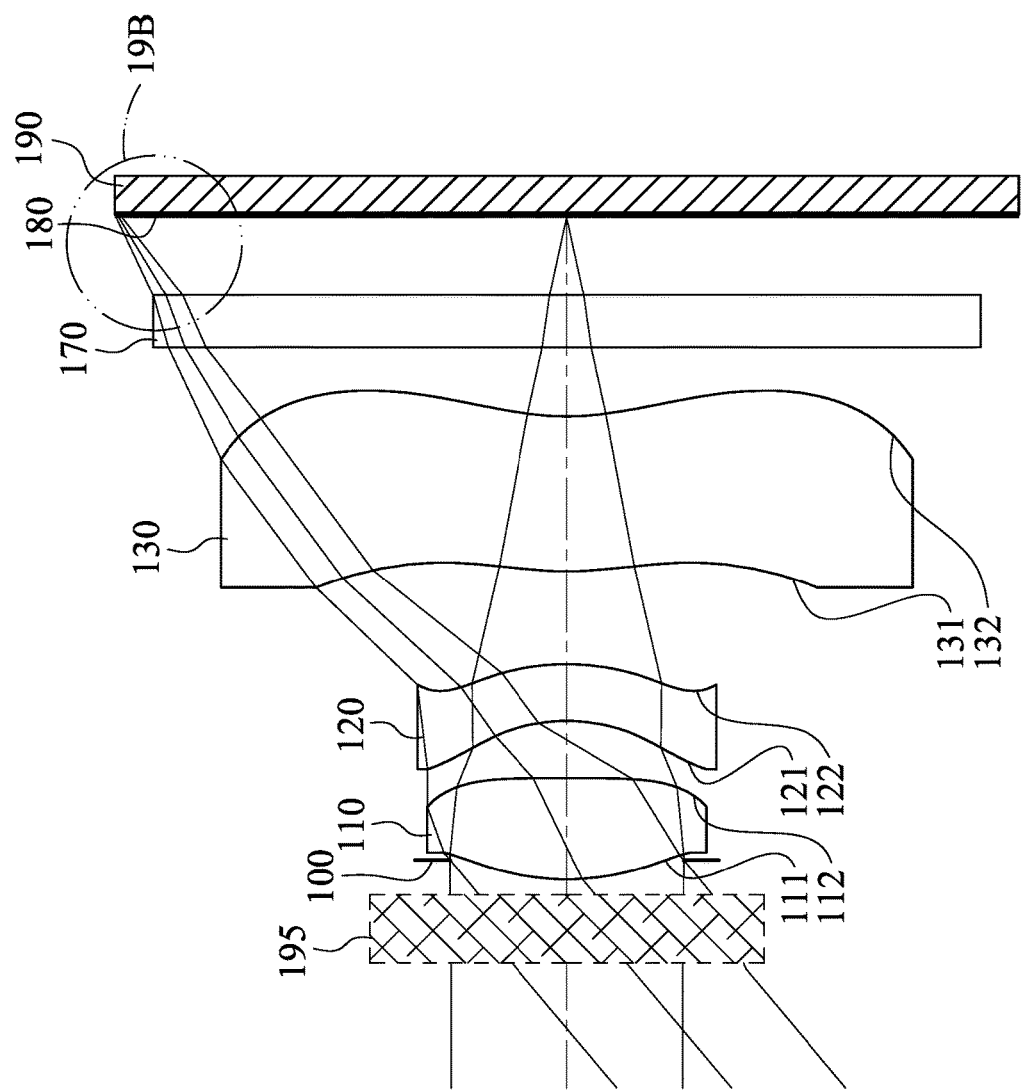
FIG. 1 is a schematic view of an imaging apparatus according to the 1st embodiment of the present disclosure.

An image capturing lens assembly includes a focus tunable component and an imaging lens system, wherein the imaging lens system includes a plurality of lens elements, wherein each of the lens elements has an object-side surface facing towards an object side of the imaging lens system and an image-side surface facing towards an image side of the imaging lens system. To Therefore, the compactness and short-distance auto-focus ability can be obtained by the arrangement of the focus tunable component.

At least one surface of at least one of the lens elements includes at least one inflection point. Therefore, the number of the lens elements in the image capturing lens assembly can be reduced by arranging the lens surface with inflection point, so that the image quality of the off-axis image can be maintained and the total track length thereof can be reduced so as to obtain the compactness.

When a focal length of the focus tunable component is ft, and a focal length of the imaging lens system is fi, the following condition is satisfied: $|fi|<|ft|$. Therefore, it is favorable for reducing the sensitivity of the image capturing lens assembly and obtaining the effects of auto-focus and compactness by adjusting the focal length of the focus tunable component and the focal length of the imaging lens system so as to apply to wider electronic devices.

When a focal length of the image capturing lens assembly is f, the focal length of the focus tunable component is ft, and a variation of a refractive power of the focus tunable component is $|\Delta(f/ft)|$, the following condition is satisfied: $0<|\Delta(f/ft)|<0.18$. Therefore, the focal length of the focus tunable component can be adjusted under different situations, and then the variation of the refractive power of the focus tunable component can be further controlled, so as to obtain the function of auto-focus, thus, it is favorable for obtaining the effect of optical focusing with compactness, so as to obtain clear image on an image surface as well as enhance image quality. Preferably, the following condition can be satisfied: $0<|\Delta(f/ft)|<0.10$. More preferably, the following condition can be satisfied: $0<|\Delta(f/ft)|<0.05$. Further, the following condition can be satisfied: $0<|\Delta(f/ft)|<0.02$.

When an f-number of the image capturing lens assembly is Fno, the following condition is satisfied: $1.20<Fno<2.60$. Therefore, the illuminance of the image surface can be enhanced by controlling the amount of incident light, thus it is favorable for the imaging apparatus including the image capturing lens assembly to obtain sufficient information under situations such as insufficient external light source (i.e. nighttime), or under short exposure time (i.e. dynamic photographing) etc., so that an electronic device including the imaging apparatus can obtain the image with certain quality after calculate by the processor so as to increase the using opportunity thereof. Preferably, the following condition can be satisfied: $1.30<Fno<2.0$.

The focus tunable component is located on the object side of the imaging lens system. Therefore, it is favorable for increasing flexibility of design and obtaining the effects of compactness and auto-focus.

When the focal length of the focus tunable component is ft, and the focal length of the imaging lens system is fi, the following condition is satisfied: $|fi/ft|<0.10$. Therefore, it is favorable for reducing the sensitivity of the image capturing lens assembly and obtaining the effects of auto-focus and compactness by adjusting the focal length of the focus tunable component and the focal length of the imaging lens system, respectively, so as to apply to wider electronic devices. Preferably, the following condition can be satisfied: $|fi/ft|<0.05$. More preferably, the following condition can be satisfied: $|fi/ft|<0.03$.

When a curvature radius of the object-side surface of a lens element closest to the object side of the imaging lens system is R1, and a curvature radius of the image-side surface of the lens element closest to the object side of the imaging lens system is R2, the following condition is satisfied: $-3.0<(R1+R2)/(R1-R2)<0$. Therefore, it is favorable for forming a configuration of compact structure, reducing the total track length of the image capturing lens assembly, and receiving incident light with large field of view as well as reducing the sensitivity thereof by controlling the surface shape of the lens element closest to the object side of the imaging lens system.

When the image capturing lens assembly further includes an aperture stop located between the focus tunable component and the imaging lens system, wherein when an axial distance between the aperture stop and a surface of the focus tunable component closest to an object side of the image capturing lens assembly is Dstf, and an axial distance between the aperture stop and a surface of the focus tunable component which is closest to an image surface of the image capturing lens assembly is Dstr, the following condition is satisfied: |Dstr/Dstf|<0.90. Therefore, the relative position of the aperture stop and the focus tunable component can be controlled, so that the image receiving efficiency of an image sensor can be increased effectively and the sufficient viewing angle can be maintained.

When an axial distance between the focus tunable component and the lens element of the imaging lens system closest to the object side thereof is Dt1, and a central thickness of the focus tunable component is CTt, the following condition is satisfied: 0.05<Dt1/CTt<1.0. Therefore, it is favorable for controlling the manufacturing yield rate of the focus tunable component and reducing the total track length of the image capturing lens assembly by adjusting the thickness of the focus tunable component and the distance between the focus tunable component and the imaging lens system.

When an axial distance between a surface of the image capturing lens assembly closest to an object side thereof and the image surface is TL, and a half of a maximum field of view of the image capturing lens assembly is HFOV, the following condition is satisfied: TL/tan(HFOV)<6.50 mm. Therefore, the total track length and viewing angle of the image capturing lens assembly can be controlled, and the characteristics of compactness and sufficient viewing angle can be maintained, so as to further apply to various devices. Preferably, the following condition can be satisfied: 2.0 mm<TL/tan(HFOV)<6.0 mm.

When the focal length of the image capturing lens assembly is f, a vertical distance between at least one non-axial critical point on at least one surface of a lens element of the imaging lens system closest to the image surface and the optical axis is Ycx, wherein x=1 or 2; in detail, a vertical distance between at least one non-axial critical point on the object-side surface of the lens element of the imaging lens system closest to the image surface and the optical axis is Yc1, and a vertical distance between at least one non-axial critical point on the image-side surface of the lens element of the imaging lens system closest to the image surface and the optical axis is Yc2, the following condition is satisfied: 0.01<Yc1/f<1.50 or 0.01<Yc2/f<1.50. Therefore, the shape variation of surfaces of the lens element closest to the image surface can be adjusted, so that it is favorable for receiving the off-axis light to avoid the stray light caused by the excessive incident angle of light, and also favorable for reducing incident angle of light from off-axis field onto the image surface so as to maintain imaging illuminance and further optimize image quality.

When the focal length of the image capturing lens assembly is f, and the focal length of the focus tunable component is ft, the following condition is satisfied: |f/ft|<0.03. Therefore, the refractive power of the focus tunable component can be controlled, thus it is favorable for obtaining auto-focus effect without affecting the sensitivity of the image capturing lens assembly and the need to add excessive mechanical components.

When the axial distance between the surface of the image capturing lens assembly closest to the object side thereof and the image surface is TL, the focal length of the focus tunable component is ft, and a variation of the focal length of the focus tunable component is |Δft|, the following condition is satisfied: TL/|Δft|<2.0. Therefore, it is favorable for obtaining both compactness and auto-focus ability by adjusting the ratio between the total track length of the image capturing lens assembly and the variation of the focal length of the focus tunable component.

When the central thickness of the focus tunable component is CTt, and an axial distance between the surface of the lens element of the imaging lens system closest to the object side thereof and the surface of the lens element of the imaging lens system closest to the image surface thereof is TDi, the following condition is satisfied: 0.01<CTt/TDi<0.45. Therefore, the ratio between thicknesses of the focus tunable component and the imaging lens system can be controlled so as to obtain a balance between the space usage and the image quality, and also increase the assembling yield rate.

When an axial distance between an imaged object and the image capturing lens assembly is Obj., the following condition is satisfied: 200 mm<Obj.<1800 mm. Therefore, it is favorable for capturing clear image under short-distance and thus maintaining the sharpness of the captured image by adjusting the distance between the imaged object and the image capturing lens assembly.

When the axial distance between the surface of the image capturing lens assembly closest to the object side thereof and the image surface is TL, and a maximum image height of the image capturing lens assembly is ImgH, the following condition is satisfied: 0.50<TL/ImgH<2.0. Therefore, it is favorable for enlarging the imaging range and reducing the total track length of the image capturing lens assembly by adjusting the specification thereof.

When half of the maximum field of view of the image capturing lens assembly is HFOV, the following condition is satisfied: 0.60<tan(HFOV)<1.80. Therefore, the characteristic of compactness and sufficient viewing angle can be satisfied by effectively controlling the field of view of the image capturing lens assembly so as to apply to various compact electronic devices. Preferably, the following condition can be satisfied: 0.75<tan(HFOV)<1.40.

When an axial distance between the image-side surface of the lens element of the image capturing lens assembly closest to the image surface and the image surface is BL, and the focal length of the image capturing lens assembly is f, the following condition is satisfied: 0.10<BL/f<0.50. Therefore, it is favorable for forming a compact structure and obtaining sufficient viewing angle by controlling the ratio between the focal length and the back focal length of the image capturing lens assembly.

When the focal length of the image capturing lens assembly is f, and a focal length of the lens element of the imaging lens system closest to the object side thereof is f1, the following condition is satisfied: 0.50<f/f1<3.50. Therefore, the refractive power of the lens element of the imaging lens system closest to the object side thereof is proper for the light to enter the imaging lens system and reducing the size thereof.

When an angle between a chief ray at a maximum image height position on the image surface of the image capturing lens assembly and a normal direction of the image surface in a paraxial region thereof is CRA, the following condition is satisfied: 30 degrees<CRA. Therefore, the incident angle of the chief ray at the maximum image height position on the image surface can be controlled so as to reduce the back focal length of the image capturing lens assembly as well as obtain the compactness. Preferably, the following condition can be satisfied: 30 degrees<CRA<45 degrees.

When an optical distortion at the maximum image height position of the image capturing lens assembly is DIST, the following condition is satisfied: |DIST|<5%. Therefore, the optical distortion of the image capturing lens assembly can be controlled so as to avoid deformation or distortion on the peripheral region of the image as well as optimize the image quality. Preferably, the following condition can be satisfied: |DIST|<2.5%.

When a vertical distance between a point at the maximum image height position on the image surface of the image capturing lens assembly in which the chief ray is incident and the optical axis is CRH, and a vertical distance between a point at the maximum image height position on the image surface of the image capturing lens assembly in which a marginal ray on a meridional plane is incident and the optical axis is MRH, the following condition is satisfied: |(CRH−MRH)×10|<2.0 mm. Therefore, the position of the chief ray and the marginal ray at the maximum image height position on the image surface can be controlled so as to avoid light divergence and enhance the image sharpness. Preferably, the following condition can be satisfied: |(CRH−MRH)×10|<1.50 mm.

When the angle between a chief ray at a maximum image height position on the image surface of the image capturing lens assembly and the normal direction of the image surface in the paraxial region thereof is CRA, and an angle between the marginal ray on the meridional plane at the maximum image height position of the image capturing lens assembly and the normal direction of the image surface in the paraxial region thereof is MRA, the following condition is satisfied: 0.01<|(CRA−MRA)/CRA|<0.80. Therefore, the incident angle of the chief ray and the marginal ray at the maximum image height position on the image surface can be controlled, so as to balance the image illuminance, image quality and compactness. Preferably, the following condition can be satisfied: 0.05<|(CRA−MRA)/CRA|<0.60.

At least one of the lens elements of the imaging lens system has an Abbe number smaller than 22.0. Therefore, chromatic aberration of the imaging lens system can be corrected by controlling the arrangement of the lens materials, so as to avoid the image overlap as well as enhance the image quality.

When a maximum value among all refractive indices of the lens elements of the imaging lens system is Nmax, the following condition is satisfied: Nmax<1.70. Therefore, it is favorable for reducing the manufacturing costs and achieving the compactness by properly arranging the material of each lens element.

The object-side surface of the lens element of the imaging lens system closest to the object side thereof is convex, and the image-side surface of the lens element of the imaging lens system closest to the image surface is concave. Therefore, it is favorable for forming the compact structure and effectively controlling the total track length thereof as well as maintaining the image quality by arranging the surface shapes of the specific lens element.

When a number of the lens elements of the imaging lens system is N, the following condition is satisfied: $2 \leq N \leq 7$. Therefore, it is favorable for balancing the compactness and the image quality and increasing flexibility of design by controlling the number of lens elements in the imaging lens system, such as increasing or decreasing the lens elements on demand.

The focus tunable component can be a liquid lens set or a liquid crystal lens set. Therefore, the characteristics of compactness and short-distance auto-focus ability can be obtained by the arrangement of the liquid lens set or the liquid crystal lens set and optionally with external controlling unit (such as circuit, pressure etc.).

The image capturing lens assembly can further include a mechanical member for controlling a range of light passing through the image capturing lens assembly. Therefore, it is favorable for controlling the imaging illuminance and maintaining good image quality by adjusting the amount of incident light.

Each of the aforementioned features of the image capturing lens assembly can be utilized in various combinations for achieving the corresponding effects.

According to the image capturing lens assembly of the present disclosure, the lens elements thereof can be made of glass or plastic materials. When the lens elements are made of glass materials, the distribution of the refractive power of the image capturing lens assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the image capturing lens assembly. Therefore, the total track length of the image capturing lens assembly can also be reduced.

According to the image capturing lens assembly of the present disclosure, each of an object-side surface and an image-side surface has a paraxial region and an off-axis region. The paraxial region refers to the region of the surface where light rays travel close to an optical axis, and the off-axis region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the image capturing lens assembly of the present disclosure, the refractive power or the focal length of a lens element being positive or negative may refer to the refractive power or the focal length in a paraxial region of the lens element.

According to the image capturing lens assembly of the present disclosure, the image capturing lens assembly can include at least one stop, such as an aperture stop, a glare stop or a field stop. Said glare stop or said field stop is for eliminating the stray light and thereby improving the image resolution thereof.

According to the image capturing lens assembly of the present disclosure, the image surface of the image capturing lens assembly, based on the corresponding image sensor, can be flat or curved. In particular, the image surface can be a concave curved surface facing towards the object side. According to the image capturing lens assembly of the present disclosure, at least one image correcting element (such as a field flattener) can be selectively disposed between the lens element closest to the image side of the optical image capturing assembly and the image surface so as to correct the image (such as the field curvature). Properties of the image correcting element, such as curvature, thickness, refractive index, position, surface shape (convex/concave, spherical/aspheric/diffractive/Fresnel etc.) can be adjusted according to the requirements of the imaging apparatus. In general, the image correcting element is preferably a thin plano-concave element having a concave surface toward the object side and is disposed close to the image surface.

According to the image capturing lens assembly of the present disclosure, an aperture stop can be configured as a front stop or a middle stop. A front stop disposed between an object and the first lens element can provide a longer distance between an exit pupil of the image capturing lens assembly and the image surface, and thereby obtains a telecentric effect and improves the image-sensing efficiency of the image sensor, such as CCD or CMOS. A middle stop disposed between the first lens element and the image surface is favorable for enlarging the field of view of the image capturing lens assembly and thereby provides a wider field of view for the same.

According to the image capturing lens assembly of the present disclosure, a critical point is a non-axial point of the lens surface where its tangent is perpendicular to the optical axis, wherein a convex critical point is a critical point located on a convex shape of the lens surface, and the shape of the critical point (convex or concave) is determined by the positive or negative sign of the curvature at the critical point; and an inflection point is a point of the lens surface where the lens surface changes from positive curvature to negative curvature or from negative curvature to positive curvature.

According to the image capturing lens assembly of the present disclosure, the image capturing lens assembly can be applied to 3D (three-dimensional) image capturing applications, in products such as digital cameras, mobile devices, digital tablets, smart TVs, surveillance systems, motion sensing input devices, driving recording systems, rearview camera systems, wearable devices, and aerial cameras.

According to the present disclosure, an imaging apparatus is provided. The imaging apparatus includes the aforementioned image capturing lens assembly and an image sensor, wherein the image sensor is disposed on the image side of the aforementioned image capturing lens assembly, that is, the image sensor can be disposed on or near the image surface of the aforementioned image capturing lens assembly. By the proper configuration of the optical elements and mechanical elements, it is favorable for obtaining the characteristics of compactness, assembling convenience, high responding speed and fine image quality so as to apply to widen products. Preferably, the imaging apparatus can further include a barrel member, a holder member or a combination thereof.

According to the present disclosure, an electronic device is provided, which includes the aforementioned imaging apparatus. Preferably, the electronic device can further include but not limited to a control unit, a display, a storage unit, a random access memory unit (RAM) or a combination thereof.

According to the above description of the present disclosure, the following 1st-12th specific embodiments are provided for further explanation.

1st Embodiment

Figure 2A:
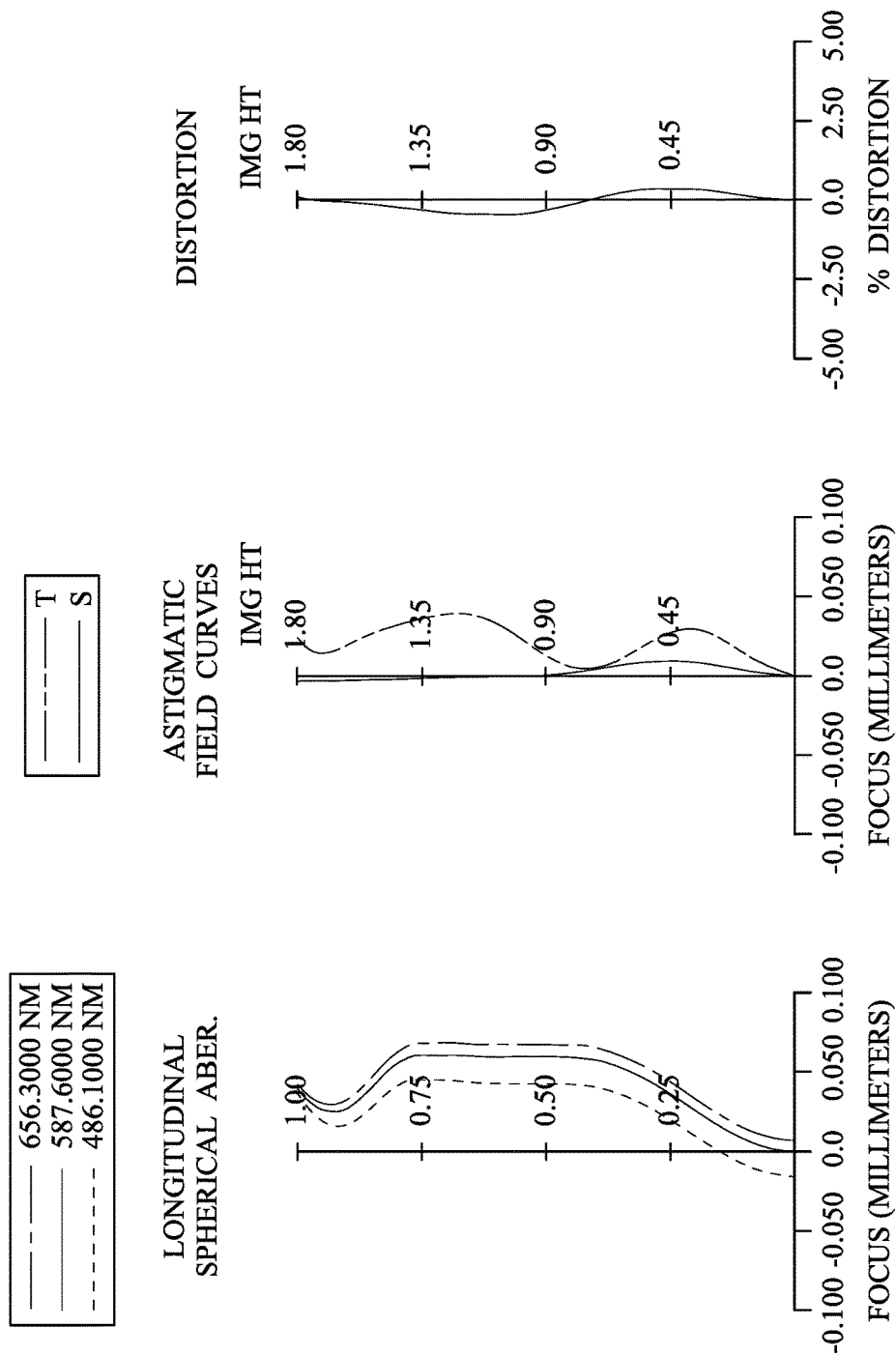
FIG. 2A shows spherical aberration curves, astigmatic field curves and a distortion curve of Mode 1 of the imaging apparatus according to the 1st embodiment.
Figure 2B:
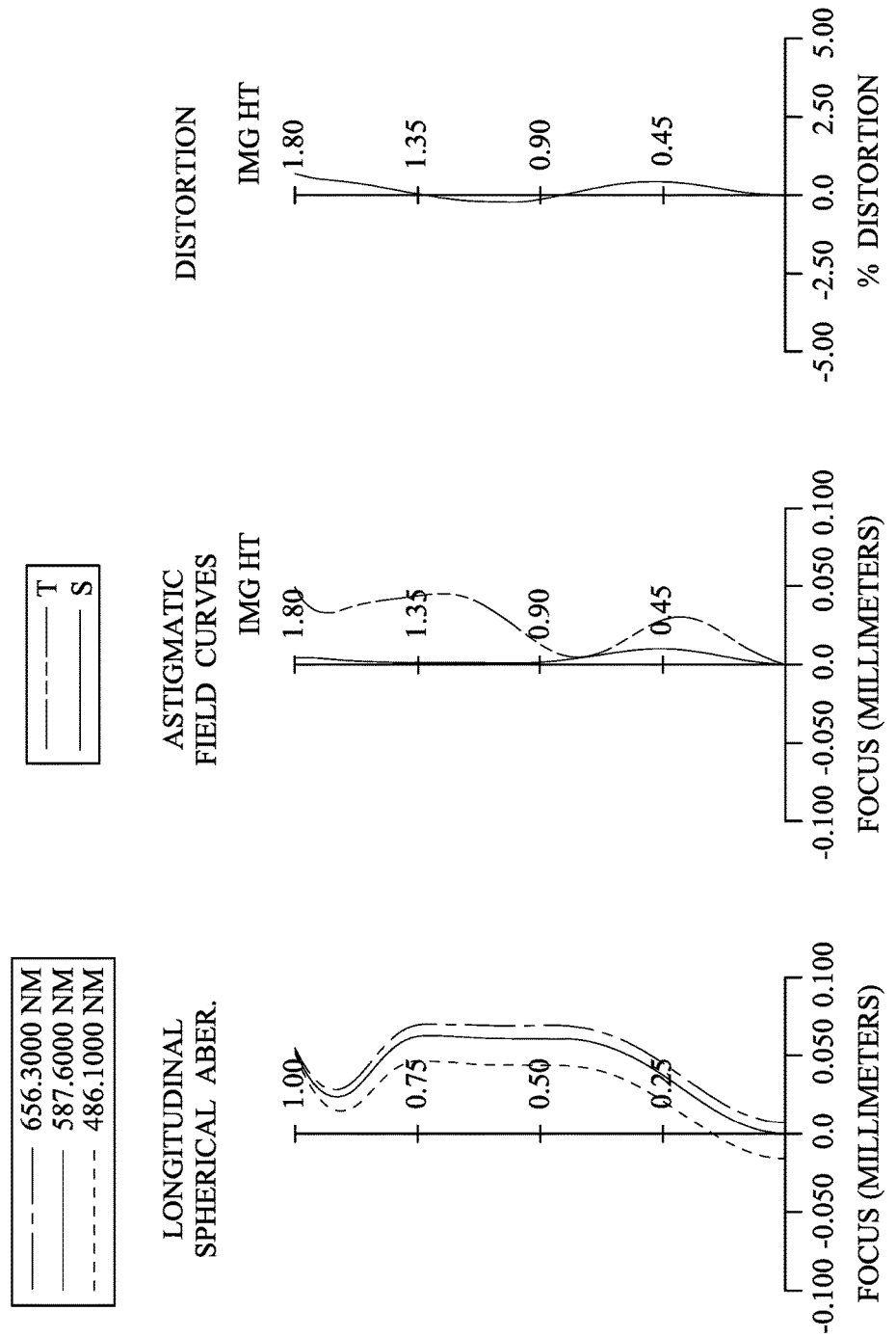
FIG. 2B shows spherical aberration curves, astigmatic field curves and a distortion curve of Mode 2 of the imaging apparatus according to the 1st embodiment.

FIG. 1 is a schematic view of an imaging apparatus according to the 1st embodiment of the present disclosure. FIG. 2A shows spherical aberration curves, astigmatic field curves and a distortion curve of Mode 1 of the imaging apparatus according to the 1st embodiment, and FIG. 2B shows spherical aberration curves, astigmatic field curves and a distortion curve of Mode 2 of the imaging apparatus according to the 1st embodiment, wherein Mode 1 and Mode 2 are two modes of the imaging apparatus at two different focusing conditions, and the detailed conditions are shown in Table 1C below. In FIG. 1, the imaging apparatus includes an image capturing lens assembly (its reference numeral is omitted) and an image sensor 190. The image capturing lens assembly includes, in order from an object side to an image side, a focus tunable component 195, an aperture stop 100, a first lens element 110, a second lens element 120, a third lens element 130, a filter 170 and an image surface 180, and the image sensor 190 is disposed on the image surface 180 of the image capturing lens assembly, wherein the image capturing lens assembly includes the focus tunable component 195 and an imaging lens system (its reference numeral is omitted), and the imaging lens system includes the three lens elements (110, 120, 130) without additional one or more lens elements inserted between the first lens element 110 and the third lens element 130. The focus tunable component 195 is disposed on an object side of the imaging lens system.

The first lens element 110 with positive refractive power has an object-side surface 111 being convex and an image-side surface 112 being convex. The first lens element 110 is made of a plastic material, and has the object-side surface 111 and the image-side surface 112 being both aspheric.

The second lens element 120 with negative refractive power has an object-side surface 121 being concave and an image-side surface 122 being convex. The second lens element 120 is made of a plastic material, and has the object-side surface 121 and the image-side surface 122 being both aspheric.

The third lens element 130 with negative refractive power has an object-side surface 131 being convex and an image-side surface 132 being concave. The third lens element 130 is made of a plastic material, and has the object-side surface 131 and the image-side surface 132 being both aspheric. Furthermore, each of the object-side surface 131 and the image-side surface 132 of the third lens element 130 includes at least one inflection point, and each of the object-side surface 131 and the image-side surface 132 of the third lens element 130 includes at least one critical point CP31, CP32 (shown in FIG. 20).

The filter 170 is made of a glass material and located between the third lens element 130 and the image surface 180, and will not affect the focal length of the image capturing lens assembly.

Figure 17A:
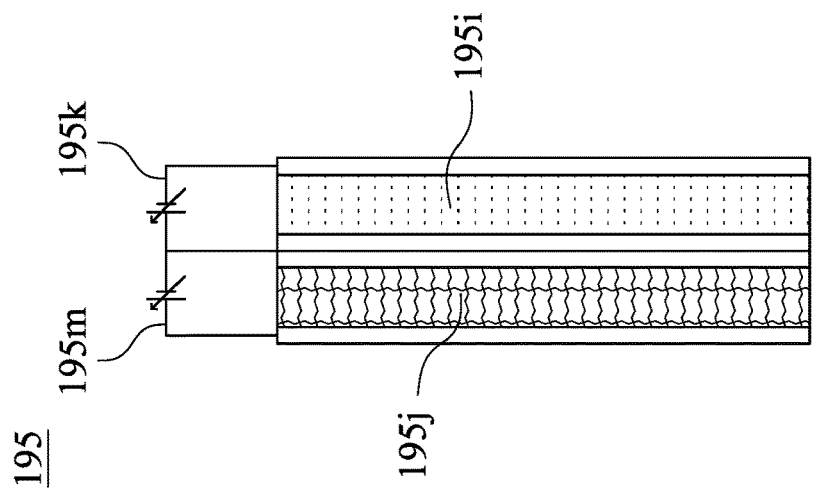
FIG. 17A is a schematic view of the focus tunable component being a liquid lens set according to the 1st embodiment.
Figure 17B:
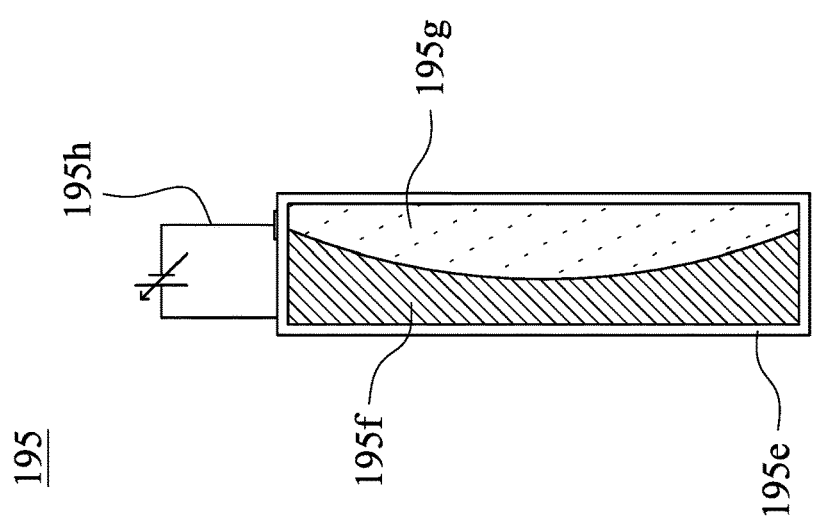
FIG. 17B is a schematic view of the focus tunable component being another liquid lens set according to the 1st embodiment.
Figure 17C:
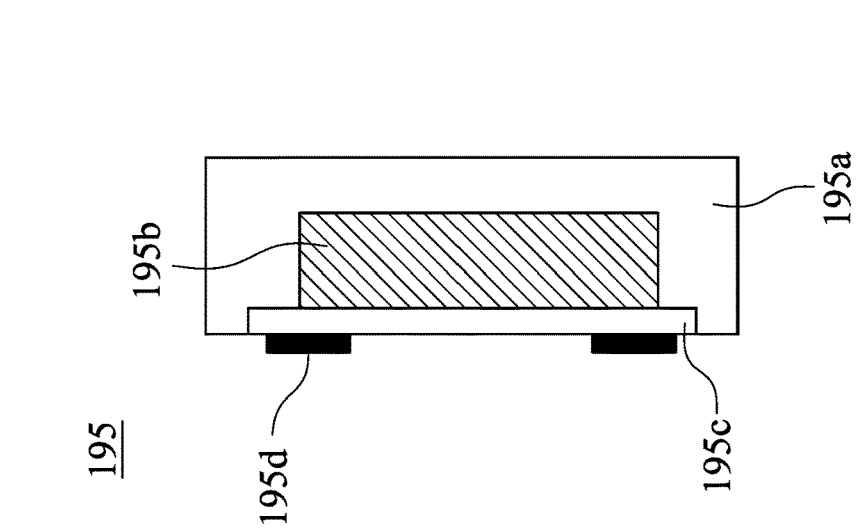
FIG. 17C is a schematic view of the focus tunable component being a liquid crystal lens set according to the 1st embodiment.

Furthermore, according to the 1st embodiment, the focus tunable component 195 can be a liquid lens set, a liquid crystal lens set or other optical element set which can change the focal length of the image capturing lens assembly by external controlling unit (such as circuit, pressure etc.). In detail, FIG. 17A is a schematic view of the focus tunable component 195 being a liquid lens set according to the 1st embodiment, FIG. 17B is a schematic view of the focus tunable component 195 being another liquid lens set according to the 1st embodiment, and FIG. 17C is a schematic view of the focus tunable component 195 being a liquid crystal lens set according to the 1st embodiment. In FIG. 17A, the focus tunable component 195 is a liquid lens set, which include a glass substrate 195a, a liquid material 195b, a flexible membrane 195c and a piezoelectric material 195d, wherein the glass substrate 195a is filled with the liquid material 195b, one side of the flexible membrane 195c is connected to the glass substrate 195a and the liquid material 195b, the other side of the flexible membrane 195c is connected to the piezoelectric material 195d. When the external pressure is exerted on the piezoelectric material 195d, the focal length of the focus tunable component 195 can be changed so as to adjust the focal length of the image capturing lens assembly. In FIG. 17B, the focus tunable component 195 is another liquid lens set, which include a glass substrate 195e, a first liquid material 195f, a second liquid material 195g and a controlling circuit 195h, wherein the glass substrate 195e is filled with the first liquid material 195f and the second liquid material 195g from the object side to the image side, and the controlling circuit 195h is connected to the glass substrate 195e which is for providing the voltage to change the focal length of the focus tunable component 195. In FIG. 17C, the focus tunable component 195 is a liquid crystal lens set, which includes two liquid crystal lens elements 195i, 195j and two controlling circuit 195k, 195m, wherein each of the liquid crystal lens elements 195i, 195j includes a glass substrate (its reference numeral is omitted) and a liquid crystal material (its reference numeral is omitted) filled therein, the two liquid crystal lens elements 195i, 195j are connected to each other, and are connected to the two controlling circuit 195k, 195m, respectively. The focal length of the focus tunable component 195 can be adjusted by exerting the voltage for changing the focal length of the liquid crystal lens elements 195i, 195j. Moreover, the detailed optical data and parameters of the focus tunable component 195 are disclosed in the following 7th and 8th embodiments.

The equation of the aspheric surface profiles of the aforementioned lens elements of the 1st embodiment is expressed as follows:

$$X(Y) = (Y^2/R)/\left(1 + sqrt\left(1 - (1+k) \times (Y/R)^2\right)\right) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

The detailed optical data of the 1st embodiment are shown in Table 1A and the aspheric surface data are shown in Table 1B below.

TABLE 1A

1st Embodiment

| Surface # | | Curvature Radius | | Thickness | Material | Index | Abbe # | Focal Length |
|---|---|---|---|---|---|---|---|---|
| 0 | Object | Plano | | Obj. | | | | |
| 1 | Ape. Stop | Plano | | −0.078 | | | | |
| 2 | Lens 1 | 0.969 | ASP | 0.406 | Plastic | 1.544 | 55.9 | 1.77 |
| 3 | | −167.316 | ASP | 0.229 | | | | |
| 4 | Lens 2 | −0.780 | ASP | 0.227 | Plastic | 1.639 | 23.5 | −6.60 |
| 5 | | −1.066 | ASP | 0.374 | | | | |
| 6 | Lens 3 | 1.396 | ASP | 0.620 | Plastic | 1.544 | 55.9 | −37.61 |
| 7 | | 1.102 | ASP | 0.276 | | | | |
| 8 | Filter | Plano | | 0.210 | Glass | 1.517 | 64.2 | — |
| 9 | | Plano | | Imd. | | | | |
| 10 | Image | Plano | | — | | | | |

Reference wavelength is 587.6 nm.

TABLE 1B

Aspheric Coefficients

| Surface # | 2 | 3 | 4 |
|---|---|---|---|
| k = | −9.1028E+00 | 9.0000E+01 | 8.8878E−02 |
| A4 = | 8.3392E−01 | −6.0359E−01 | −1.1915E+00 |
| A6 = | 1.9691E−01 | −1.5656E+00 | 2.6178E+00 |
| A8 = | −2.1077E+01 | −7.0711E+00 | 1.5845E+01 |
| A10 = | 4.2214E+01 | 5.1671E+01 | 7.7122E+01 |

TABLE 1B-continued

Aspheric Coefficients

| A12 = | 2.0540E+02 | −9.4328E+01 | −5.7258E+02 |
|---|---|---|---|
| A14 = | −7.9441E+02 | −1.9406E+01 | 8.1201E+02 |

| Surface # | 5 | 6 | 7 |
|---|---|---|---|
| k = | −6.2330E+00 | −1.9346E+01 | −6.5948E+00 |
| A4 = | −1.6556E+00 | −6.2824E−01 | −3.7701E−01 |
| A6 = | 5.6157E+00 | 8.5107E−01 | 3.8514E−01 |
| A8 = | 2.9542E+00 | −1.0146E+00 | −3.0104E−01 |
| A10 = | −5.4672E+01 | 1.3831E+00 | 1.3138E−01 |
| A12 = | 4.2460E+02 | −1.5704E+00 | −2.2044E−02 |
| A14 = | −1.2395E+03 | 9.8206E−01 | −4.7008E−03 |
| A16 = | 1.1644E+03 | −2.3734E−01 | 1.5685E−03 |

In Table 1A, the curvature radius, the thickness and the focal length are shown in millimeters (mm). Surface numbers 0-10 represent the surfaces sequentially arranged from the object side to the image side along the optical axis. In Table 1B, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1A and Table 1B of the 1st embodiment. Therefore, an explanation in this regard will not be provided again.

In the image capturing lens assembly according to the 1st embodiment, when an axial distance between the imaged object and the image capturing lens assembly is Obj., a focal length of the focus tunable component 195 is ft, a central thickness of the focus tunable component 195 is CTt, an axial distance between the aperture stop 100 and a surface of the focus tunable component 195 closest to the image surface 180 of the image capturing lens assembly is Dstr, and an axial distance between the filter 170 and the image surface 180 is Imd., the values of the parameters under Mode 1 and Mode 2 are shown in Table 1C below.

TABLE 1C

1st Embodiment

| | Mode 1 | Mode 2 |
|---|---|---|
| Obj. [mm] | 900.000 | 450.000 |
| ft [mm] | −1296.56 | −266.63 |
| CTt [mm] | 0.273 | 0.273 |

TABLE 1C-continued

| | 1st Embodiment | |
|---|---|---|
| | Mode 1 | Mode 2 |
| Dstr [mm] | 0.140 | 0.128 |
| Imd. [mm] | 0.323 | 0.335 |

Figure 19A:
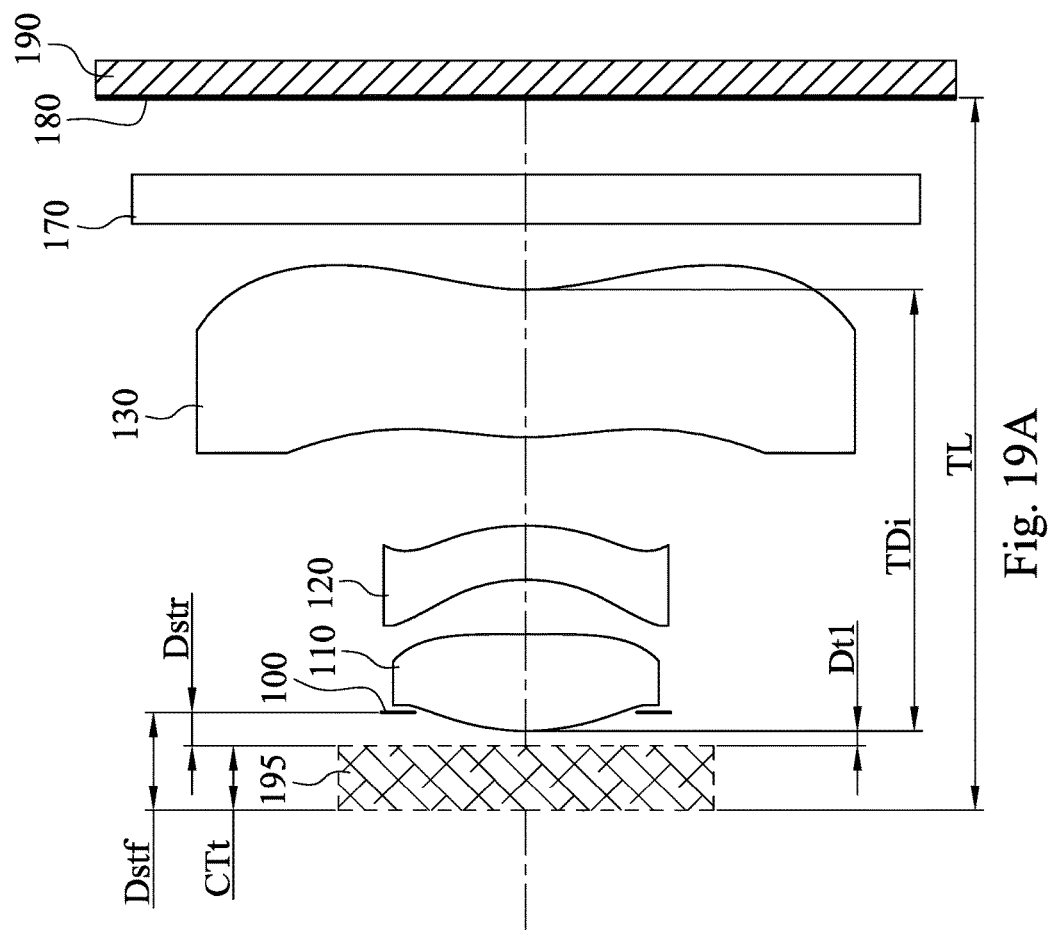
FIG. 19A shows a schematic view of parameters according to the 1st embodiment of FIG. 1.
Figure 19B:
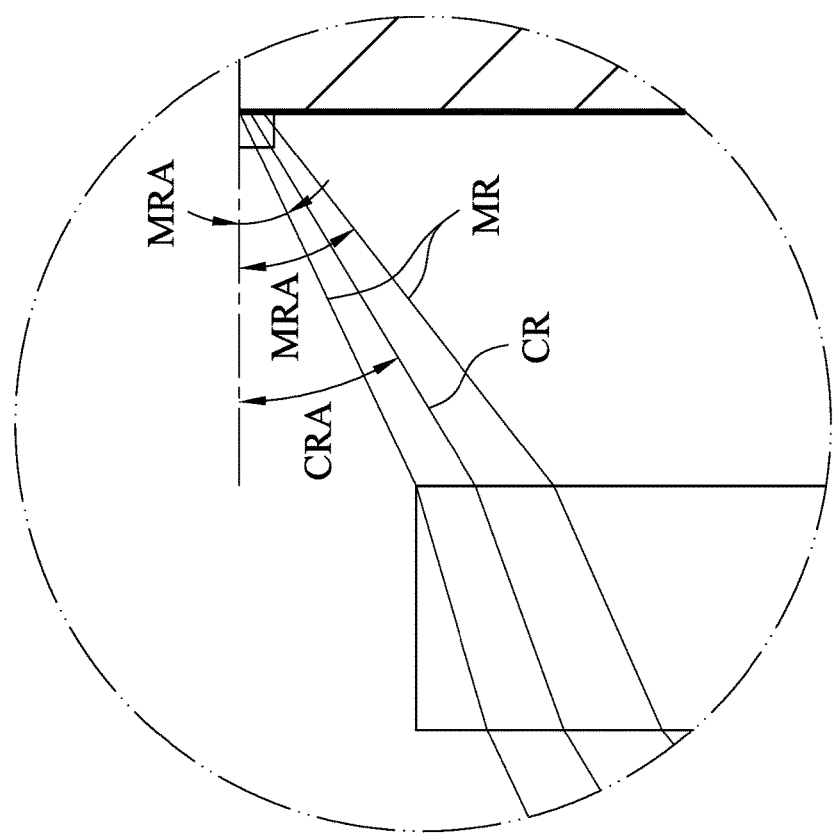
FIG. 19B shows a schematic view of parameters CRA and MRA according to the 1st embodiment of FIG. 1.
Figure 20:
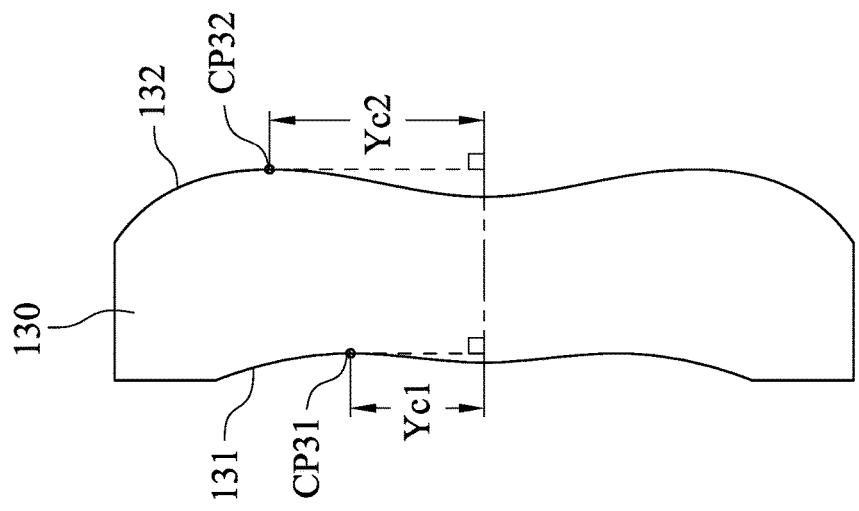
FIG. 20 shows a schematic view of parameters Yc1 and Yc2 according to the 1st embodiment of FIG. 1.

Furthermore, FIG. 19A shows a schematic view of parameters according to the 1st embodiment of FIG. 1, FIG. 19B shows a schematic view of parameters CRA and MRA according to the 1st embodiment of FIG. 1, and FIG. 20 shows a schematic view of parameters Yc1 and Yc2 according to the 1st embodiment of FIG. 1. In the image capturing lens assembly according to the 1st embodiment, a focal length of the image capturing lens assembly is f, an f-number of the image capturing lens assembly is Fno, half of a maximum field of view of the image capturing lens assembly is HFOV, an axial distance between the focus tunable component 195 and a lens element of the imaging lens system closest to the object side (in the 1st embodiment, which is the first lens element 110) is Dt1, an axial distance between the object-side surface of the lens element of the imaging lens system closest to the object side (in the 1st embodiment, which is the object-side surface 111 of the first lens element 110) and the image-side surface of the lens element of the imaging lens system closest to the image surface 180 (in the 1st embodiment, which is the image-side surface 132 of the third lens element 130) is TDi, a curvature radius of the object-side surface of the lens element closest to the object side of the imaging lens system (in the 1st embodiment, which is the curvature radius of the object-side surface 111 of the first lens element 110) is R1, a curvature radius of the image-side surface of the lens element closest to the object side of the imaging lens system (in the 1st embodiment, which is the curvature radius of the image-side surface 112 of the first lens element 110) is R2, a focal length of the imaging lens system is fi, a focal length of the lens element of the imaging lens system closest to the object side thereof (in the 1st embodiment, which is the focal length of the first lens element 110) is f1, an axial distance between a surface of the image capturing lens assembly closest to an object side thereof (in the 1st embodiment, which is the surface of the focus tunable component closest to the object side) and the image surface 180 is TL, a maximum image height of the image capturing lens assembly (which is half of a diagonal length of an effective photosensitive area of the image sensor 190) is ImgH, a variation of the focal length of the focus tunable component 195 is |Δft|, an axial distance between the image-side surface of the lens element of the image capturing lens assembly closest to the image surface 180 (in the 1st embodiment, which is the image-side surface 132 of the third lens element 130) and the image surface 180 is BL, a vertical distance between at least one non-axial critical point on at least one surface of the lens element of the imaging lens system closest to the image surface 180 (in the 1st embodiment, which is the third lens element 130) and an optical axis is Ycx (in detailed, in the 1st embodiment, a vertical distance between at least one non-axial critical point CP31 on the object-side surface of the lens element of the imaging lens system which is closest to the image surface 180 and the optical axis is Yc1, and a vertical distance between at least one non-axial critical point CP32 on the image-side surface of the lens element of the imaging lens system which is closest to the image surface 180 and the optical axis is Yc2), the axial distance between the aperture stop 100 and a surface of the focus tunable component 195 closest to the image surface 180 of the image capturing lens assembly is Dstr, an axial distance between the aperture stop 100 and a surface of the focus tunable component 195 closest to the object side of the image capturing lens assembly is Dstf, a maximum value among all refractive indices of the lens elements of the imaging lens system (in the 1st embodiment, which is the refractive index of the second lens element 120) is Nmax, an angle between a chief ray CR at a maximum image height position on the image surface 180 of the image capturing lens assembly and a normal direction of the image surface 180 in a paraxial region thereof is CRA, an angle between a marginal ray MR on a meridional plane at the maximum image height position of the image capturing lens assembly and the normal direction of the image surface 180 in the paraxial region thereof is MRA, a vertical distance between a point at the maximum image height position on the image surface 180 of the image capturing lens assembly in which the chief ray CR is incident and the optical axis is CRH, a vertical distance between a point at the maximum image height position on the image surface 180 of the image capturing lens assembly in which the marginal ray MR on the meridional plane is incident and the optical axis is MRH, an optical distortion at the maximum image height position of the image capturing lens assembly is DIST, and a number of the lens elements of the imaging lens system is N. These parameters can be calculated from Table 1A, Table 1B and Table 1C as the following values and satisfy the following conditions in Table 1D under Mode 1 and Mode 2.

TABLE 1D

| | 1st Embodiment | | | | |
|---|---|---|---|---|---|
| | Mode 1 | Mode 2 | | Mode 1 | Mode 2 |
| f [mm] | 2.10 | 2.13 | TL/|Δft| | 0.003 | |
| Fno. | 2.27 | 2.27 | TL/tan(HFOV) | 3.57 | 3.66 |
| HFOV [deg.] | 40.0 | 39.4 | BL/f | 0.39 | 0.38 |
| tan(HFOV) | 0.84 | 0.82 | Ycx/f, x = 1 | 0.24 | 0.23 |
| Obj. [mm] | 900.00 | 450.00 | Ycx/f, x = 2 | 0.38 | 0.37 |
| Dt1/CTt | 0.23 | 0.18 | |Dstr/Dstf| | 0.34 | 0.32 |
| CTt/TDi | 0.15 | 0.15 | Nmax | 1.639 | |
| (R1 + R2)/(R1 − R2) | −0.99 | −0.99 | CRA [deg.] | 31.1 | 31.1 |
| |fi| | 2.11 | | |(CRA − MRA)/CRA| | 0.19 | 0.19 |
| |ft| | 1296.56 | 266.63 | | 0.22 | 0.23 |
| |fi/ft| | 0.002 | 0.008 | |(CRH − MRH) × 10| | 0.09 | 0.02 |
| f/f1 | 1.18 | 1.20 | [mm] | 0.11 | 0.19 |

TABLE 1D-continued

| | 1st Embodiment | | | | |
|---|---|---|---|---|---|
| | Mode 1 | Mode 2 | | Mode 1 | Mode 2 |
| \|f/ft\| | 0.002 | 0.008 | \|DIST\| | 0.10% | 0.71% |
| \|Δ(f/ft)\| | 0.0064 | | N | 3 | |
| TL/ImgH | 1.67 | | | | |

Figure 18:
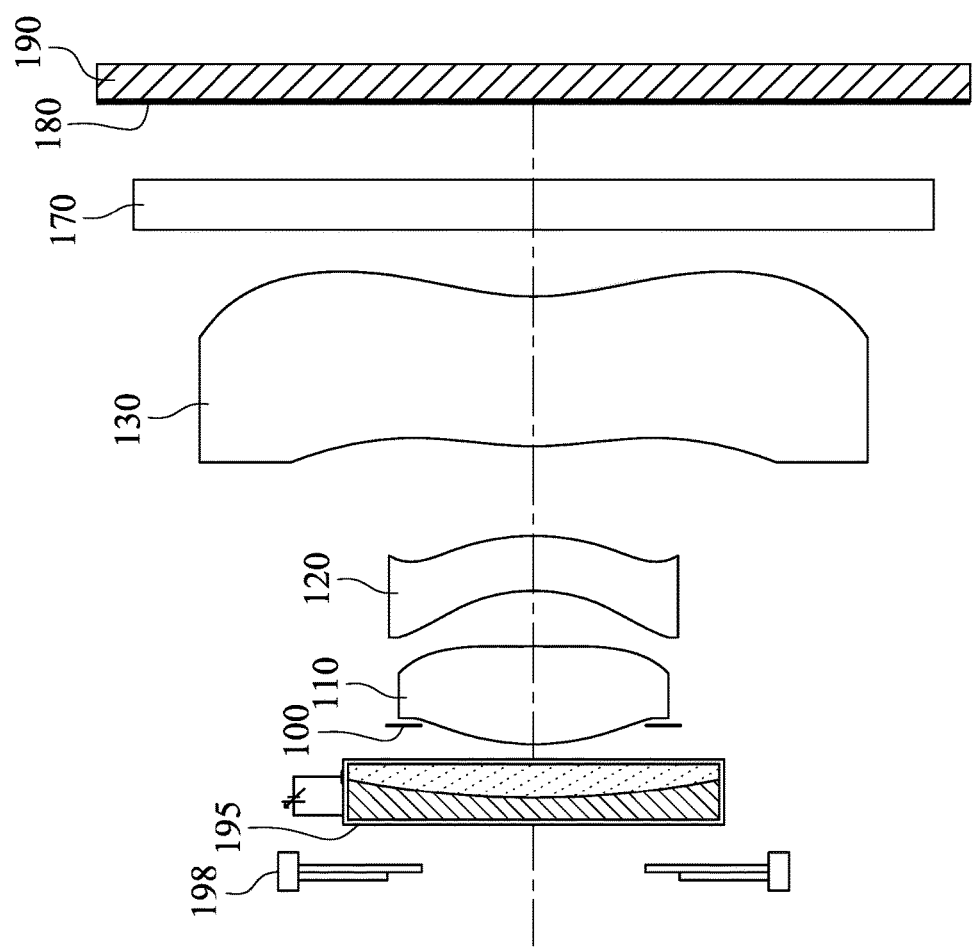
FIG. 18 shows a schematic view of the imaging apparatus including a mechanical member according to the 1st embodiment.

Furthermore, FIG. 18 shows a schematic view of the imaging apparatus including a mechanical member 198 according to the 1st embodiment. In FIG. 18, the image capturing lens assembly further includes a mechanical member 198 disposed on the object side of the focus tunable component 195 and the imaging lens system (its reference numeral is omitted), wherein the focus tunable component 195 shown in FIG. 18 is the same with the liquid lens set shown in FIG. 17B, and will not describe again therein.

2nd Embodiment

Figure 3:
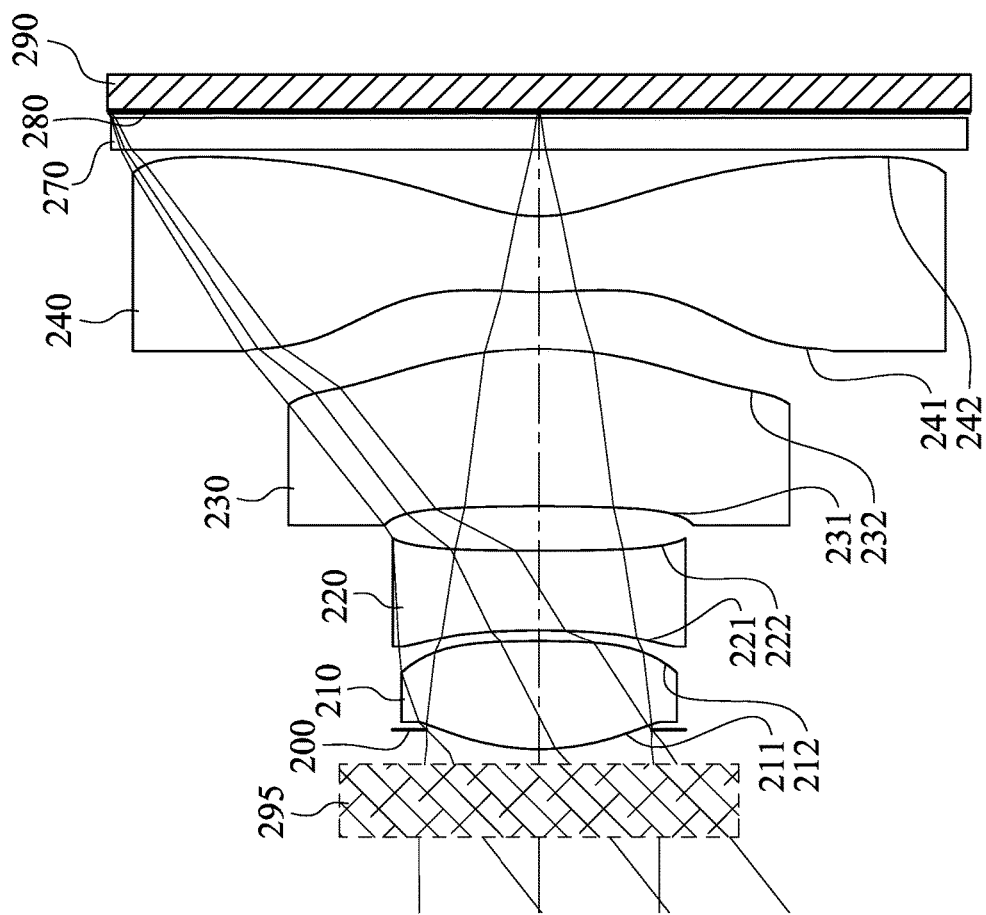
FIG. 3 is a schematic view of an imaging apparatus according to the 2nd embodiment of the present disclosure.
Figure 4A:
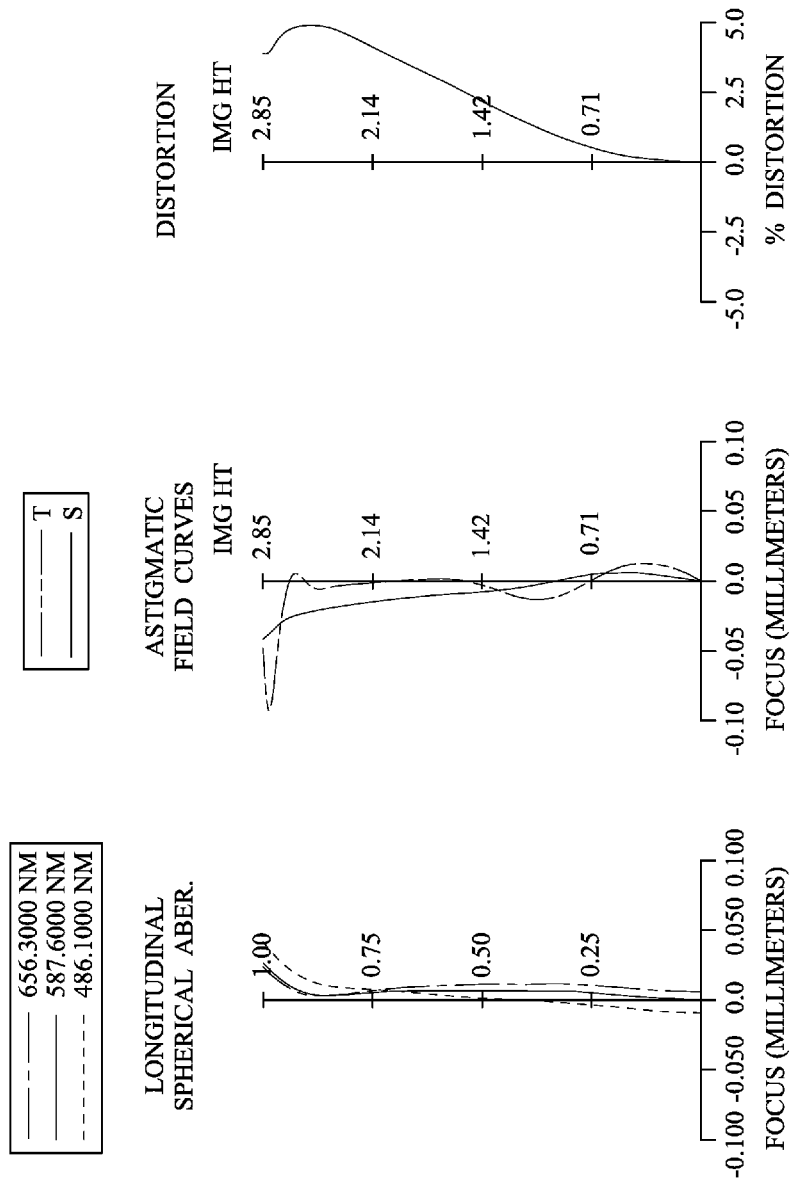
FIG. 4A shows spherical aberration curves, astigmatic field curves and a distortion curve of Mode 1 of the imaging apparatus according to the 2nd embodiment.
Figure 4B:
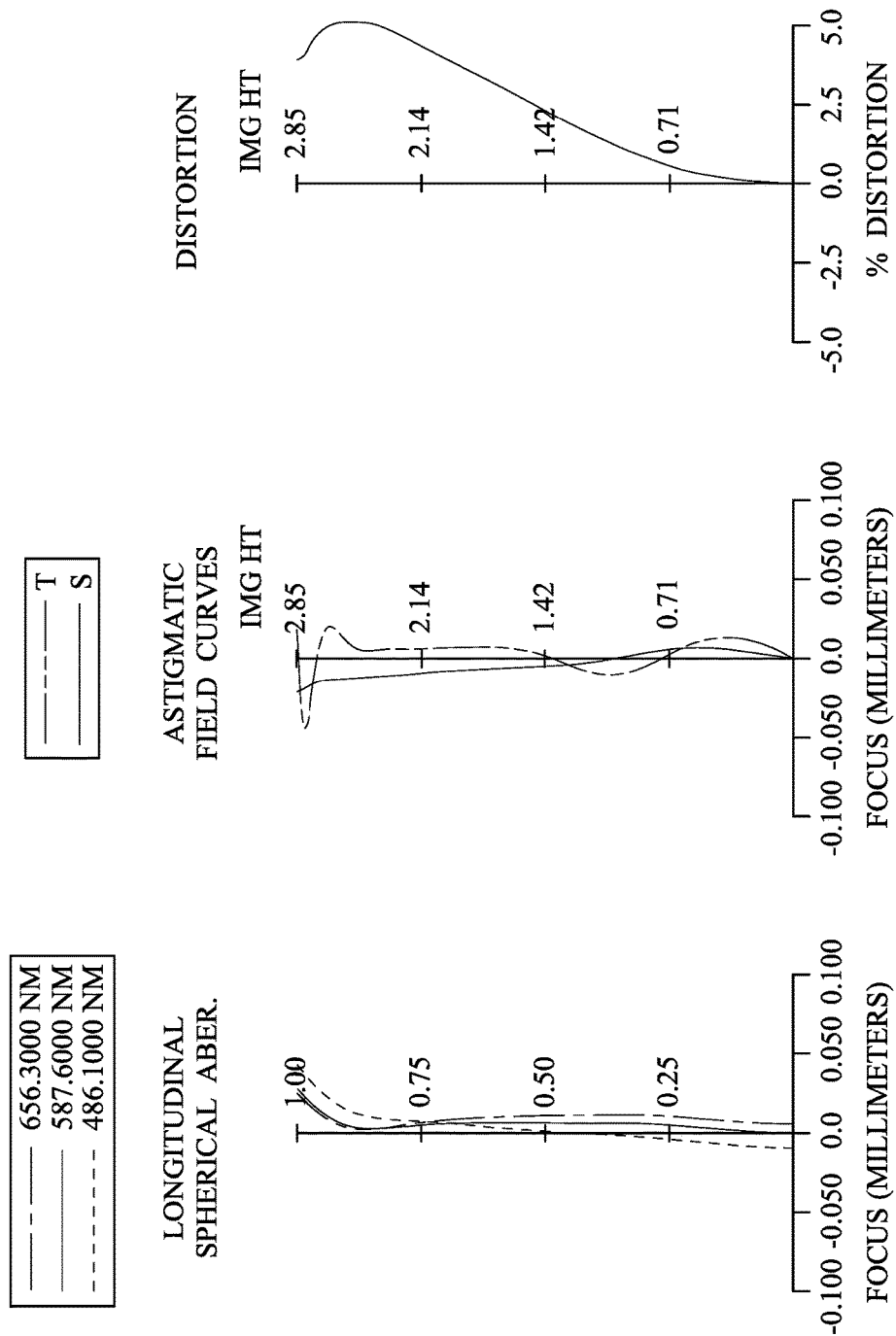
FIG. 4B shows spherical aberration curves, astigmatic field curves and a distortion curve of Mode 2 of the imaging apparatus according to the 2nd embodiment.

FIG. 3 is a schematic view of an imaging apparatus according to the 2nd embodiment of the present disclosure. FIG. 4A shows spherical aberration curves, astigmatic field curves and a distortion curve of Mode 1 of the imaging apparatus according to the 2nd embodiment, and FIG. 4B shows spherical aberration curves, astigmatic field curves and a distortion curve of Mode 2 of the imaging apparatus according to the 2nd embodiment, wherein Mode 1 and Mode 2 are two modes of the imaging apparatus at two different focusing conditions, and the detailed conditions are shown in Table 2C below. In FIG. 3, the imaging apparatus includes an image capturing lens assembly (its reference numeral is omitted) and an image sensor 290. The image capturing lens assembly includes, in order from an object side to an image side, a focus tunable component 295, an aperture stop 200, a first lens element 210, a second lens element 220, a third lens element 230, a fourth lens element 240, a filter 270 and an image surface 280, and the image sensor 290 is disposed on the image surface 280 of the image capturing lens assembly, wherein the image capturing lens assembly includes the focus tunable component 295 and an imaging lens system (its reference numeral is omitted), and the imaging lens system includes the four lens elements (210, 220, 230, 240) without additional one or more lens elements inserted between the first lens element 210 and the fourth lens element 240. The focus tunable component 295 is disposed on an object side of the imaging lens system.

The first lens element 210 with positive refractive power has an object-side surface 211 being convex and an image-side surface 212 being convex. The first lens element 210 is made of a plastic material, and has the object-side surface 211 and the image-side surface 212 being both aspheric.

The second lens element 220 with negative refractive power has an object-side surface 221 being concave and an image-side surface 222 being concave. The second lens element 220 is made of a plastic material, and has the object-side surface 221 and the image-side surface 222 being both aspheric.

The third lens element 230 with positive refractive power has an object-side surface 231 being concave and an image-side surface 232 being convex. The third lens element 230 is made of a plastic material, and has the object-side surface 231 and the image-side surface 232 being both aspheric.

The fourth lens element 240 with negative refractive power has an object-side surface 241 being convex and an image-side surface 242 being concave. The fourth lens element 240 is made of a plastic material, and has the object-side surface 241 and the image-side surface 242 being both aspheric. Furthermore, each of the object-side surface 241 and the image-side surface 242 of the fourth lens element 240 includes at least one inflection point, and each of the object-side surface 241 and the image-side surface 242 of the fourth lens element 240 includes at least one critical point.

The filter 270 is made of a glass material and located between the fourth lens element 240 and the image surface 280, and will not affect the focal length of the image capturing lens assembly.

Furthermore, the focus tunable component 295 can be any one disclosed in the 1st embodiment. The detailed optical data and parameters of the focus tunable component 295 are disclosed in the following 7th and 8th embodiments, and will not describe again herein.

The detailed optical data of the 2nd embodiment are shown in Table 2A and the aspheric surface data are shown in Table 2B below.

TABLE 2A

| | | 2nd Embodiment | | | | | |
|---|---|---|---|---|---|---|---|
| Surface # | | Curvature Radius | | Thickness | Material | Index | Abbe # | Focal Length |
| 0 | Object | Plano | | Obj. | | | | |
| 1 | Ape. Stop | Plano | | −0.128 | | | | |
| 2 | Lens 1 | 1.599 | ASP | 0.715 | Plastic | 1.544 | 56.0 | 2.45 |
| 3 | | −6.728 | ASP | 0.073 | | | | |
| 4 | Lens 2 | −5.413 | ASP | 0.526 | Plastic | 1.660 | 20.4 | −6.71 |
| 5 | | 25.322 | ASP | 0.294 | | | | |
| 6 | Lens 3 | −21.218 | ASP | 1.040 | Plastic | 1.544 | 56.0 | 6.06 |
| 7 | | −2.903 | ASP | 0.378 | | | | |
| 8 | Lens 4 | 3.043 | ASP | 0.501 | Plastic | 1.511 | 56.8 | −3.03 |
| 9 | | 0.969 | ASP | 0.440 | | | | |

TABLE 2A-continued

2nd Embodiment

| Surface # | | Curvature Radius | Thickness | Material | Index | Abbe # | Focal Length |
|---|---|---|---|---|---|---|---|
| 10 | Filter | Plano | 0.210 | Glass | 1.517 | 64.2 | — |
| 11 | | Plano | Imd. | | | | |
| 12 | Image | Plano | — | | | | |

Reference wavelength is 587.6 nm.

TABLE 2B

Aspheric Coefficients

| Surface # | 2 | 3 | 4 | 5 |
|---|---|---|---|---|
| k = | −1.4424E+00 | −2.2246E+00 | −7.3251E+01 | −4.2528E+01 |
| A4 = | 4.1694E−04 | −1.0566E−01 | −8.4944E−02 | 1.9870E−02 |
| A6 = | 1.1642E−01 | −1.6121E−01 | −2.2864E−01 | 1.6757E−01 |
| A8 = | −5.2575E−01 | 3.8478E−02 | 8.4476E−01 | −5.9777E−01 |
| A10 = | 8.3515E−01 | −3.4268E−02 | −1.8898E+00 | 1.2113E+00 |
| A12 = | −6.8183E−01 | 3.2096E−02 | 2.1351E+00 | −1.1969E+00 |
| A14 = | | | −8.1107E−01 | 4.8041E−01 |

| Surface # | 6 | 7 | 8 | 9 |
|---|---|---|---|---|
| k = | −1.0121E+01 | −1.7108E−01 | −7.8954E+01 | −6.5094E+00 |
| A4 = | −6.6085E−02 | −6.2129E−02 | −3.4104E−01 | −6.8707E−02 |
| A6 = | 3.1783E−01 | 1.7054E−01 | 3.1295E−01 | 3.4325E−02 |
| A8 = | −1.3988E+00 | −2.0961E−01 | −2.4561E−01 | −1.1876E−01 |
| A10 = | 3.2174E+00 | 1.5616E−01 | 1.3697E−01 | 2.7291E−03 |
| A12 = | −4.2751E+00 | −6.3778E−02 | −4.3880E−02 | −3.9271E−04 |
| A14 = | 3.0280E+00 | 1.3213E−02 | 7.2554E−03 | 3.2059E−05 |
| A16 = | −9.0441E−01 | −1.1129E−03 | −4.8377E−04 | −1.1467E−06 |

In the 2nd embodiment, the equation of the aspheric surface profiles of the aforementioned lens elements is the same as the equation of the 1st embodiment. Also, the definitions of these parameters shown in the following Table 2C and Table 2D are the same as those stated in the 1st embodiment with corresponding values for the 2nd embodiment, so an explanation in this regard will not be provided again.

Moreover, in the 2nd embodiment, the values of the parameters under Mode 1 and Mode 2 are shown in Tables 2C and 2D below.

TABLE 2C

2nd Embodiment

| | Mode 1 | Mode 2 |
|---|---|---|
| Obj. [mm] | 950.000 | 550.000 |
| ft [mm] | −226.79 | −229.89 |
| CTt [mm] | 0.480 | 0.480 |
| Dstr [mm] | 0.228 | 0.228 |
| Imd. [mm] | 0.032 | 0.033 |

TABLE 2D

2nd Embodiment

| | Mode 1 | Mode 2 | | Mode 1 | Mode 2 |
|---|---|---|---|---|---|
| f [mm] | 3.42 | 3.43 | TL/\|Δft\| | 1.545 | |
| Fno. | 2.18 | 2.18 | TL/tan(HFOV) | 6.01 | 6.05 |
| HFOV [deg.] | 38.5 | 38.3 | BL/f | 0.20 | 0.20 |
| tan(HFOV) | 0.80 | 0.79 | Ycx/f, x = 1 | 0.13 | 0.13 |
| Obj. [mm] | 950.00 | 550.00 | Ycx/f, x = 2 | 0.65 | 0.64 |
| Dt1/CTt | 0.21 | 0.21 | \|Dstr/Dstf\| | 0.32 | 0.32 |
| CTt/TDi | 0.14 | 0.14 | Nmax | 1.660 | |
| (R1 + R2)/(R1 − R2) | −0.62 | −0.62 | CRA [deg.] | 33.1 | 33.2 |
| \|fi\| | 3.14 | | \|(CRA − MRA)/CRA\| | 0.12 | 0.19 |
| \|ft\| | 226.79 | 229.89 | | 0.24 | 0.28 |
| \|fi/ft\| | 0.014 | 0.014 | \|(CRH − MRH) × 10\| | 0.31 | 0.05 |
| f/f1 | 1.39 | 1.40 | [mm] | 0.03 | 0.11 |
| \|f/ft\| | 0.015 | 0.015 | \|DIST\| | 3.91% | 3.95% |
| \|Δ(f/ft)\| | 0.0001 | | N | 4 | |
| TL/ImgH | 1.68 | | | | |

3rd Embodiment

Figure 5:
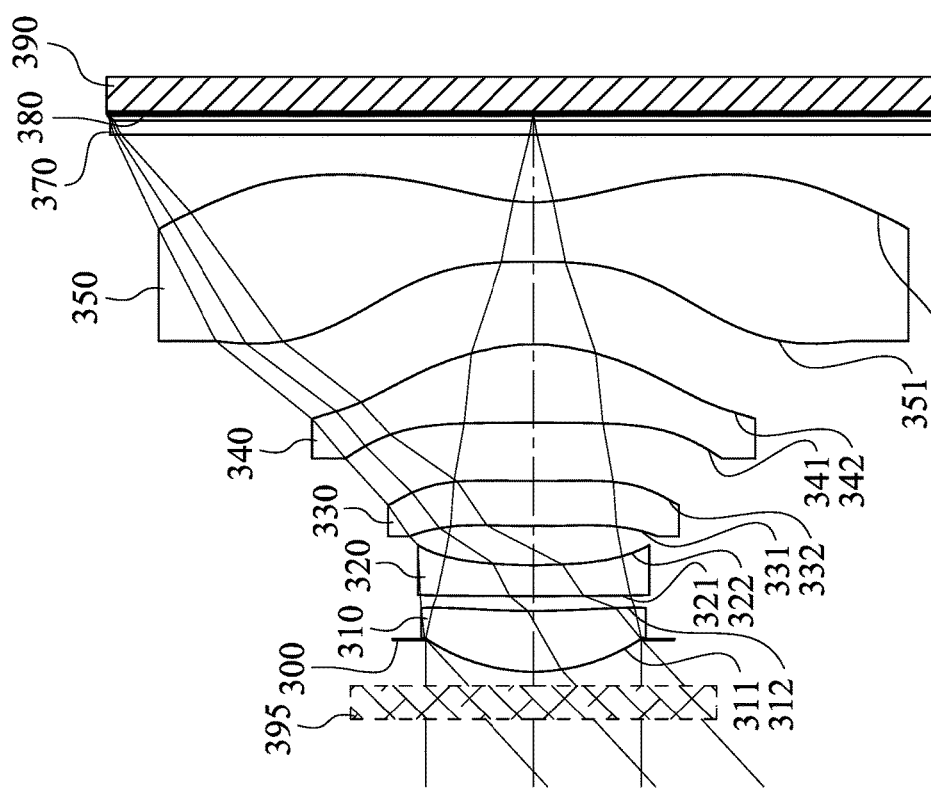
FIG. 5 is a schematic view of an imaging apparatus according to the 3rd embodiment of the present disclosure.
Figure 6A:
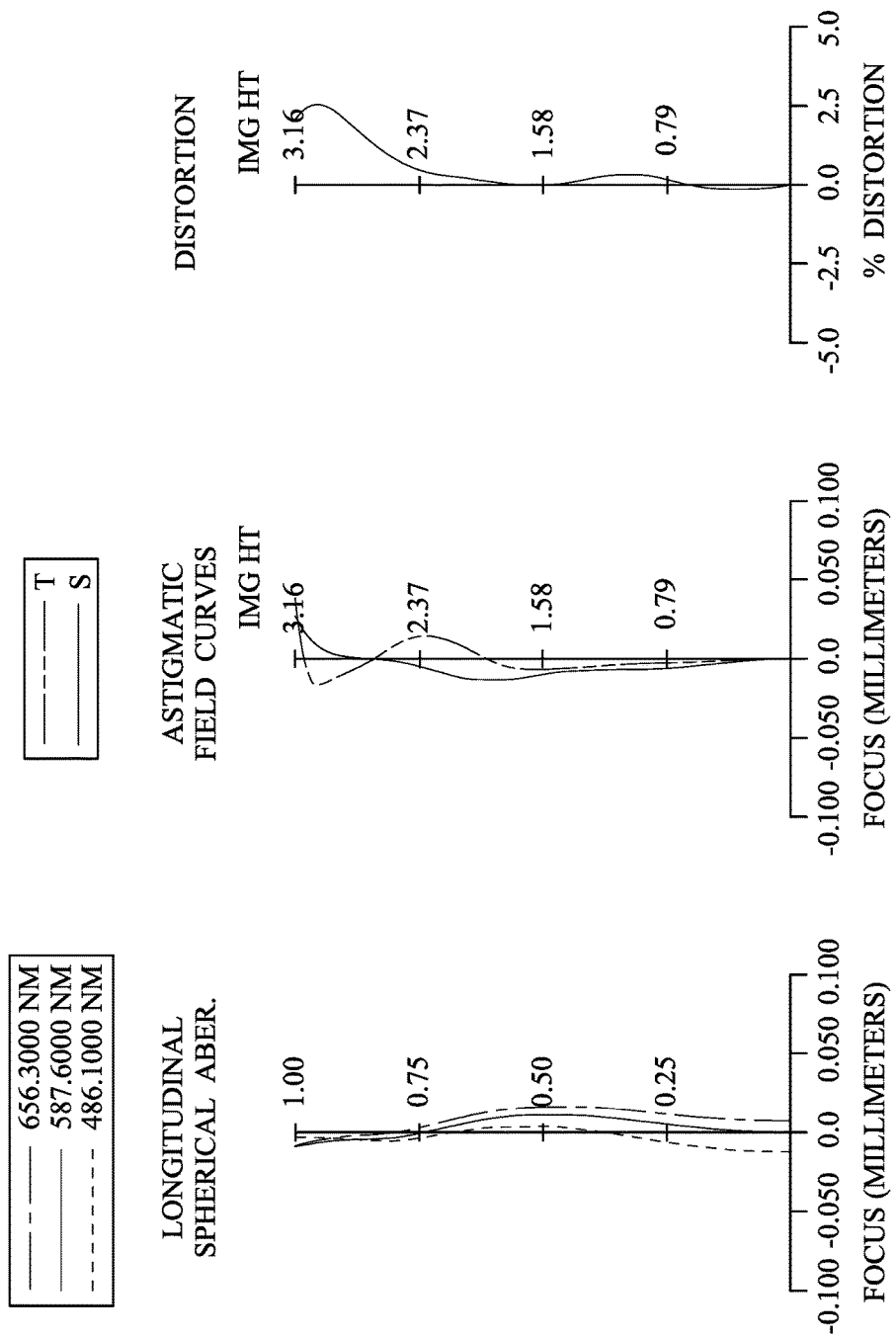
FIG. 6A shows spherical aberration curves, astigmatic field curves and a distortion curve of Mode 1 of the imaging apparatus according to the 3rd embodiment.
Figure 6B:
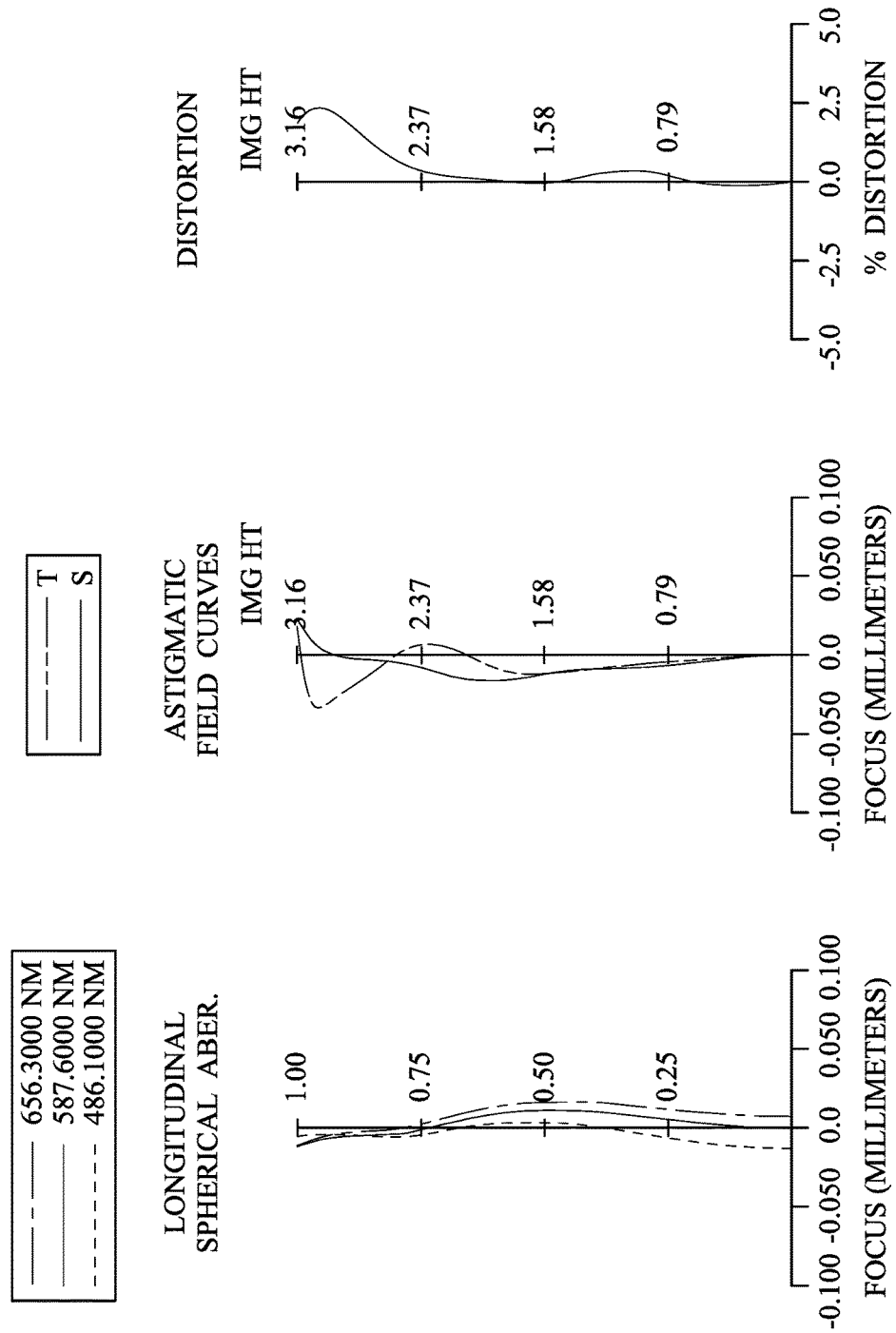
FIG. 6B shows spherical aberration curves, astigmatic field curves and a distortion curve of Mode 2 of the imaging apparatus according to the 3rd embodiment.

FIG. 5 is a schematic view of an imaging apparatus according to the 3rd embodiment of the present disclosure. FIG. 6A shows spherical aberration curves, astigmatic field curves and a distortion curve of Mode 1 of the imaging apparatus according to the 3rd embodiment, and FIG. 6B shows spherical aberration curves, astigmatic field curves and a distortion curve of Mode 2 of the imaging apparatus according to the 3rd embodiment, wherein Mode 1 and Mode 2 are two modes of the imaging apparatus at two different focusing conditions, and the detailed conditions are shown in Table 3C below. In FIG. 5, the imaging apparatus includes an image capturing lens assembly (its reference numeral is omitted) and an image sensor 390. The image capturing lens assembly includes, in order from an object side to an image side, a focus tunable component 395, an aperture stop 300, a first lens element 310, a second lens element 320, a third lens element 330, a fourth lens element 340, a fifth lens element 350, a filter 370 and an image surface 380, and the image sensor 390 is disposed on the image surface 380 of the image capturing lens assembly, wherein the image capturing lens assembly includes the focus tunable component 395 and an imaging lens system (its reference numeral is omitted), and the imaging lens system includes the fifth lens elements (310, 320, 330, 340, 350) without additional one or more lens elements inserted between the first lens element 310 and the fifth lens element 350. The focus tunable component 395 is disposed on an object side of the imaging lens system.

The first lens element 310 with positive refractive power has an object-side surface 311 being convex and an image-side surface 312 being concave. The first lens element 310 is made of a plastic material, and has the object-side surface 311 and the image-side surface 312 being both aspheric.

The second lens element 320 with negative refractive power has an object-side surface 321 being convex and an image-side surface 322 being concave. The second lens element 320 is made of a plastic material, and has the object-side surface 321 and the image-side surface 322 being both aspheric.

The third lens element 330 with positive refractive power has an object-side surface 331 being convex and an image-side surface 332 being concave. The third lens element 330 is made of a plastic material, and has the object-side surface 331 and the image-side surface 332 being both aspheric.

The fourth lens element 340 with positive refractive power has an object-side surface 341 being concave and an image-side surface 342 being convex. The fourth lens element 340 is made of a plastic material, and has the object-side surface 341 and the image-side surface 342 being both aspheric.

The fifth lens element 350 with negative refractive power has an object-side surface 351 being concave and an image-side surface 352 being concave. The fifth lens element 350 is made of a plastic material, and has the object-side surface 351 and the image-side surface 352 being both aspheric. Furthermore, each of the object-side surface 351 and the image-side surface 352 of the fifth lens element 350 includes at least one inflection point, and each of the object-side surface 351 and the image-side surface 352 of the fifth lens element 350 includes at least one critical point.

The filter 370 is made of a glass material and located between the fifth lens element 350 and the image surface 380, and will not affect the focal length of the image capturing lens assembly.

Furthermore, the focus tunable component 395 can be any one disclosed in the 1st embodiment. The detailed optical data and parameters of the focus tunable component 395 are disclosed in the following 7th and 8th embodiments, and will not describe again herein.

The detailed optical data of the 3rd embodiment are shown in Table 3A and the aspheric surface data are shown in Table 3B below.

TABLE 3A

3rd Embodiment

| Surface # | | Curvature Radius | | Thickness | Material | Index | Abbe # | Focal Length |
|---|---|---|---|---|---|---|---|---|
| 0 | Object | Plano | | Obj. | | | | |
| 1 | Ape. Stop | Plano | | −0.240 | | | | |
| 2 | Lens 1 | 1.433 | ASP | 0.450 | Plastic | 1.544 | 56.0 | 3.33 |
| 3 | | 6.057 | ASP | 0.108 | | | | |
| 4 | Lens 2 | 14.297 | ASP | 0.230 | Plastic | 1.671 | 19.3 | −7.24 |
| 5 | | 3.600 | ASP | 0.291 | | | | |
| 6 | Lens 3 | 7.161 | ASP | 0.334 | Plastic | 1.566 | 37.4 | 29.57 |
| 7 | | 12.304 | ASP | 0.432 | | | | |
| 8 | Lens 4 | −38.735 | ASP | 0.584 | Plastic | 1.544 | 56.0 | 3.05 |
| 9 | | −1.601 | ASP | 0.612 | | | | |
| 10 | Lens 5 | −7.424 | ASP | 0.441 | Plastic | 1.511 | 56.8 | −2.20 |
| 11 | | 1.349 | ASP | 0.500 | | | | |
| 12 | Filter | Plano | | 0.110 | Glass | 1.517 | 64.2 | — |
| 13 | | Plano | | Imd. | | | | |
| 14 | Image | Plano | | — | | | | |

Reference wavelength is 587.6 nm.

TABLE 3B

Aspheric Coefficients

| Surface # | 2 | 3 | 4 | 5 | 6 |
|---|---|---|---|---|---|
| k = | −1.3108E−01 | 1.1674E+01 | 9.0000E+01 | −8.6624E+00 | 1.4504E+01 |
| A4 = | 1.3364E−02 | −1.1148E−01 | −1.9284E−01 | −8.3486E−02 | −2.2300E−01 |
| A6 = | −3.2053E−02 | 1.1686E−01 | 4.9295E−01 | 4.0687E−01 | −1.2591E−02 |

TABLE 3B-continued

| Aspheric Coefficients | | | | | |
|---|---|---|---|---|---|
| A8 = | 1.4702E−01 | −3.8011E−02 | −4.7099E−01 | −2.4673E−01 | 2.1367E−01 |
| A10 = | −3.1413E−01 | −2.2961E−02 | 1.3520E−01 | −4.6730E−02 | −4.0254E−01 |
| A12 = | 3.9350E−01 | −1.1762E−01 | −1.1678E−02 | 1.3965E−01 | 2.5094E−01 |
| A14 = | −2.6289E−01 | | | | |

| Surface # | 7 | 8 | 9 | 10 | 11 |
|---|---|---|---|---|---|
| k = | −2.1381E+01 | −9.3551E+01 | −1.0583E+01 | 2.8163E−01 | −9.1105E+00 |
| A4 = | −2.4210E−01 | −2.9196E−02 | −2.2763E−01 | −2.6281E−01 | −5.7840E−02 |
| A6 = | 2.4766E−02 | −3.6298E−02 | 3.0491E−01 | 1.6130E−01 | 5.9051E−03 |
| A8 = | −1.8335E−01 | 3.0500E−02 | −3.1406E−01 | −4.8010E−02 | 5.7071E−03 |
| A10 = | 4.4203E−01 | −4.1106E−02 | 2.1181E−01 | 8.9588E−03 | −2.7024E−03 |
| A12 = | −5.8810E−01 | 2.5348E−02 | −7.9697E−02 | −1.0870E−03 | 4.9756E−04 |
| A14 = | 3.1923E−01 | −5.0209E−03 | 1.5334E−02 | 7.8718E−05 | −4.2332E−05 |
| A16 = | | | −1.1935E−03 | −2.5593E−06 | 1.3786E−06 |

In the 3rd embodiment, the equation of the aspheric surface profiles of the aforementioned lens elements is the same as the equation of the 1st embodiment. Also, the definitions of these parameters shown in the following Table 3C and Table 3D are the same as those stated in the 1st embodiment with corresponding values for the 3rd embodiment, so an explanation in this regard will not be provided again.

Moreover, in the 3rd embodiment, the values of the parameters under Mode 1 and Mode 2 are shown in Tables 3C and 3D below.

TABLE 3C

| 3rd Embodiment | | |
|---|---|---|
| | Mode 1 | Mode 2 |
| Obj. [mm] | 800.000 | 350.000 |
| ft [mm] | 1155.23 | 665.98 |
| CTt [mm] | 0.250 | 0.250 |
| Dstr [mm] | 0.345 | 0.345 |
| Imd. [mm] | 0.052 | 0.057 |

TABLE 3D

| 3rd Embodiment | | | | | |
|---|---|---|---|---|---|
| | Mode 1 | Mode 2 | | Mode 1 | Mode 2 |
| f [mm] | 3.34 | 3.33 | TL/|Δft| | 0.009 | |
| Fno. | 2.10 | 2.10 | TL/tan(HFOV) | 4.89 | 4.90 |
| HFOV [deg.] | 42.6 | 42.6 | BL/f | 0.20 | 0.20 |
| tan(HFOV) | 0.92 | 0.92 | Ycx/f, x = 1 | 0.62 | 0.62 |
| Obj. [mm] | 800.00 | 350.00 | Ycx/f, x = 2 | 0.43 | 0.43 |
| Dt1/CTt | 0.42 | 0.40 | |Dstr/Dstf| | 0.58 | 0.58 |
| CTt/TDi | 0.07 | 0.07 | Nmax | 1.671 | |
| (R1 + R2)/(R1 − R2) | −1.62 | −1.62 | CRA [deg.] | 32.8 | 33.0 |
| |fi| | 3.35 | | |(CRA − MRA)/CRA| | 0.23 | 0.23 |
| |ft| | 1155.23 | 665.98 | | 0.27 | 0.27 |
| |fi/ft| | 0.003 | 0.005 | |(CRH − MRH) × 10| | 0.06 | 0.02 |
| f/f1 | 1.00 | 1.00 | [mm] | 0.03 | 0.01 |
| |f/ft| | 0.003 | 0.005 | |DIST| | 2.09% | 1.86% |
| |Δ(f/ft)| | 0.0021 | | N | 5 | |
| TL/ImgH | 1.42 | | | | |

4th Embodiment

Figure 7:
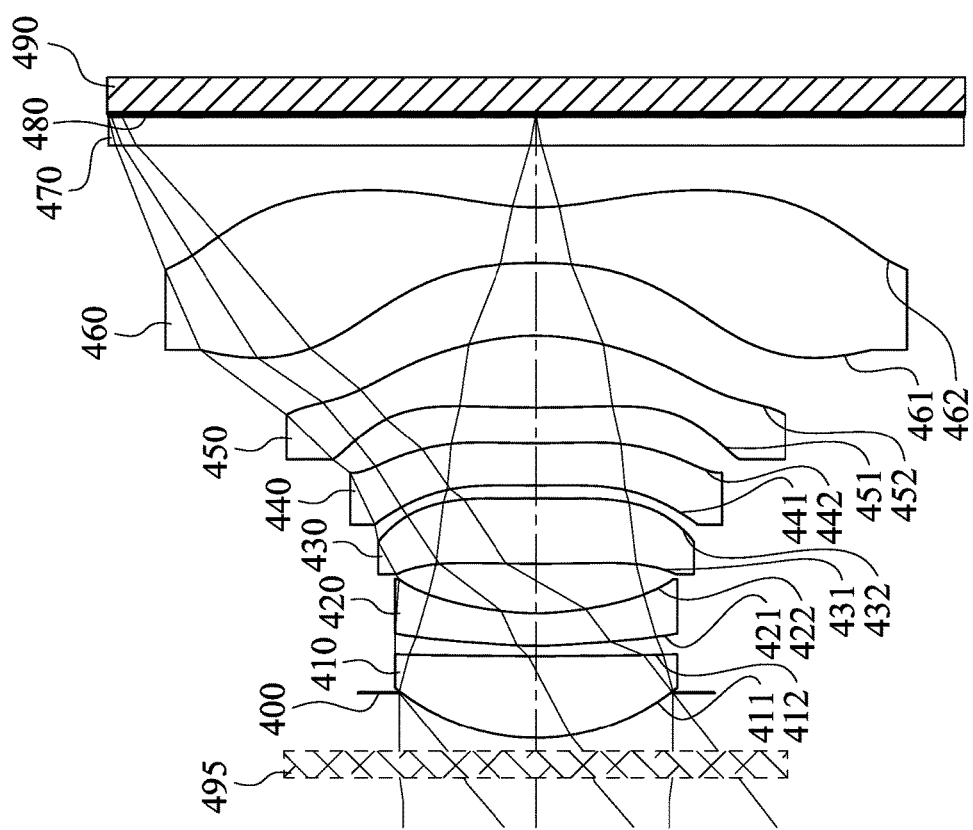
FIG. 7 is a schematic view of an imaging apparatus according to the 4th embodiment of the present disclosure.
Figure 8A:
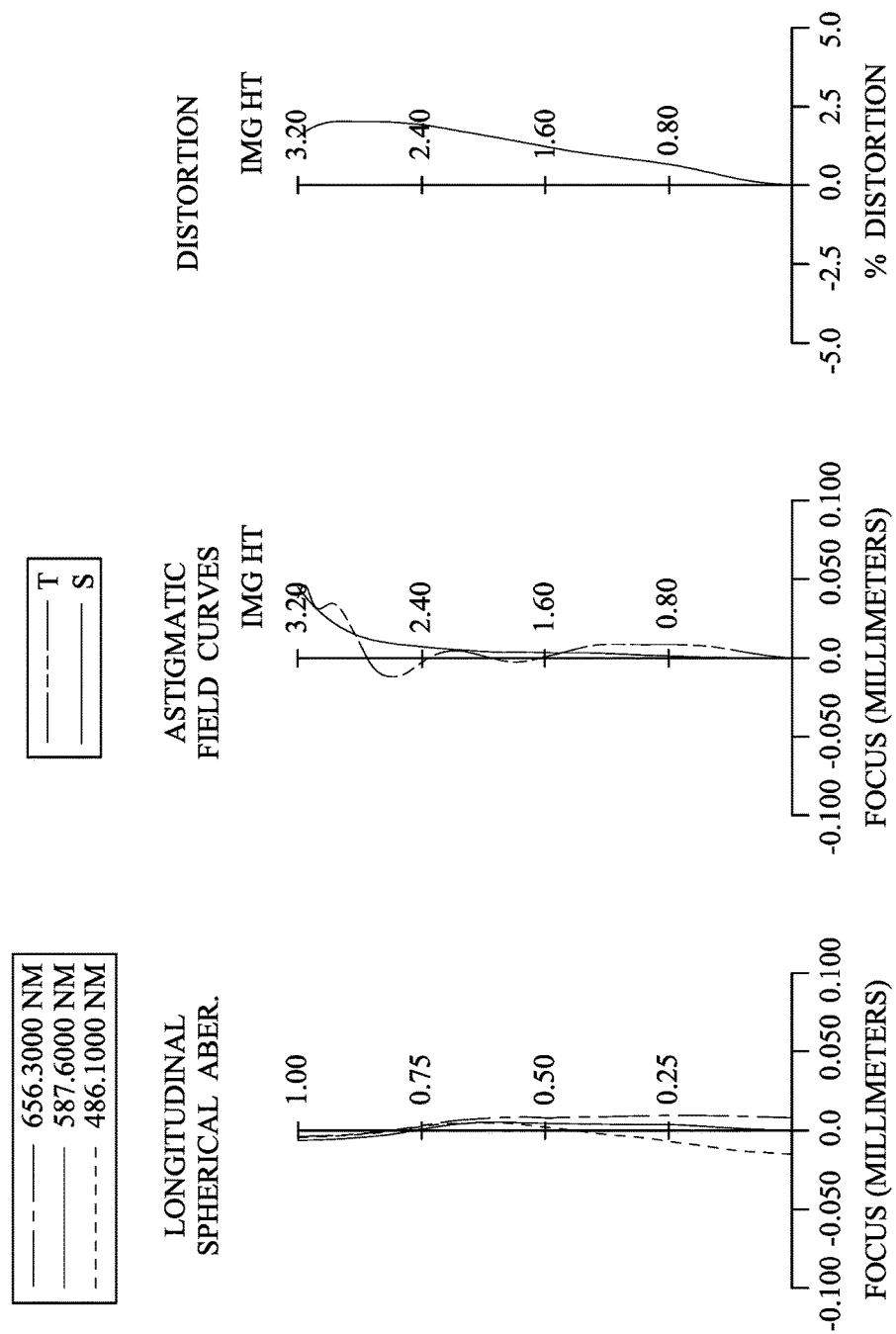
FIG. 8A shows spherical aberration curves, astigmatic field curves and a distortion curve of Mode 1 of the imaging apparatus according to the 4th embodiment.
Figure 8B:
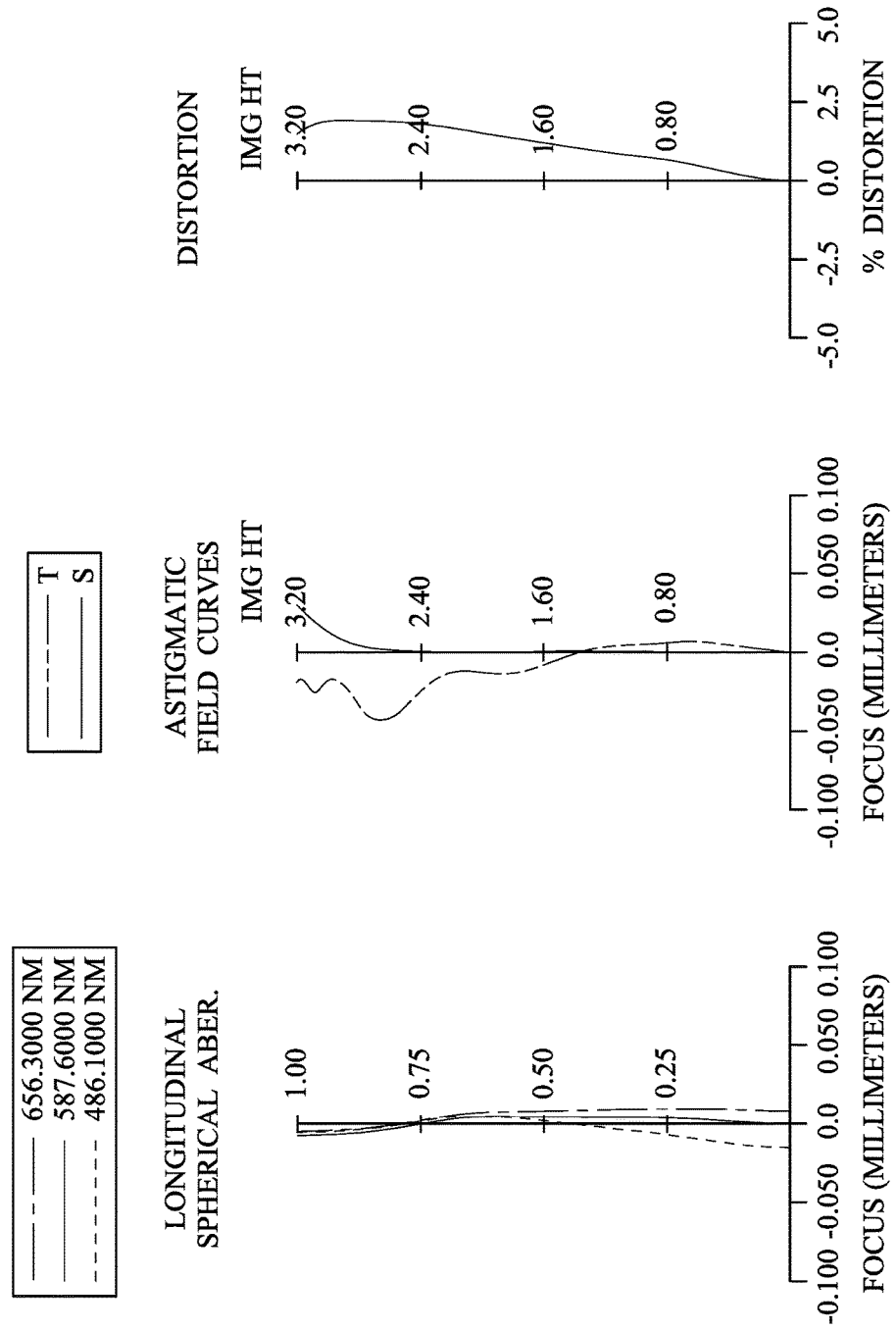
FIG. 8B shows spherical aberration curves, astigmatic field curves and a distortion curve of Mode 2 of the imaging apparatus according to the 4th embodiment.

FIG. 7 is a schematic view of an imaging apparatus according to the 4th embodiment of the present disclosure. FIG. 8A shows spherical aberration curves, astigmatic field curves and a distortion curve of Mode 1 of the imaging apparatus according to the 4th embodiment, and FIG. 8B shows spherical aberration curves, astigmatic field curves and a distortion curve of Mode 2 of the imaging apparatus according to the 4th embodiment, wherein Mode 1 and Mode 2 are two modes of the imaging apparatus at two different focusing conditions, and the detailed conditions are shown in Table 4C below. In FIG. 7, the imaging apparatus includes an image capturing lens assembly (its reference numeral is omitted) and an image sensor 490. The image capturing lens assembly includes, in order from an object side to an image side, a focus tunable component 495, an aperture stop 400, a first lens element 410, a second lens element 420, a third lens element 430, a fourth lens element 440, a fifth lens element 450, a sixth lens element 460, a filter 470 and an image surface 480, and the image sensor 490 is disposed on the image surface 480 of the image capturing lens assembly, wherein the image capturing lens assembly includes the focus tunable component 495 and an imaging lens system (its reference numeral is omitted), and the imaging lens system includes the six lens elements (410, 420, 430, 440, 450, 460) without additional one or more lens elements inserted between the first lens element 410 and the sixth lens element 460. The focus tunable component 495 is disposed on an object side of the imaging lens system.

The first lens element 410 with positive refractive power has an object-side surface 411 being convex and an image-side surface 412 being concave. The first lens element 410 is made of a plastic material, and has the object-side surface 411 and the image-side surface 412 being both aspheric.

The second lens element 420 with negative refractive power has an object-side surface 421 being convex and an image-side surface 422 being concave. The second lens element 420 is made of a plastic material, and has the object-side surface 421 and the image-side surface 422 being both aspheric.

The third lens element 430 with positive refractive power has an object-side surface 431 being convex and an image-side surface 432 being concave. The third lens element 430 is made of a plastic material, and has the object-side surface 431 and the image-side surface 432 being both aspheric.

The fourth lens element 440 with negative refractive power has an object-side surface 441 being convex and an image-side surface 442 being concave. The fourth lens element 440 is made of a plastic material, and has the object-side surface 441 and the image-side surface 442 being both aspheric. Furthermore, each of the object-side surface 441 and the image-side surface 442 of the fourth lens element 440 includes at least one inflection point.

The fifth lens element 450 with positive refractive power has an object-side surface 451 being convex and an image-side surface 452 being convex. The fifth lens element 450 is made of a plastic material, and has the object-side surface 451 and the image-side surface 452 being both aspheric. Furthermore, each of the object-side surface 451 and the image-side surface 452 of the fifth lens element 450 includes at least one inflection point.

The sixth lens element 460 with negative refractive power has an object-side surface 461 being concave and an image-side surface 462 being concave. The sixth lens element 460 is made of a plastic material, and has the object-side surface 461 and the image-side surface 462 being both aspheric. Furthermore, each of the object-side surface 461 and the image-side surface 462 of the sixth lens element 460 includes at least one inflection point, and each of the object-side surface 461 and the image-side surface 462 of the sixth lens element 460 includes at least one critical point.

The filter 470 is made of a glass material and located between the sixth lens element 460 and the image surface 480, and will not affect the focal length of the image capturing lens assembly.

Furthermore, the focus tunable component 495 can be any one disclosed in the 1st embodiment. The detailed optical data and parameters of the focus tunable component 495 are disclosed in the following 7th and 8th embodiments, and will not describe again herein.

The detailed optical data of the 4th embodiment are shown in Table 4A and the aspheric surface data are shown in Table 4B below.

TABLE 4A

4th Embodiment

| Surface # | | Curvature Radius | | Thickness | Material | Index | Abbe # | Focal Length |
|---|---|---|---|---|---|---|---|---|
| 0 | Object | Plano | | Obj. | | | | |
| 1 | Ape. Stop | Plano | | −0.340 | | | | |
| 2 | Lens 1 | 1.686 | ASP | 0.614 | Plastic | 1.545 | 56.0 | 3.57 |
| 3 | | 11.017 | ASP | 0.080 | | | | |
| 4 | Lens 2 | 3.253 | ASP | 0.243 | Plastic | 1.660 | 20.4 | −8.54 |
| 5 | | 2.002 | ASP | 0.372 | | | | |
| 6 | Lens 3 | 12.148 | ASP | 0.489 | Plastic | 1.544 | 56.0 | 40.95 |
| 7 | | 26.335 | ASP | 0.097 | | | | |
| 8 | Lens 4 | 12.980 | ASP | 0.317 | Plastic | 1.660 | 20.4 | −20.31 |
| 9 | | 6.531 | ASP | 0.271 | | | | |
| 10 | Lens 5 | 9.031 | ASP | 0.539 | Plastic | 1.544 | 56.0 | 2.83 |
| 11 | | −1.815 | ASP | 0.546 | | | | |
| 12 | Lens 6 | −3.298 | ASP | 0.417 | Plastic | 1.534 | 55.9 | −2.28 |
| 13 | | 2.010 | ASP | 0.468 | | | | |
| 14 | Filter | Plano | | 0.210 | Glass | 1.517 | 64.2 | — |
| 15 | | Plano | | Imd. | | | | |
| 16 | Image | Plano | | — | | | | |

Reference wavelength is 587.6 nm.

TABLE 4B

Aspheric Coefficients

| Surface # | 2 | 3 | 4 | 5 | 6 | 7 |
|---|---|---|---|---|---|---|
| k = | 3.8525E−03 | 3.3315E+01 | 1.4058E+00 | −8.3467E−02 | 9.9000E+01 | 2.0000E+01 |
| A4 = | 2.4114E−03 | −1.5415E−01 | −2.9590E−01 | −1.9418E−01 | −7.9467E−02 | −1.8330E−01 |
| A6 = | 1.3982E−02 | 3.1019E−01 | 4.8487E−01 | 3.2325E−01 | 9.2804E−03 | 1.8328E−02 |
| A8 = | −5.9177E−02 | −3.6415E−01 | −4.9583E−01 | −3.7517E−01 | −1.1303E−01 | 1.9721E−01 |
| A10 = | 1.2860E−01 | 2.6882E−01 | 3.4594E−01 | 3.9495E−01 | 1.5201E−01 | −5.2530E−01 |
| A12 = | −1.4610E−01 | −1.1554E−01 | −1.5294E−01 | −2.6813E−01 | −1.2851E−01 | 4.4433E−01 |
| A14 = | 8.5352E−02 | 2.0332E−02 | 3.0925E−02 | 8.7656E−02 | 4.7300E−02 | −1.2120E−01 |
| A16 = | −2.0500E−02 | | | | | −3.0791E−03 |

| Surface # | 8 | 9 | 10 | 11 | 12 | 13 |
|---|---|---|---|---|---|---|
| k = | −9.9000E+01 | −6.4577E+01 | −5.6542E+01 | −7.7222E+00 | −3.0509E+00 | −6.8025E+00 |
| A4 = | −3.0908E−01 | −2.2784E−01 | −3.6840E−02 | −5.0042E−02 | −1.3164E−01 | −1.2118E−01 |

TABLE 4B-continued

| Aspheric Coefficients | | | | | | |
|---|---|---|---|---|---|---|
| A6 = | 3.9050E−02 | 3.6610E−02 | −3.5531E−02 | 7.8300E−02 | 2.8734E−02 | 6.4343E−02 |
| A8 = | 5.4871E−01 | 1.5042E−01 | −1.2465E−01 | −1.6799E−01 | 1.4920E−01 | −2.3384E−02 |
| A10 = | −1.0866E+00 | −1.7190E−01 | 2.2030E−01 | 1.4558E−01 | −7.3630E−03 | 5.4445E−03 |
| A12 = | 8.9800E−01 | 7.5678E−02 | −1.5211E−01 | −5.7565E−02 | 1.2977E−03 | −7.8813E−04 |
| A14 = | −3.1690E−01 | −1.1347E−02 | 4.8470E−02 | 1.0803E−02 | −1.0571E−04 | 6.3637E−05 |
| A16 = | 3.3717E−02 | | −5.7918E−03 | −7.8935E−04 | 3.3164E−06 | −2.1484E−06 |

In the 4th embodiment, the equation of the aspheric surface profiles of the aforementioned lens elements is the same as the equation of the 1st embodiment. Also, the definitions of these parameters shown in the following Table 4C and Table 4D are the same as those stated in the 1st embodiment with corresponding values for the 4th embodiment, so an explanation in this regard will not be provided again.

Moreover, in the 4th embodiment, the values of the parameters under Mode 1 and Mode 2 are shown in Tables 4C and 4D below.

TABLE 4C

| 4th Embodiment | | |
|---|---|---|
| | Mode 1 | Mode 2 |
| Obj. [mm] | 1200.000 | 400.000 |
| ft [mm] | 673.82 | 487.68 |
| CTt [mm] | 0.200 | 0.200 |
| Dstr [mm] | 0.440 | 0.440 |
| Imd. [mm] | 0.023 | 0.023 |

TABLE 4D

| 4th Embodiment | | | | | |
|---|---|---|---|---|---|
| | Mode 1 | Mode 2 | | Mode 1 | Mode 2 |
| f [mm] | 3.64 | 3.63 | TL/|Δft| | 0.027 | |
| Fno. | 1.83 | 1.83 | TL/tan(HFOV) | 5.79 | 5.81 |
| HFOV [deg.] | 40.8 | 40.6 | BL/f | 0.19 | 0.19 |
| tan(HFOV) | 0.86 | 0.86 | Ycx/f, x = 1 | 0.57 | 0.58 |
| Obj. [mm] | 1200.00 | 400.00 | Ycx/f, x = 2 | 0.34 | 0.34 |
| Dt1/CTt | 0.50 | 0.50 | |Dstr/Dstf| | 0.69 | 0.69 |
| CTt/TDi | 0.05 | 0.05 | Nmax | 1.660 | |
| (R1 + R2)/(R1 − R2) | −1.36 | −1.36 | CRA [deg.] | 32.4 | 32.4 |
| |fi| | 3.77 | | |(CRA − MRA)/CRA| | 0.33 | 0.37 |
| |ft| | 673.82 | 487.68 | | 0.29 | 0.28 |
| |fi/ft| | 0.006 | 0.008 | |(CRH − MRH) × 10| | 0.17 | 0.17 |
| f/f1 | 1.02 | 1.02 | [mm] | 0.76 | 0.17 |
| |f/ft| | 0.005 | 0.007 | |DIST| | 1.53% | 1.45% |
| |Δ(f/ft)| | 0.0020 | | N | 6 | |
| TL/ImgH | 1.56 | | | | |

5th Embodiment

Figure 9:
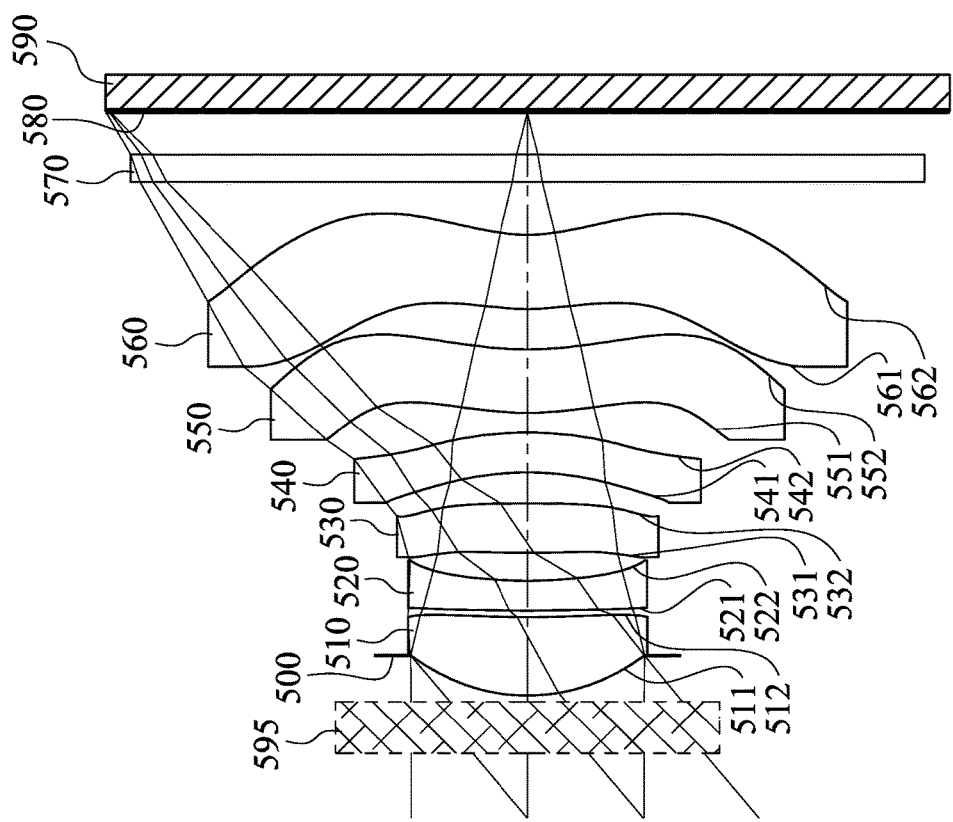
FIG. 9 is a schematic view of an imaging apparatus according to the 5th embodiment of the present disclosure.
Figure 10A:
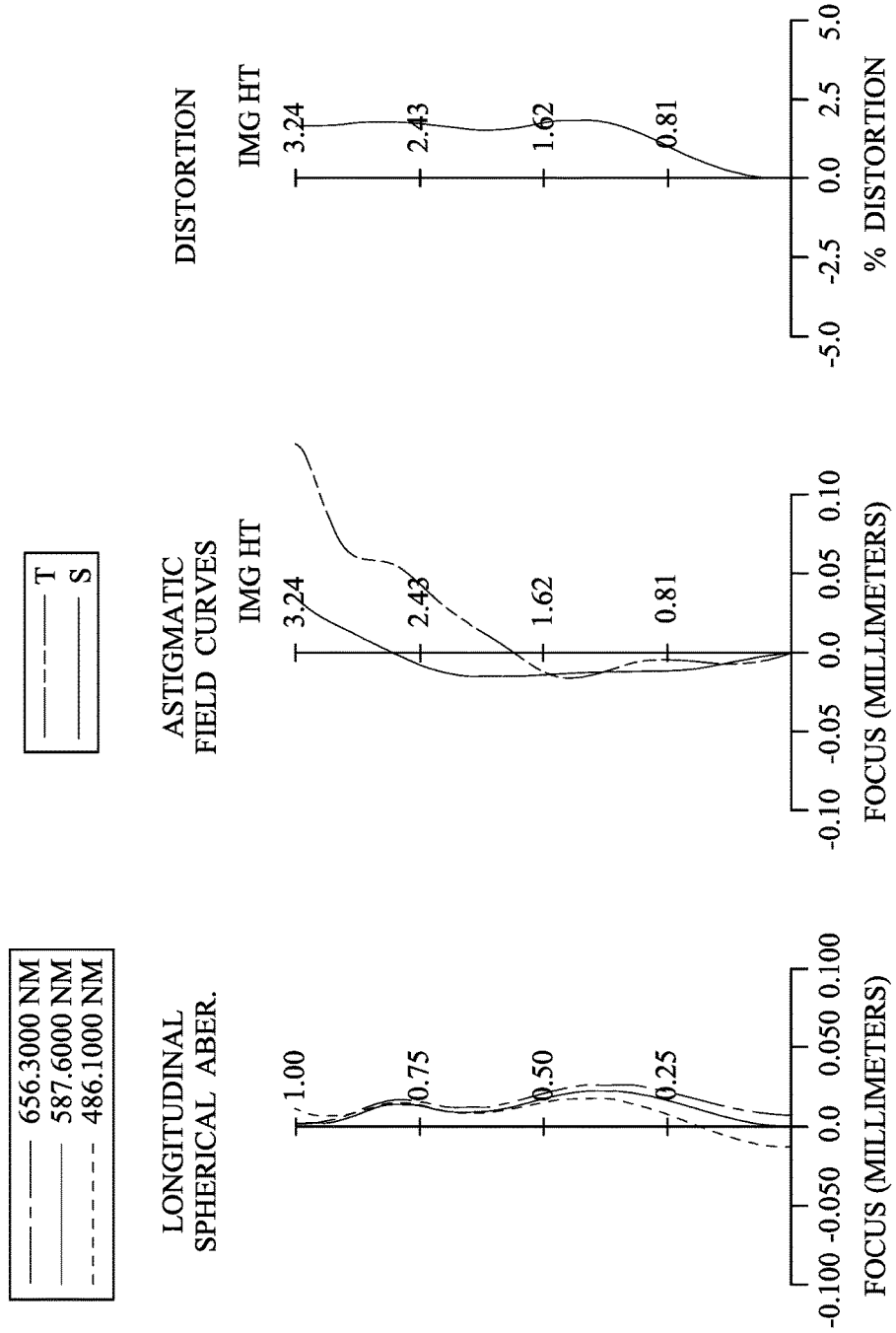
FIG. 10A shows spherical aberration curves, astigmatic field curves and a distortion curve of Mode 1 of the imaging apparatus according to the 5th embodiment.
Figure 10B:
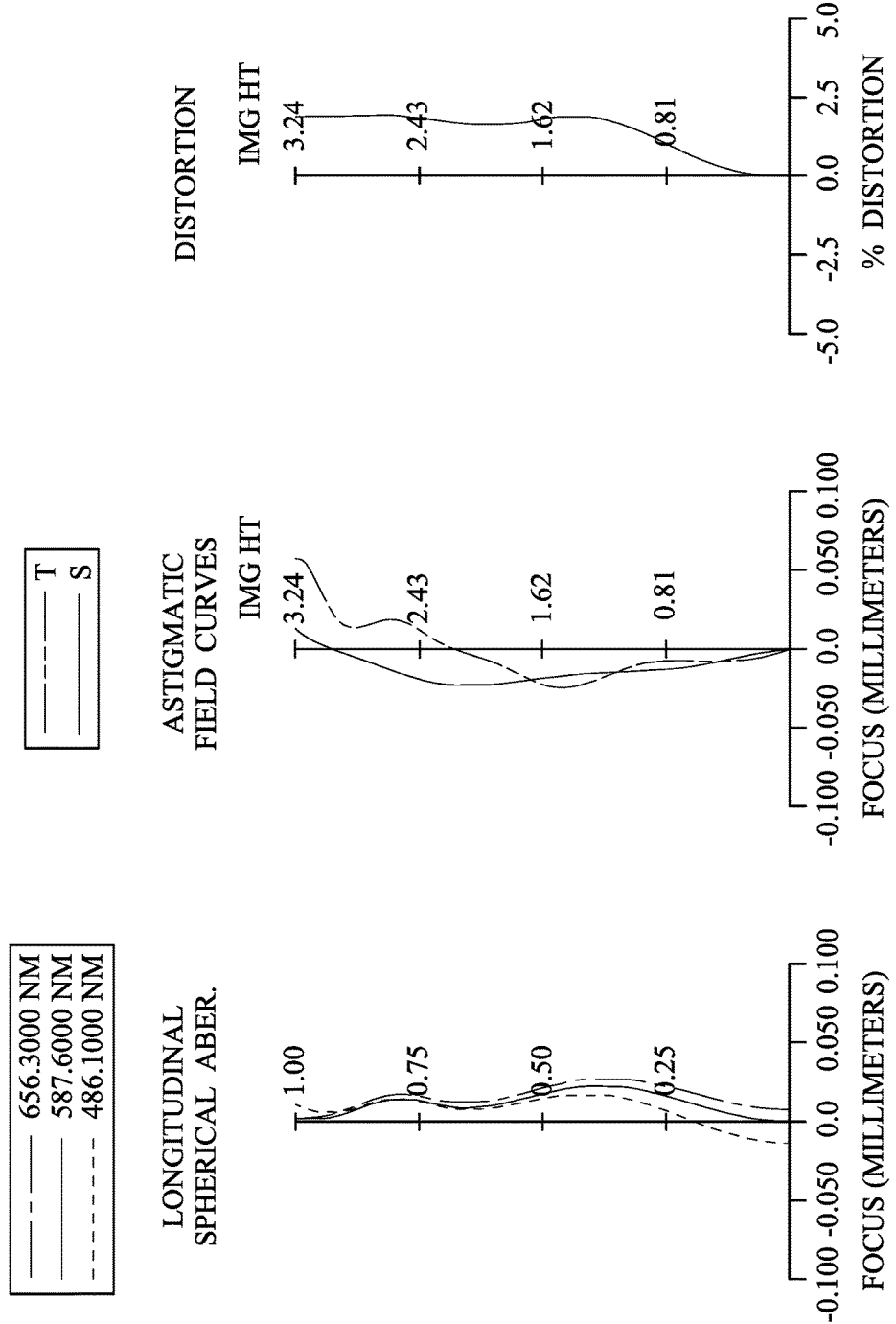
FIG. 10B shows spherical aberration curves, astigmatic field curves and a distortion curve of Mode 2 of the imaging apparatus according to the 5th embodiment.

FIG. 9 is a schematic view of an imaging apparatus according to the 5th embodiment of the present disclosure. FIG. 10A shows spherical aberration curves, astigmatic field curves and a distortion curve of Mode 1 of the imaging apparatus according to the 5th embodiment, and FIG. 10B shows spherical aberration curves, astigmatic field curves and a distortion curve of Mode 2 of the imaging apparatus according to the 5th embodiment, wherein Mode 1 and Mode 2 are two modes of the imaging apparatus at two different focusing conditions, and the detailed conditions are shown in Table 5C below. In FIG. 9, the imaging apparatus includes an image capturing lens assembly (its reference numeral is omitted) and an image sensor 590. The image capturing lens assembly includes, in order from an object side to an image side, a focus tunable component 595, an aperture stop 500, a first lens element 510, a second lens element 520, a third lens element 530, a fourth lens element 540, a fifth lens element 550, a sixth lens element 560, a filter 570 and an image surface 580, and the image sensor 590 is disposed on the image surface 580 of the image capturing lens assembly, wherein the image capturing lens assembly includes the focus tunable component 595 and an imaging lens system (its reference numeral is omitted), and the imaging lens system includes the six lens elements (510, 520, 530, 540, 550, 560) without additional one or more lens elements inserted between the first lens element 510 and the sixth lens element 560. The focus tunable component 595 is disposed on an object side of the imaging lens system.

The first lens element 510 with positive refractive power has an object-side surface 511 being convex and an image-side surface 512 being concave. The first lens element 510 is made of a plastic material, and has the object-side surface 511 and the image-side surface 512 being both aspheric.

The second lens element 520 with negative refractive power has an object-side surface 521 being convex and an image-side surface 522 being concave. The second lens element 520 is made of a plastic material, and has the object-side surface 521 and the image-side surface 522 being both aspheric.

The third lens element 530 with positive refractive power has an object-side surface 531 being convex and an image-side surface 532 being convex. The third lens element 530 is made of a plastic material, and has the object-side surface 531 and the image-side surface 532 being both aspheric.

The fourth lens element 540 with negative refractive power has an object-side surface 541 being concave and an image-side surface 542 being convex. The fourth lens element 540 is made of a plastic material, and has the object-side surface 541 and the image-side surface 542 being both aspheric.

The fifth lens element 550 with positive refractive power has an object-side surface 551 being convex and an image-side surface 552 being concave. The fifth lens element 550 is made of a plastic material, and has the object-side surface 551 and the image-side surface 552 being both aspheric. Furthermore, each of the object-side surface 551 and the image-side surface 552 of the fifth lens element 550 includes at least one inflection point.

The sixth lens element 560 with negative refractive power has an object-side surface 561 being convex and an image-side surface 562 being concave. The sixth lens element 560 is made of a plastic material, and has the object-side surface 561 and the image-side surface 562 being both aspheric. Furthermore, each of the object-side surface 561 and the image-side surface 562 of the sixth lens element 560 includes at least one inflection point, and each of the object-side surface 561 and the image-side surface 562 of the sixth lens element 560 includes at least one critical point.

The filter 570 is made of a glass material and located between the sixth lens element 560 and the image surface 580, and will not affect the focal length of the image capturing lens assembly.

Furthermore, the focus tunable component 595 can be any one disclosed in the 1st embodiment. The detailed optical data and parameters of the focus tunable component 595 are disclosed in the following 7th and 8th embodiments, and will not describe again herein.

The detailed optical data of the 5th embodiment are shown in Table 5A and the aspheric surface data are shown in Table 5B below.

TABLE 5A

5th Embodiment

| Surface # |  | Curvature Radius |  | Thickness | Material | Index | Abbe # | Focal Length |
|---|---|---|---|---|---|---|---|---|
| 0 | Object | Plano |  | Obj. |  |  |  |  |
| 1 | Ape. Stop | Plano |  | −0.309 |  |  |  |  |
| 2 | Lens 1 | 1.444 | ASP | 0.606 | Plastic | 1.544 | 55.9 | 3.48 |
| 3 |  | 5.208 | ASP | 0.050 |  |  |  |  |
| 4 | Lens 2 | 5.754 | ASP | 0.230 | Plastic | 1.660 | 20.4 | −10.11 |
| 5 |  | 3.041 | ASP | 0.217 |  |  |  |  |
| 6 | Lens 3 | 7.707 | ASP | 0.381 | Plastic | 1.544 | 55.9 | 9.81 |
| 7 |  | −17.030 | ASP | 0.240 |  |  |  |  |
| 8 | Lens 4 | −2.295 | ASP | 0.308 | Plastic | 1.639 | 23.3 | −17.49 |
| 9 |  | −3.039 | ASP | 0.156 |  |  |  |  |
| 10 | Lens 5 | 2.526 | ASP | 0.489 | Plastic | 1.544 | 55.9 | 46.68 |
| 11 |  | 2.613 | ASP | 0.313 |  |  |  |  |
| 12 | Lens 6 | 2.124 | ASP | 0.573 | Plastic | 1.544 | 55.9 | −11.32 |
| 13 |  | 1.429 | ASP | 0.408 |  |  |  |  |
| 14 | Filter | Plano |  | 0.210 | Glass | 1.517 | 64.2 | — |
| 15 |  | Plano |  | Imd. |  |  |  |  |
| 16 | Image | Plano |  | — |  |  |  |  |

Reference wavelength is 587.6 nm.

TABLE 5B

Aspheric Coefficients

| Surface # | 2 | 3 | 4 | 5 | 6 | 7 |
|---|---|---|---|---|---|---|
| k = | −1.8760E−01 | −6.3927E+01 | −4.9023E+01 | −8.6585E−01 | −1.9011E+01 | 1.5945E+01 |
| A4 = | −7.7551E−04 | −2.5201E−01 | −4.1217E−01 | −2.3254E−01 | −1.2622E−01 | −3.3927E−02 |
| A6 = | 1.4992E−03 | 7.0275E−01 | 1.3532E+00 | 7.7266E−01 | −3.0441E−01 | −4.5252E−01 |
| A8 = | 1.5291E−01 | −1.1855E+00 | −2.6145E+00 | −1.2655E+00 | 1.2153E+00 | 1.4194E+00 |
| A10 = | −4.6826E−01 | 1.3420E+00 | 3.3923E+00 | 1.2065E+00 | −2.6813E+00 | −3.0688E+00 |
| A12 = | 5.5512E−01 | −1.0467E+00 | −2.6024E+00 | −4.2383E−01 | 2.8527E+00 | 3.9619E+00 |
| A14 = | −2.5262E−01 | 3.4843E−01 | 8.4386E−01 | 2.4846E−02 | −1.0232E+00 | −2.6115E+00 |
| A16 = |  |  |  |  |  | 7.1557E−01 |

| Surface # | 8 | 9 | 10 | 11 | 12 | 13 |
|---|---|---|---|---|---|---|
| k = | 1.0810E+00 | −3.6035E+01 | −1.1661E+00 | −3.1101E+01 | −4.1035E+00 | −1.7386E+00 |
| A4 = | 7.3959E−02 | −2.2249E−01 | −1.5186E−01 | 4.4023E−02 | −3.0929E−01 | −2.6053E−01 |
| A6 = | −1.1558E−01 | 3.8910E−01 | 1.3636E−01 | −7.0853E−02 | 1.5618E−01 | 1.4846E−01 |
| A8 = | 1.0828E−01 | −6.2277E−01 | −2.3156E−01 | 2.6576E−02 | −5.8913E−02 | −6.7386E−02 |
| A10 = | 1.6442E−04 | 7.6888E−01 | 2.0786E−01 | −5.0024E−03 | 1.7421E−02 | 1.9922E−02 |
| A12 = | 4.3585E−02 | −5.2023E−01 | −1.0637E−01 | −2.4911E−06 | −3.2751E−03 | −3.4587E−03 |
| A14 = | −7.4042E−02 | 1.7220E−01 | 2.8657E−02 | 1.7323E−04 | 3.3233E−04 | 3.1821E−04 |
| A16 = | 1.6757E−02 | −2.2141E−02 | −3.0616E−03 | −1.9648E−05 | −1.3829E−05 | −1.1903E−05 |

In the 5th embodiment, the equation of the aspheric surface profiles of the aforementioned lens elements is the same as the equation of the 1st embodiment. Also, the definitions of these parameters shown in the following Table 5C and Table 5D are the same as those stated in the 1st embodiment with corresponding values for the 5th embodiment, so an explanation in this regard will not be provided again.

Moreover, in the 5th embodiment, the values of the parameters under Mode 1 and Mode 2 are shown in Tables 5C and 5D below.

TABLE 5C

| 5th Embodiment | | |
|---|---|---|
| | Mode 1 | Mode 2 |
| Obj. [mm] | 1500.000 | 300.000 |
| ft [mm] | −153.56 | −261.41 |
| CTt [mm] | 0.400 | 0.400 |
| Dstr [mm] | 0.357 | 0.359 |
| Imd. [mm] | 0.342 | 0.340 |

TABLE 5D

| 5th Embodiment | | | | | |
|---|---|---|---|---|---|
| | Mode 1 | Mode 2 | | Mode 1 | Mode 2 |
| f [mm] | 3.75 | 3.70 | TL/\|Δft\| | 0.046 | |
| Fno. | 2.09 | 2.09 | TL/tan(HFOV) | 5.89 | 5.91 |
| HFOV [deg.] | 40.2 | 40.1 | BL/f | 0.26 | 0.26 |
| tan(HFOV) | 0.84 | 0.84 | Ycx/f, x = 1 | 0.18 | 0.18 |
| Obj. [mm] | 1500.00 | 300.00 | Ycx/f, x = 2 | 0.30 | 0.30 |
| Dtl/CTt | 0.12 | 0.13 | \|Dstr/Dstf\| | 0.47 | 0.47 |
| CTt/TDi | 0.11 | 0.11 | Nmax | 1.660 | |
| (R1 + R2)/(R1 − R2) | −1.77 | −1.77 | CRA [deg.] | 36.5 | 36.5 |
| \|fi\| | 3.63 | | \|(CRA − MRA)/CRA\| | 0.19 | 0.19 |
| \|ft\| | 153.56 | 261.41 | | 0.22 | 0.21 |
| \|fi/ft\| | 0.024 | 0.014 | \|(CRH − MRH) × 10\| | 0.23 | 0.09 |
| f/f1 | 1.08 | 1.06 | [mm] | 0.05 | 0.10 |
| \|f/ft\| | 0.024 | 0.014 | \|DIST\| | 1.65% | 1.91% |
| \|Δ(f/ft)\| | 0.0103 | | N | 6 | |
| TL/ImgH | 1.53 | | | | |

6th Embodiment

Figure 11:
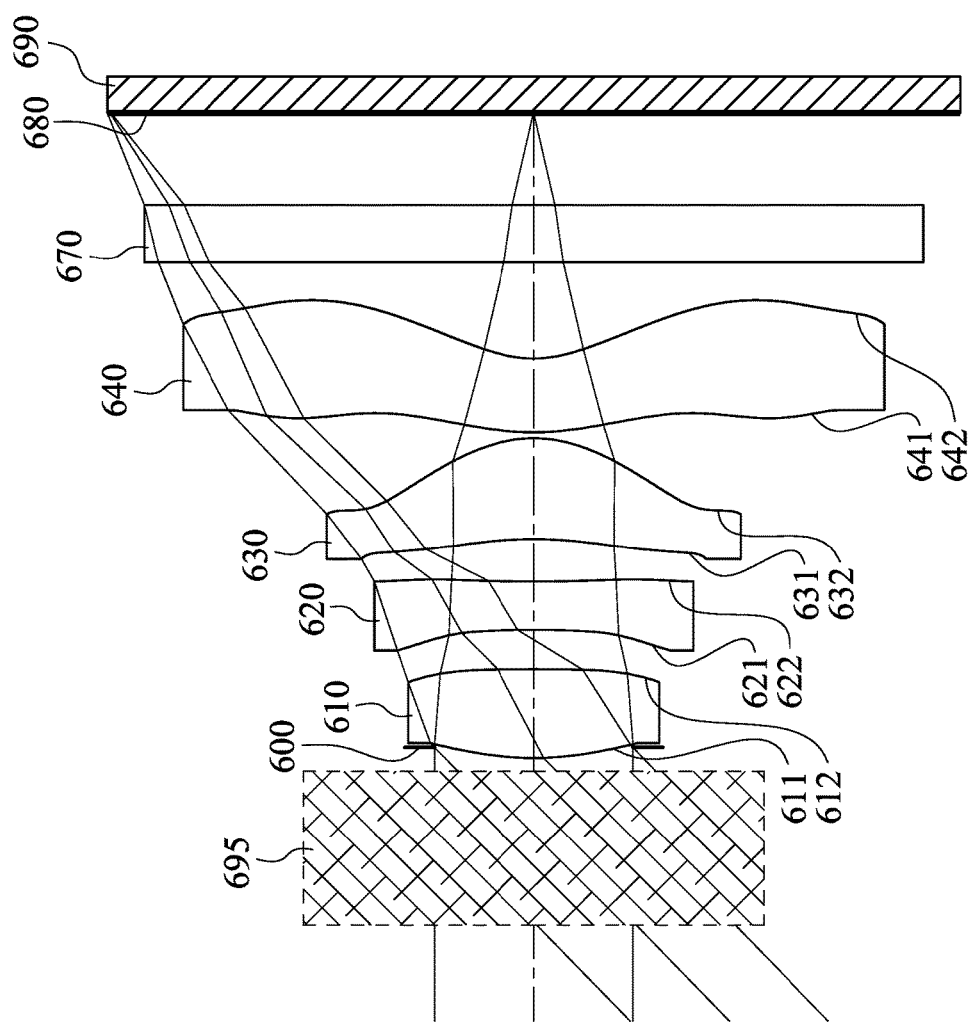
FIG. 11 is a schematic view of an imaging apparatus according to the 6th embodiment of the present disclosure.
Figure 12A:
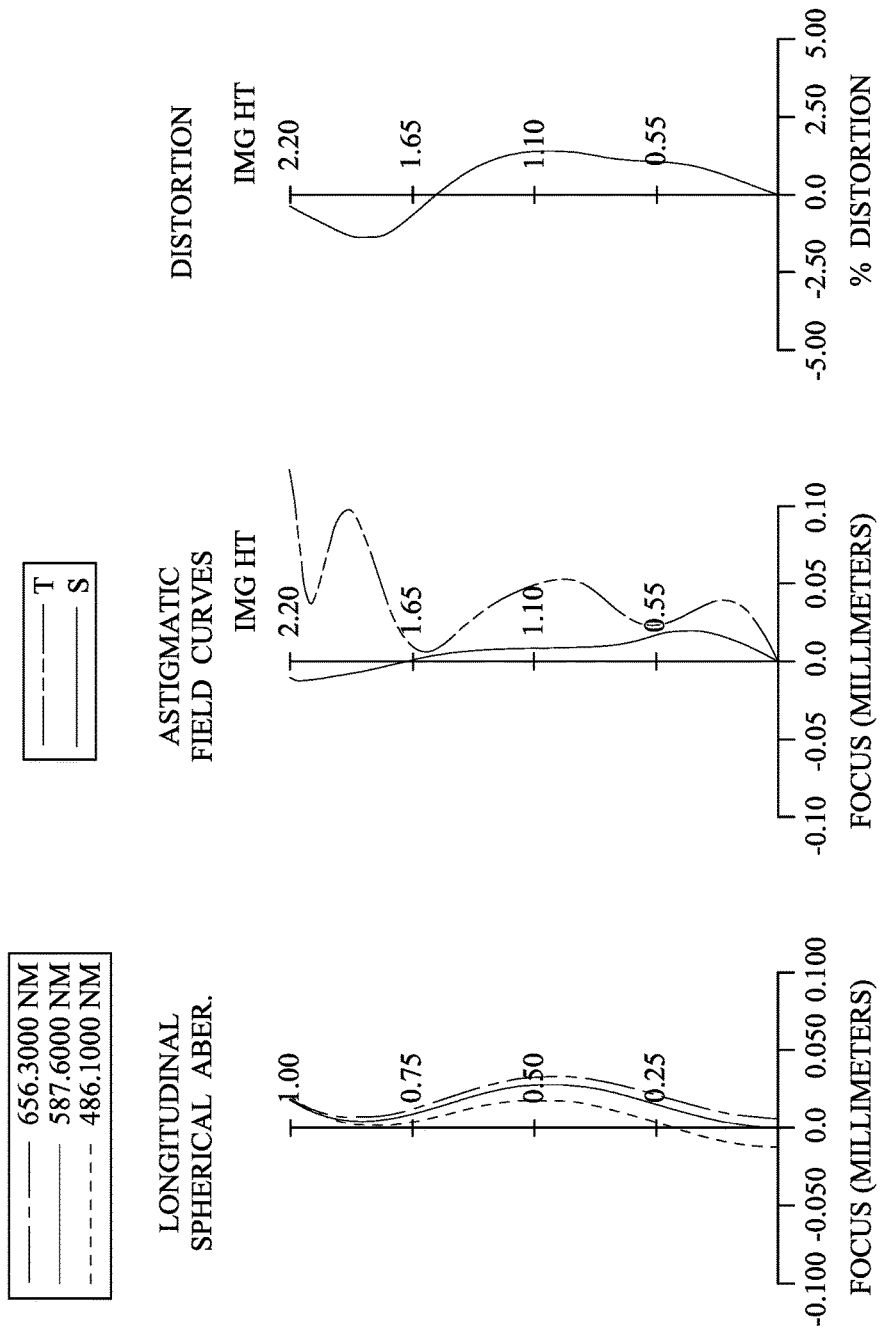
FIG. 12A shows spherical aberration curves, astigmatic field curves and a distortion curve of Mode 1 of the imaging apparatus according to the 6th embodiment.
Figure 12B:
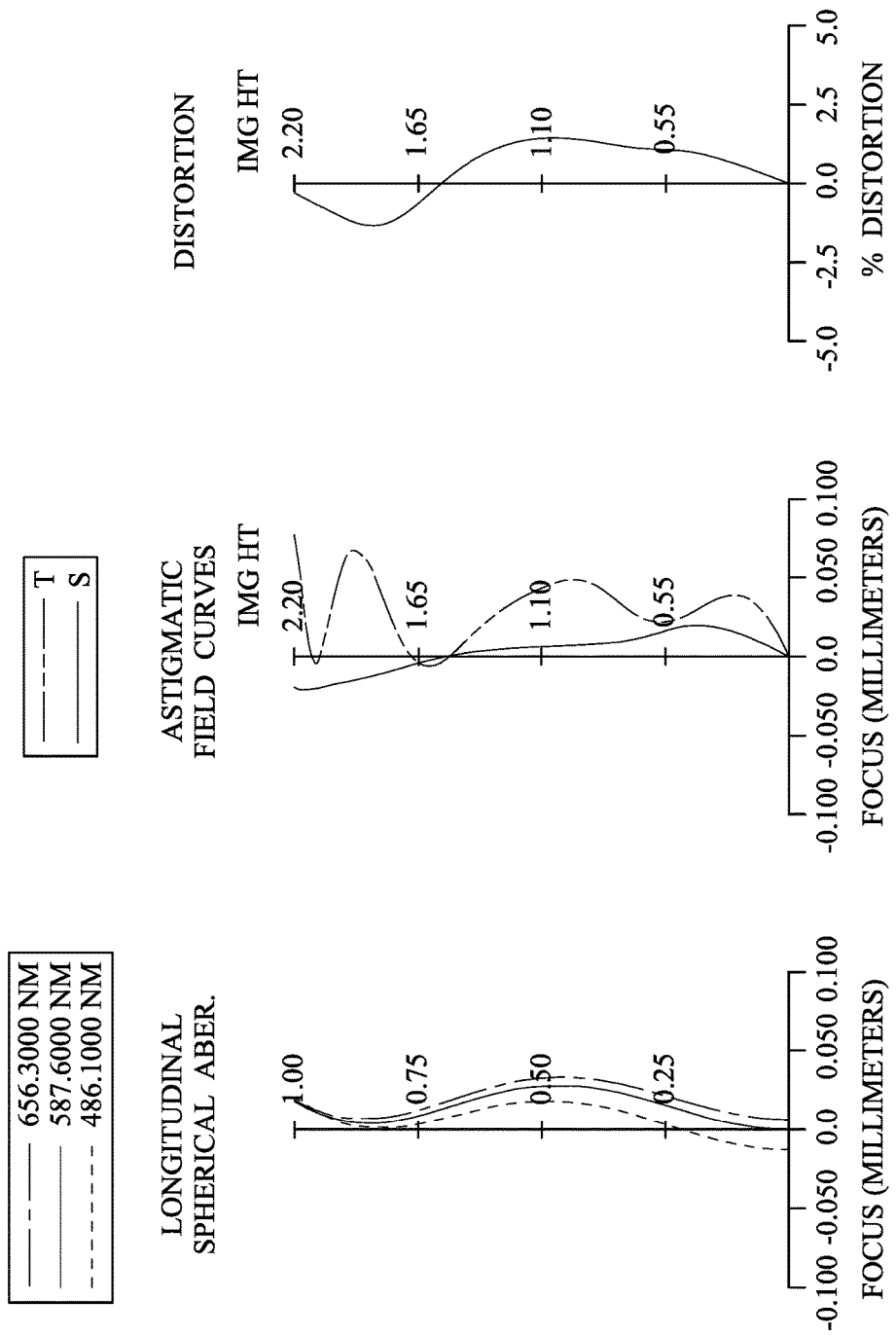
FIG. 12B shows spherical aberration curves, astigmatic field curves and a distortion curve of Mode 2 of the imaging apparatus according to the 6th embodiment.

FIG. 11 is a schematic view of an imaging apparatus according to the 6th embodiment of the present disclosure. FIG. 12A shows spherical aberration curves, astigmatic field curves and a distortion curve of Mode 1 of the imaging apparatus according to the 6th embodiment, and FIG. 12B shows spherical aberration curves, astigmatic field curves and a distortion curve of Mode 2 of the imaging apparatus according to the 6th embodiment, wherein Mode 1 and Mode 2 are two modes of the imaging apparatus at two different focusing conditions, and the detailed conditions are shown in Table 6C below. In FIG. 11, the imaging apparatus includes an image capturing lens assembly (its reference numeral is omitted) and an image sensor 690. The image capturing lens assembly includes, in order from an object side to an image side, a focus tunable component 695, an aperture stop 600, a first lens element 610, a second lens element 620, a third lens element 630, a fourth lens element 640, a filter 670 and an image surface 680, and the image sensor 690 is disposed on the image surface 680 of the image capturing lens assembly, wherein the image capturing lens assembly includes the focus tunable component 695 and an imaging lens system (its reference numeral is omitted), and the imaging lens system includes the four lens elements (610, 620, 630, 640) without additional one or more lens elements inserted between the first lens element 610 and the fourth lens element 640. The focus tunable component 695 is disposed on an object side of the imaging lens system.

The first lens element 610 with positive refractive power has an object-side surface 611 being convex and an image-side surface 612 being convex. The first lens element 610 is made of a plastic material, and has the object-side surface 611 and the image-side surface 612 being both aspheric.

The second lens element 620 with negative refractive power has an object-side surface 621 being concave and an image-side surface 622 being concave. The second lens element 620 is made of a plastic material, and has the object-side surface 621 and the image-side surface 622 being both aspheric.

The third lens element 630 with positive refractive power has an object-side surface 631 being concave and an image-side surface 632 being convex. The third lens element 630 is made of a plastic material, and has the object-side surface 631 and the image-side surface 632 being both aspheric.

The fourth lens element 640 with negative refractive power has an object-side surface 641 being convex and an image-side surface 642 being concave. The fourth lens element 640 is made of a plastic material, and has the object-side surface 641 and the image-side surface 642 being both aspheric. Furthermore, each of the object-side surface 641 and the image-side surface 642 of the fourth lens element 640 includes at least one inflection point, and each of the object-side surface 641 and the image-side surface 642 of the fourth lens element 640 includes at least one critical point.

The filter 670 is made of a glass material and located between the fourth lens element 640 and the image surface 680, and will not affect the focal length of the image capturing lens assembly.

Furthermore, the focus tunable component 695 can be any one disclosed in the 1st embodiment. The detailed optical data and parameters of the focus tunable component 695 are disclosed in the following 7th and 8th embodiments, and will not describe again herein.

The detailed optical data of the 6th embodiment are shown in Table 6A and the aspheric surface data are shown in Table 6B below.

TABLE 6A

6th Embodiment

| Surface # | | Curvature Radius | | Thickness | Material | Index | Abbe # | Focal Length |
|---|---|---|---|---|---|---|---|---|
| 0 | Object | Plano | | Obj. | | | | |
| 1 | Ape. Stop | Plano | | −0.055 | | | | |
| 2 | Lens 1 | 1.710 | ASP | 0.461 | Plastic | 1.544 | 55.9 | 2.88 |
| 3 | | −17.219 | ASP | 0.204 | | | | |
| 4 | Lens 2 | −8.239 | ASP | 0.251 | Plastic | 1.660 | 20.4 | −5.87 |
| 5 | | 7.394 | ASP | 0.223 | | | | |
| 6 | Lens 3 | −1.992 | ASP | 0.525 | Plastic | 1.544 | 55.9 | 1.58 |
| 7 | | −0.656 | ASP | 0.030 | | | | |
| 8 | Lens 4 | 1.448 | ASP | 0.383 | Plastic | 1.544 | 55.9 | −2.29 |
| 9 | | 0.607 | ASP | 0.500 | | | | |
| 10 | Filter | Plano | | 0.300 | Glass | 1.563 | 51.3 | — |
| 11 | | Plano | | Imd. | | | | |
| 12 | Image | Plano | | — | | | | |

Reference wavelength is 587.6 nm.

TABLE 6B

Aspheric Coefficients

| Surface # | 2 | 3 | 4 | 5 |
|---|---|---|---|---|
| k = | −1.7061E+00 | −9.0000E+01 | −7.0899E+01 | −6.6462E+00 |
| A4 = | −4.9324E−03 | −1.6379E−01 | −3.9692E−01 | −8.0141E−02 |
| A6 = | −3.1796E−01 | −1.0479E+00 | 2.8055E−01 | 3.0224E−01 |
| A8 = | 6.9124E−01 | 2.7456E+00 | −6.0518E+00 | −2.3024E+00 |
| A10 = | −1.5357E+00 | −2.6166E+00 | 2.1292E+01 | 4.4060E+00 |
| A12 = | | | −1.9314E+01 | −2.5415E+00 |

| Surface # | 6 | 7 | 8 | 9 |
|---|---|---|---|---|
| k = | 3.7717E+00 | −4.9531E+00 | −5.1980E+00 | −4.2979E+00 |
| A4 = | 2.8130E−01 | −8.7915E−01 | −2.3754E−01 | −1.0079E−01 |
| A6 = | 4.1220E−01 | 2.4831E+00 | 1.8308E−01 | −6.0695E−02 |
| A8 = | −6.2604E−01 | −4.4180E+00 | −3.5337E−01 | 1.1519E−01 |
| A10 = | −1.3016E−01 | 4.5751E+00 | 4.2489E−01 | −8.5095E−02 |
| A12 = | 3.1686E−01 | −1.1146E+00 | −2.3719E−01 | 3.3132E−02 |
| A14 = | 1.0123E+00 | −1.2833E+00 | 6.2971E−02 | −6.3011E−03 |
| A16 = | −9.2717E−01 | 6.2356E−01 | −6.5382E−03 | 4.5059E−04 |

In the 6th embodiment, the equation of the aspheric surface profiles of the aforementioned lens elements is the same as the equation of the 1st embodiment. Also, the definitions of these parameters shown in the following Table 6C and Table 6D are the same as those stated in the 1st embodiment with corresponding values for the 6th embodiment, so an explanation in this regard will not be provided again.

Moreover, in the 6th embodiment, the values of the parameters under Mode 1 and Mode 2 are shown in Tables 6C and 6D below.

TABLE 6C

6th Embodiment

| | Mode 1 | Mode 2 |
|---|---|---|
| Obj. [mm] | Infinity | 370.000 |
| ft [mm] | −203.32 | −382.34 |
| CTt [mm] | 0.800 | 0.800 |
| Dstr [mm] | 0.125 | 0.125 |
| Imd. [mm] | 0.478 | 0.478 |

TABLE 6D

6th Embodiment

| | Mode 1 | Mode 2 | | Mode 1 | Mode 2 |
|---|---|---|---|---|---|
| f [mm] | 2.27 | 2.26 | TL/\|Δft\| | 0.024 | |
| Fno. | 2.20 | 2.20 | TL/tan(HFOV) | 4.36 | 4.36 |
| HFOV [deg.] | 44.1 | 44.1 | BL/f | 0.56 | 0.57 |
| tan(HFOV) | 0.97 | 0.97 | Ycx/f, x = 1 | 0.37 | 0.37 |
| Obj. [mm] | Infinity | 370.0 | Ycx/f, x = 2 | 0.51 | 0.51 |
| Dt1/CTt | 0.09 | 0.09 | \|Dstr/Dstf\| | 0.14 | 0.14 |
| CTt/TDi | 0.39 | 0.39 | Nmax | 1.660 | |
| (R1 + R2)/(R1 − R2) | −0.82 | −0.82 | CRA [deg.] | 32.6 | 32.6 |
| \|ft\| | 2.25 | | \|(CRA − MRA)/CRA\| | 0.33 | 0.33 |

TABLE 6D-continued

| | 6th Embodiment | | | | | |
|---|---|---|---|---|---|---|
| | Mode 1 | Mode 2 | | | Mode 1 | Mode 2 |
| \|ft\| | 203.32 | 382.34 | | | 0.18 | 0.18 |
| \|fi/ft\| | 0.011 | 0.006 | \|(CRH − MRH) × 10\| | | 0.14 | 0.13 |
| f/f1 | 0.79 | 0.78 | [mm] | | 0.05 | 0.00 |
| \|f/ft\| | 0.011 | 0.006 | \|DIST\| | | 0.36% | 0.28% |
| \|Δ(f/ft)\| | 0.0050 | | N | | 4 | |
| TL/ImgH | 1.92 | | | | | |

7th Embodiment

Figure 13:
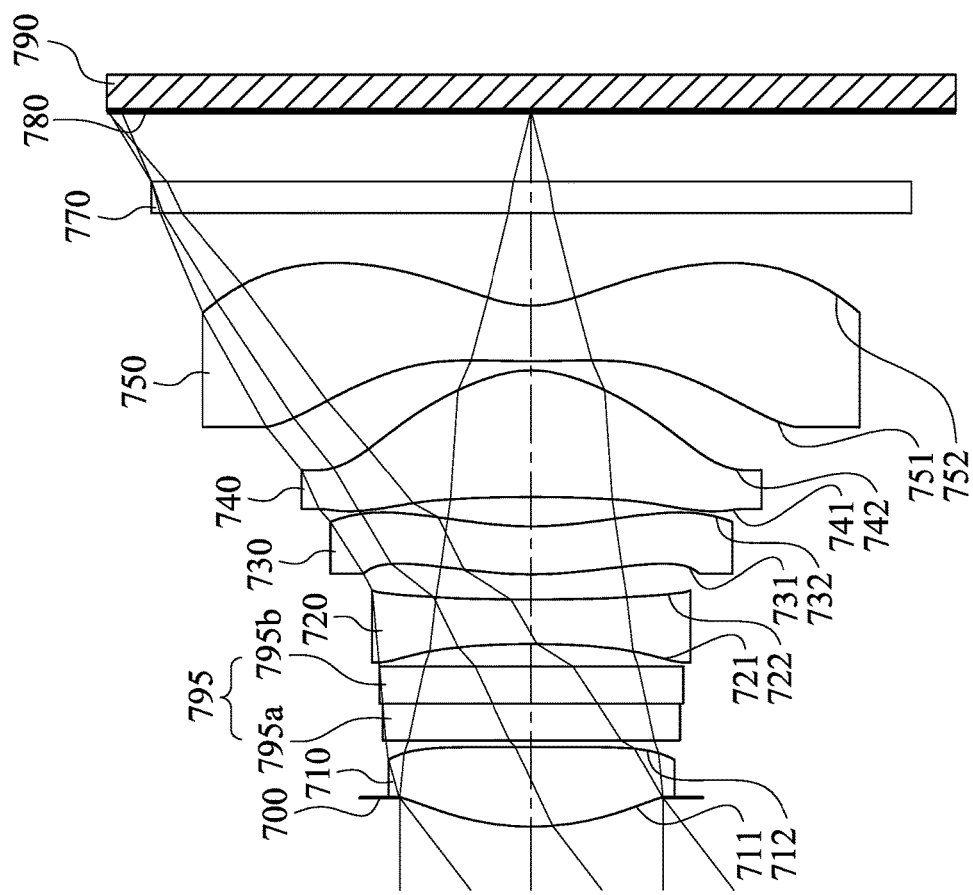
FIG. 13 is a schematic view of an imaging apparatus according to the 7th embodiment of the present disclosure.
Figure 14A:
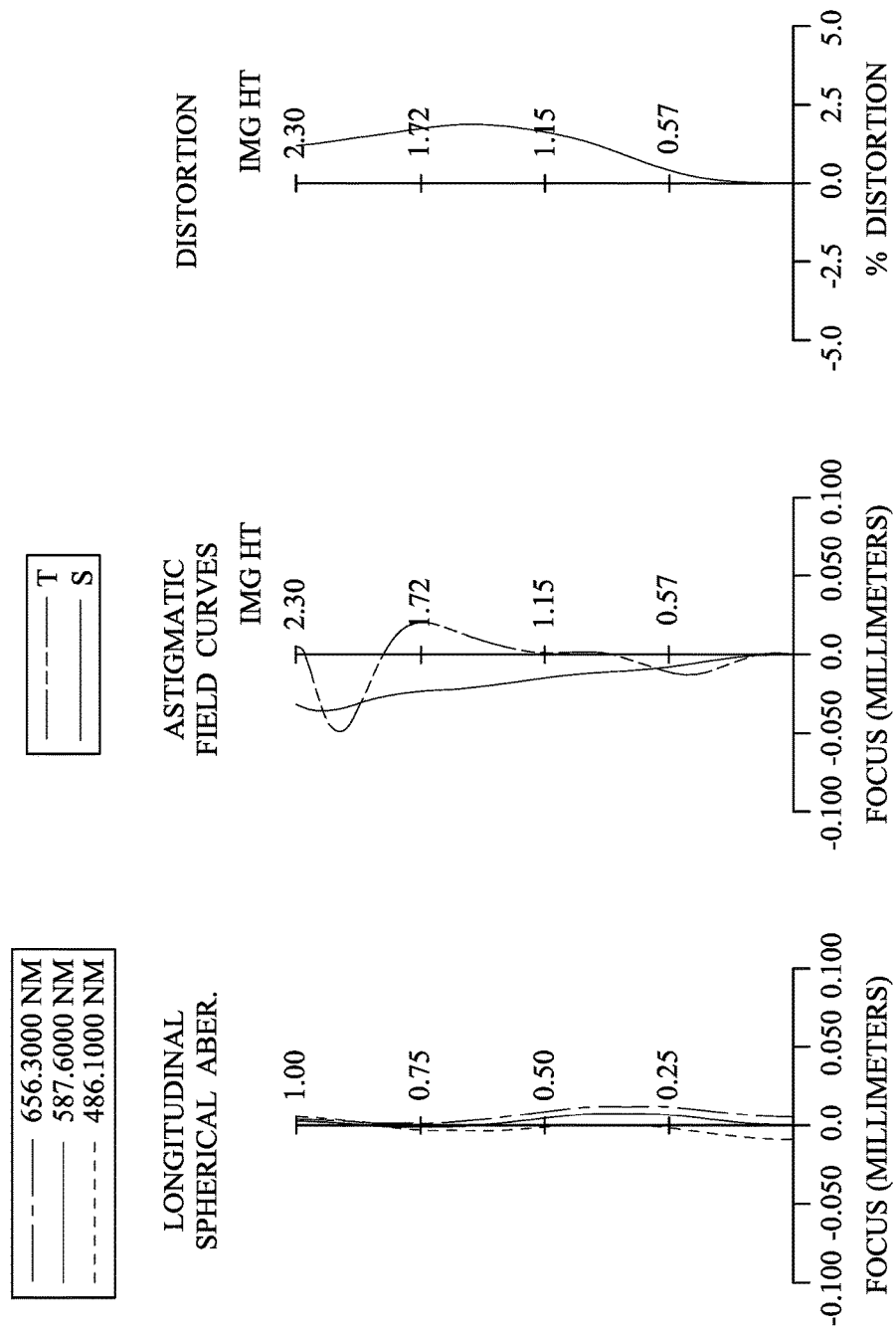
FIG. 14A shows spherical aberration curves, astigmatic field curves and a distortion curve of Mode 1 of the imaging apparatus according to the 7th embodiment.
Figure 14B:
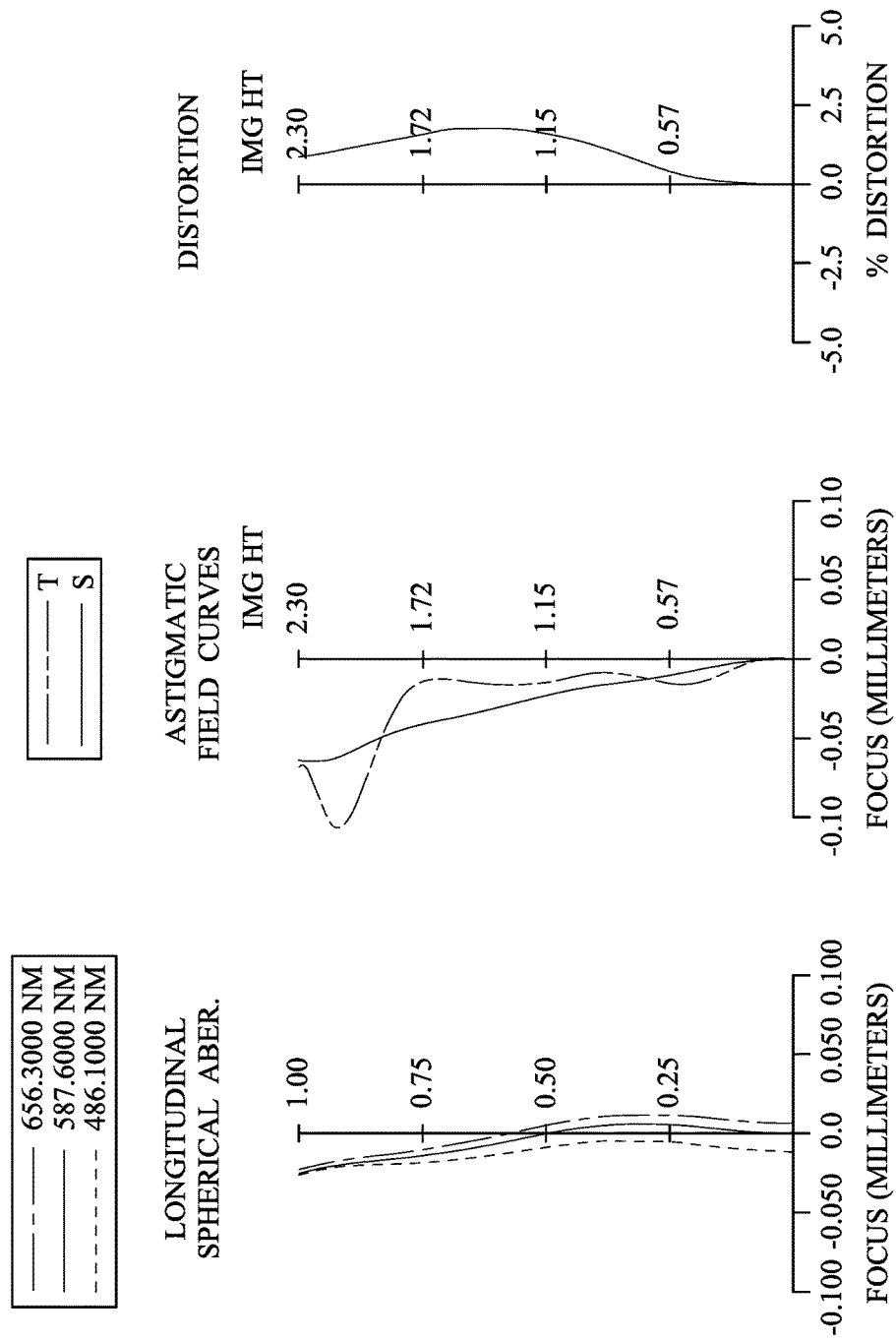
FIG. 14B shows spherical aberration curves, astigmatic field curves and a distortion curve of Mode 2 of the imaging apparatus according to the 7th embodiment.

FIG. 13 is a schematic view of an imaging apparatus according to the 7th embodiment of the present disclosure. FIG. 14A shows spherical aberration curves, astigmatic field curves and a distortion curve of Mode 1 of the imaging apparatus according to the 7th embodiment, and FIG. 14B shows spherical aberration curves, astigmatic field curves and a distortion curve of Mode 2 of the imaging apparatus according to the 7th embodiment, wherein Mode 1 and Mode 2 are two modes of the imaging apparatus at two different focusing to conditions, and the detailed conditions are shown in Table 7C below. In FIG. 13, the imaging apparatus includes an image capturing lens assembly (its reference numeral is omitted) and an image sensor 790. The image capturing lens assembly includes, in order from an object side to an image side, an aperture stop 700, a first lens element 710, a focus tunable component 795, a second lens element 720, a third lens element 730, a fourth lens element 740, a fifth lens element 750, a filter 770 and an image surface 780, and the image sensor 790 is disposed on the image surface 780 of the image capturing lens assembly, wherein the image capturing lens assembly includes the focus tunable component 795 and an imaging lens system (its reference numeral is omitted), and the imaging lens system includes the five lens elements (710, 720, 730, 740, 750) without additional one or more lens elements inserted between the first lens element 710 and the fifth lens element 750.

The first lens element 710 with positive refractive power has an object-side surface 711 being convex and an image-side surface 712 being concave. The first lens element 710 is made of a plastic material, and has the object-side surface 711 and the image-side surface 712 being both aspheric.

The second lens element 720 with negative refractive power has an object-side surface 721 being concave and an image-side surface 722 being concave. The second lens element 720 is made of a plastic material, and has the object-side surface 721 and the image-side surface 722 being both aspheric.

The third lens element 730 with negative refractive power has an object-side surface 731 being convex and an image-side surface 732 being concave. The third lens element 730 is made of a plastic material, and has the object-side surface 731 and the image-side surface 732 being both aspheric.

The fourth lens element 740 with positive refractive power has an object-side surface 741 being concave and an image-side surface 742 being convex. The fourth lens element 740 is made of a plastic material, and has the object-side surface 741 and the image-side surface 742 being both aspheric.

The fifth lens element 750 with negative refractive power has an object-side surface 751 being convex and an image-side surface 752 being concave. The fifth lens element 750 is made of a plastic material, and has the object-side surface 751 and the image-side surface 752 being both aspheric. Furthermore, each of the object-side surface 751 and the image-side surface 752 of the fifth lens element 750 includes at least one inflection point, and each of the object-side surface 751 and the image-side surface 752 of the fifth lens element 750 includes at least one critical point.

The filter 770 is made of a glass material and located between the fifth lens element 750 and the image surface 780, and will not affect the focal length of the image capturing lens assembly.

Furthermore, according to the 7th embodiment, the focus tunable component 795 is a liquid lens set, which include a flexible film 795a and a glass base 795b, and a liquid material is disposed therebetween. The flexible film 795a is a polymer material.

The detailed optical data of the 7th embodiment are shown in Table 7A and the aspheric surface data are shown in Table 7B below,

TABLE 7A

7th Embodiment

| Surface # | | Curvature Radius | | Thickness | Material | Index | Abbe # | Focal Length |
|---|---|---|---|---|---|---|---|---|
| 0 | Object | Plano | | Obj. | | | | |
| 1 | Ape. Stop | Plano | | −0.156 | | | | |
| 2 | Lens 1 | 1.446 | ASP | 0.434 | Plastic | 1.545 | 56.0 | 2.75 |
| 3 | | 35.821 | ASP | 0.037 | | | | |
| 4 | Focus tunable | Rt | | 0.200 | Polymer | 1.565 | 20.4 | ft |
| 5 | component | Plano | | 0.200 | Glass | 1.532 | 48.8 | |
| 6 | | Plano | | 0.123 | | | | |
| 7 | Lens 2 | −4.330 | ASP | 0.240 | Plastic | 1.660 | 20.4 | −4.94 |
| 8 | | 13.446 | ASP | 0.137 | | | | |
| 9 | Lens 3 | 2.176 | ASP | 0.260 | Plastic | 1.660 | 20.4 | −40.26 |
| 10 | | 1.916 | ASP | 0.159 | | | | |
| 11 | Lens 4 | −8.319 | ASP | 0.691 | Plastic | 1.544 | 56.0 | 1.14 |
| 12 | | −0.594 | ASP | 0.050 | | | | |

TABLE 7A-continued

7th Embodiment

| Surface # | | Curvature Radius | Thickness | Material | Index | Abbe # | Focal Length |
|---|---|---|---|---|---|---|---|
| 13 | Lens 5 | 6.320 ASP | 0.301 | Plastic | 1.534 | 55.9 | −1.13 |
| 14 | | 0.542 ASP | 0.500 | | | | |
| 15 | Filter | Plano | 0.175 | Glass | 1.517 | 64.2 | — |
| 16 | | Plano | Imd. | | | | |
| 17 | Image | Plano | — | | | | |

Reference wavelength is 587.6 nm.

TABLE 7B

Aspheric Coefficients

| Surface # | 2 | 3 | 7 | 8 | 9 |
|---|---|---|---|---|---|
| k = | −8.1768E+00 | 2.0001E+01 | 1.7653E−01 | −5.0000E+01 | 3.5518E+00 |
| A4 = | 2.8864E−01 | −6.5458E−02 | 3.1469E−02 | 3.8839E−02 | −3.9877E−01 |
| A6 = | −4.1041E−01 | −2.5637E−01 | −4.8191E−01 | 2.8945E−01 | 5.5871E−01 |
| A8 = | 3.6313E−01 | 3.4474E−01 | 1.1390E+00 | −1.9646E+00 | −1.2114E+00 |
| A10 = | −7.5731E−01 | −7.4969E−01 | −2.6985E+00 | 5.1117E+00 | 1.4049E+00 |
| A12 = | 1.1605E+00 | 4.8080E−01 | 3.8031E+00 | −6.4240E+00 | −8.6197E−01 |
| A14 = | −1.3289E+00 | −2.1401E−01 | −1.6638E+00 | 3.2369E+00 | |

| Surface # | 10 | 11 | 12 | 13 | 14 |
|---|---|---|---|---|---|
| k = | −1.3967E+00 | 4.2899E+01 | −4.8822E+00 | −2.7632E+01 | −5.5558E+00 |
| A4 = | −2.9833E−01 | 1.1783E−01 | −3.2097E−01 | −3.5809E−01 | −2.6077E−01 |
| A6 = | 1.6251E−01 | −7.6439E−01 | 3.8086E−01 | −1.5991E−01 | 2.0664E−01 |
| A8 = | 4.5854E−03 | 1.2389E+00 | −7.4271E−01 | 8.0515E−01 | −1.0748E−01 |
| A10 = | −1.3327E−01 | −8.2174E−01 | 9.9347E−01 | −8.6213E−01 | 3.0647E−02 |
| A12 = | 6.3589E−02 | 2.7013E−01 | −5.2994E−01 | 4.4998E−01 | −3.9559E−03 |
| A14 = | | −4.2322E−02 | 9.5643E−02 | −1.1651E−01 | −3.2701E−05 |
| A16 = | | | | 1.1931E−02 | 4.3004E−05 |

In the 7th embodiment, the equation of the aspheric surface profiles of the aforementioned lens elements is the same as the equation of the 1st embodiment, and a curvature radius of a surface of the focus tunable component 795 closest to the object side is Rt. Also, the definitions of these parameters shown in the following Table 7C and Table 7D are the same as those stated in the 1st embodiment with corresponding values for the 7th embodiment, so an explanation in this regard will not be provided again.

Moreover, in the 7th embodiment, the values of the parameters under Mode 1 and Mode 2 are shown in Tables 7C and 7D below.

TABLE 7C

| | 7th Embodiment | |
|---|---|---|
| | Mode 1 | Mode 2 |
| Obj. [mm] | Infinity | 100.000 |
| ft [mm] | Infinity | 92.92 |
| Rt [mm] | Infinity | 52.500 |
| CTt [mm] | 0.400 | 0.400 |
| Dstr [mm] | 0.715 | 0.715 |
| Imd. [mm] | 0.382 | 0.382 |

TABLE 7D

7th Embodiment

| | Mode 1 | Mode 2 | | Mode 1 | Mode 2 |
|---|---|---|---|---|---|
| f [mm] | 2.96 | 2.87 | TL/\|Δft\| | 0.000 | |
| Fno. | 2.07 | 2.07 | TL/tan(HFOV) | 5.07 | 5.05 |
| HFOV [deg.] | 37.5 | 37.6 | BL/f | 0.36 | 0.37 |
| tan(HFOV) | 0.77 | 0.77 | Ycx/f, x = 1 | 0.11 | 0.12 |
| Obj. [mm] | Infinity | 100.00 | Ycx/f, x = 2 | 0.37 | 0.38 |
| Dt1/CTt | 1.18 | 1.18 | \|Dstr/Dstf\| | 2.27 | 2.27 |
| CTt/TDi | 0.14 | 0.14 | Nmax | 1.660 | |
| (R1 + R2)/(R1 − R2) | −1.08 | −1.08 | CRA [deg.] | 31.5 | 31.5 |
| \|fi\| | 2.96 | 2.87 | \|(CRA − MRA)/CRA\| | 0.26 | 0.26 |
| \|ft\| | Infinity | 92.92 | | 0.28 | 0.28 |
| \|fi/ft\| | 0.000 | 0.031 | \|(CRH − MRH) × 10\| | 0.71 | 1.13 |
| f/f1 | 1.07 | 1.04 | [mm] | 0.07 | 0.34 |
| \|f/ft\| | 0.000 | 0.031 | \|DIST\| | 1.21% | 0.86% |

TABLE 7D-continued

7th Embodiment

|  | Mode 1 | Mode 2 |  | Mode 1 | Mode 2 |
|---|---|---|---|---|---|
| \|Δ(f/ft)\| | 0.0309 |  | N | 5 |  |
| TL/ImgH | 1.69 |  |  |  |  |

8th Embodiment

Figure 15:
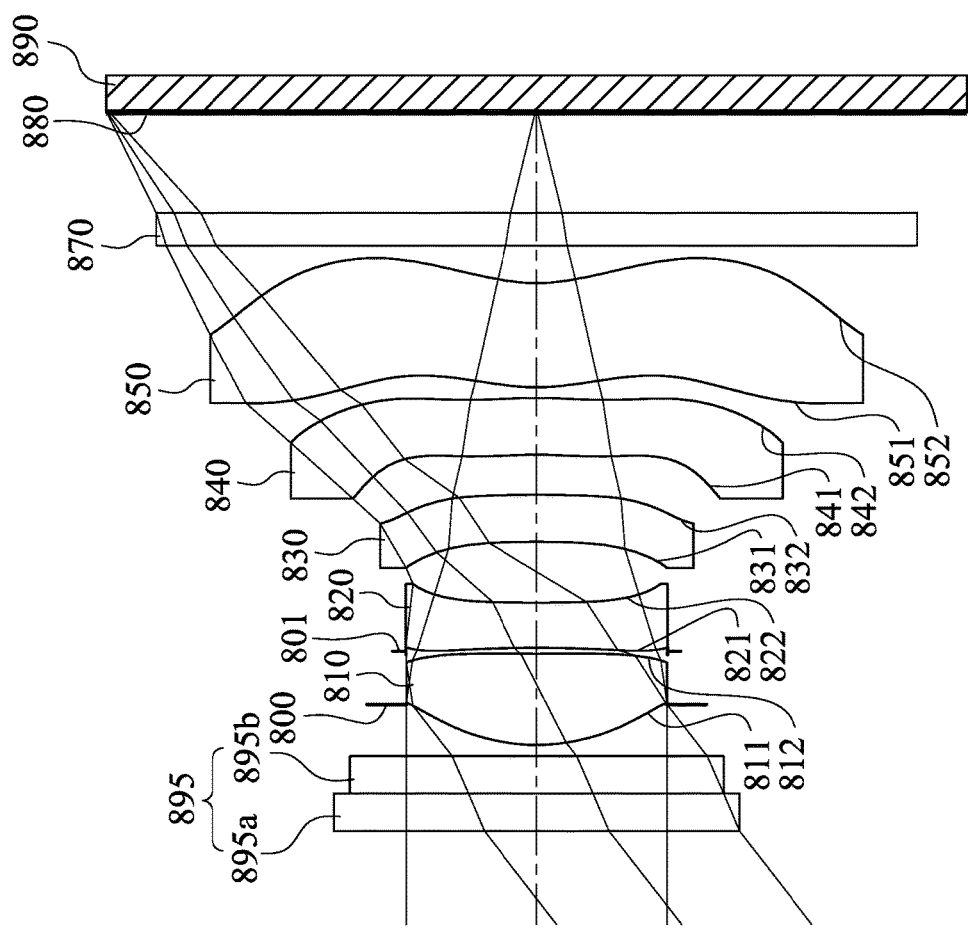
FIG. 15 is a schematic view of an imaging apparatus according to the 8th embodiment of the present disclosure.
Figure 16A:
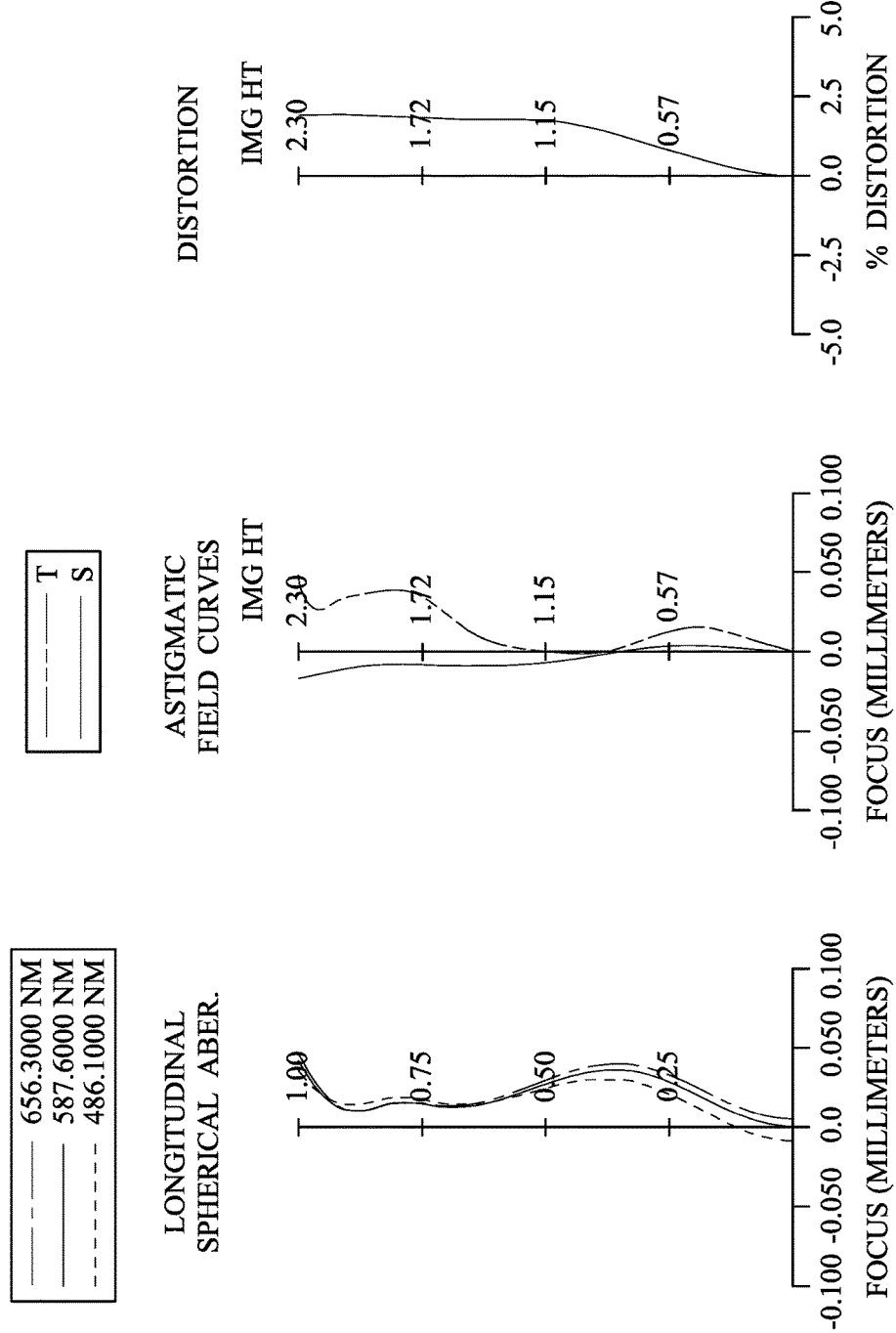
FIG. 16A shows spherical aberration curves, astigmatic field curves and a distortion curve of Mode 1 of the imaging apparatus according to the 8th embodiment.
Figure 16B:
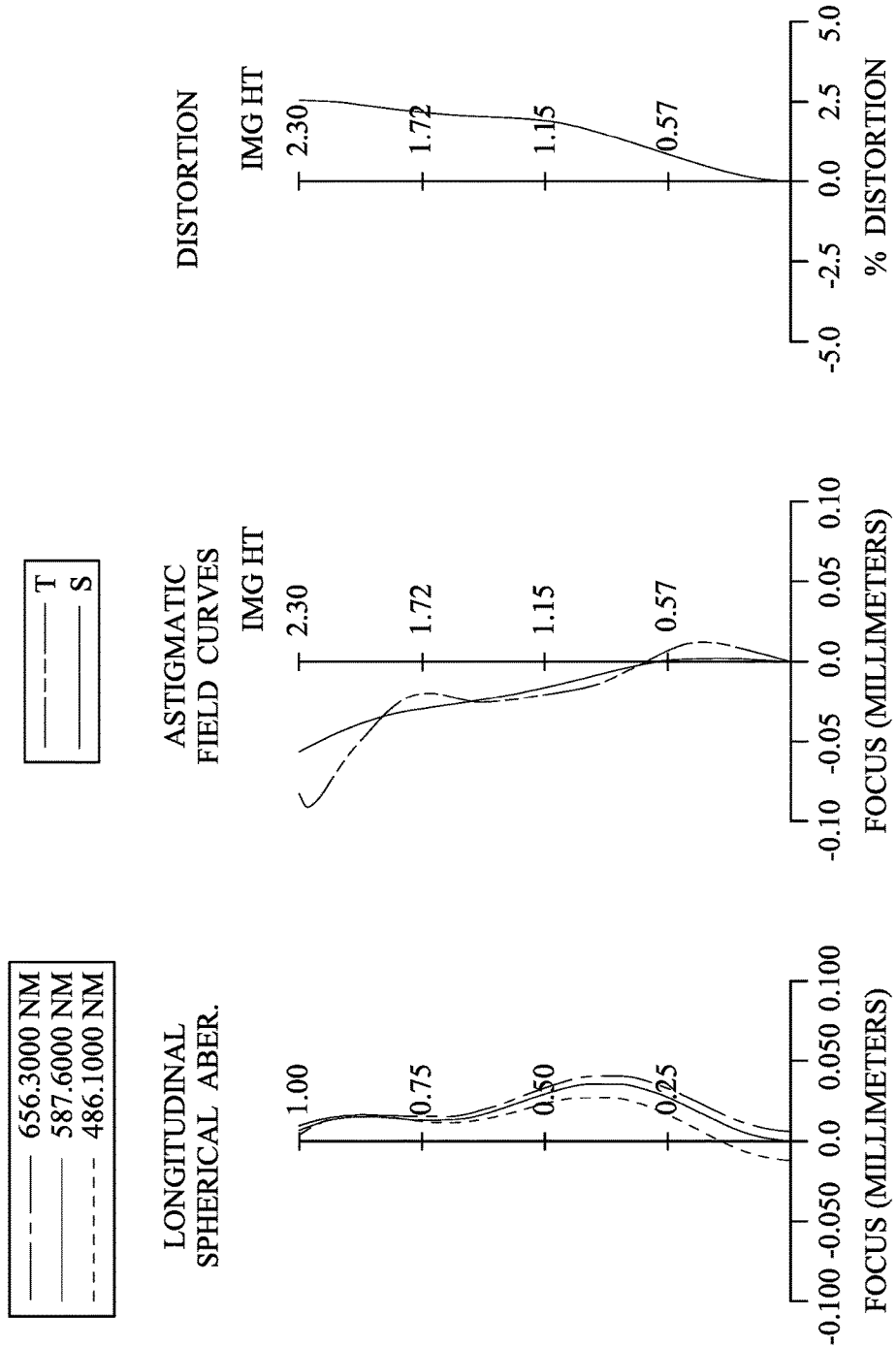
FIG. 16B shows spherical aberration curves, astigmatic field curves and a distortion curve of Mode 2 of the imaging apparatus according to the 8th embodiment.

FIG. 15 is a schematic view of an imaging apparatus according to the 8th embodiment of the present disclosure. FIG. 16A shows spherical aberration curves, astigmatic field curves and a distortion curve of Mode 1 of the imaging apparatus according to the 8th embodiment, and FIG. 16B shows spherical aberration curves, astigmatic field curves and a distortion curve of Mode 2 of the imaging apparatus according to the 8th embodiment, wherein Mode 1 and Mode 2 are two modes of the imaging apparatus at two different focusing conditions, and the detailed conditions are shown in Table 8C below. In FIG. 15, the imaging apparatus includes an image capturing lens assembly (its reference numeral is omitted) and an image sensor 890. The image capturing lens assembly includes, in order from an object side to an image side, a focus tunable component 895, an aperture stop 800, a first lens element 810, a stop 801, a second lens element 820, a third lens element 830, a fourth lens element 840, a fifth lens element 850, a filter 870 and an image surface 880, and the image sensor 890 is disposed on the image surface 880 of the image capturing lens assembly, wherein the image capturing lens assembly includes the focus tunable component 895 and an imaging lens system (its reference numeral is omitted), and the imaging lens system includes the five lens elements (810, 820, 830, 840, 850) without additional one or more lens elements inserted between the first lens element 810 and the fifth lens element 850.

The first lens element 810 with positive refractive power has an object-side surface 811 being convex and an image-side surface 812 being concave. The first lens element 810 is made of a plastic material, and has the object-side surface 811 and the image-side surface 812 being both aspheric.

The second lens element 820 with negative refractive power has an object-side surface 821 being concave and an image-side surface 822 being concave. The second lens element 820 is made of a plastic material, and has the object-side surface 821 and the image-side surface 822 being both aspheric.

The third lens element 830 with negative refractive power has an object-side surface 831 being concave and an image-side surface 832 being convex. The third lens element 830 is made of a plastic material, and has the object-side surface 831 and the image-side surface 832 being both aspheric.

The fourth lens element 840 with negative refractive power has an object-side surface 841 being concave and an image-side surface 842 being convex. The fourth lens element 840 is made of a plastic material, and has the object-side surface 841 and the image-side surface 842 being both aspheric.

The fifth lens element 850 with negative refractive power has an object-side surface 851 being convex and an image-side surface 852 being concave. The fifth lens element 850 is made of a plastic material, and has the object-side surface 851 and the image-side surface 852 being both aspheric. Furthermore, each of the object-side surface 851 and the image-side surface 852 of the fifth lens element 850 includes at least one inflection point, and each of the object-side surface 851 and the image-side surface 852 of the fifth lens element 850 includes at least one critical point.

The filter 870 is made of a glass material and located between the fifth lens element 850 and the image surface 880, and will not affect the focal length of the image capturing lens assembly.

Furthermore, according to the 8th embodiment, the focus tunable component 895 is a liquid lens set, which include a flexible film 895a and a glass base 895b, and a liquid material is disposed therebetween. The flexible film 895a is a polymer material.

The detailed optical data of the 8th embodiment are shown in Table 8A and the aspheric surface data are shown in Table 8B below.

TABLE 8A

8th Embodiment

| Surface # |  | Curvature Radius | Thickness | Material | Index | Abbe # | Focal Length |
|---|---|---|---|---|---|---|---|
| 0 | Object | Plano | Obj. |  |  |  |  |
| 1 | Focus tunable | Rt | 0.200 | Polymer | 1.565 | 20.4 | ft |
| 2 | component | Plano | 0.200 | Glass | 1.532 | 48.8 |  |
| 3 |  | Plano | 0.277 |  |  |  |  |
| 4 | Ape. Stop | Plano | −0.217 |  |  |  |  |
| 5 | Lens 1 | 1.062 ASP | 0.488 | Plastic | 1.544 | 55.9 | 2.05 |
| 6 |  | 19.089 ASP | 0.015 |  |  |  |  |
| 7 | Stop | Plano | 0.020 |  |  |  |  |
| 8 | Lens 2 | −6.974 ASP | 0.240 | Plastic | 1.640 | 23.3 | −5.92 |
| 9 |  | 8.386 ASP | 0.326 |  |  |  |  |
| 10 | Lens 3 | −6.834 ASP | 0.251 | Plastic | 1.640 | 23.3 | −52.93 |
| 11 |  | −8.685 ASP | 0.215 |  |  |  |  |
| 12 | Lens 4 | −2.326 ASP | 0.303 | Plastic | 1.640 | 23.3 | −20.96 |
| 13 |  | −2.957 ASP | 0.058 |  |  |  |  |
| 14 | Lens 5 | 1.258 ASP | 0.560 | Plastic | 1.544 | 55.9 | −33.77 |
| 15 |  | 0.993 ASP | 0.200 |  |  |  |  |
| 16 | Filter | Plano | 0.175 | Glass | 1.517 | 64.2 | — |

TABLE 8A-continued

8th Embodiment

| Surface # | | Curvature Radius | Thickness | Material | Index | Abbe # | Focal Length |
|---|---|---|---|---|---|---|---|
| 17 | | Plano | Imd. | | | | |
| 18 | Image | Plano | — | | | | |

Reference wavelength is 587.6 nm.
Effective radius of stop on surface 7 is 0.700 mm.

TABLE 8B

Aspheric Coefficients

| Surface # | 5 | 6 | 8 | 9 | 10 |
|---|---|---|---|---|---|
| k = | −2.7978E−03 | −8.7175E+01 | −2.3937E+01 | −9.9387E+00 | −5.4393E+01 |
| A4 = | −7.8088E−02 | −1.3854E−01 | 3.5458E−04 | 1.2565E−01 | −4.6070E−01 |
| A6 = | 4.4731E−01 | −1.9481E+00 | −1.2474E+00 | 9.5476E−01 | 1.9359E+00 |
| A8 = | −2.2736E+00 | 1.3600E+01 | 1.2382E+01 | −4.0516E+00 | −2.4836E+01 |
| A10 = | 4.5531E+00 | −4.2650E+01 | −4.1981E+01 | 1.7684E+01 | 1.4023E+02 |
| A12 = | −4.8369E+00 | 6.2103E+01 | 6.5883E+01 | −3.9598E+01 | −4.0984E+02 |
| A14 = | | −3.4875E+01 | −3.7984E+01 | 3.7083E+01 | 6.0744E+02 |
| A16 = | | | | | −3.6179E+02 |

| Surface # | 11 | 12 | 13 | 14 | 15 |
|---|---|---|---|---|---|
| k = | −9.1110E+01 | −4.3040E+01 | −1.0686E+01 | −4.9330E+00 | −6.0279E+00 |
| A4 = | 1.3880E−01 | 1.4143E+00 | 9.3733E−01 | −5.8191E−01 | −2.9119E−01 |
| A6 = | −2.0375E+00 | −5.3184E+00 | −2.1931E+00 | 4.3657E−01 | 2.4057E−01 |
| A8 = | 3.0515E−01 | 1.0679E+01 | 2.4990E+00 | −1.9414E−01 | −1.9263E−01 |
| A10 = | 1.6128E+01 | −16159E+01 | −1.7656E+00 | 9.5180E−02 | 1.1117E−01 |
| A12 = | −4.3970E+01 | 1.6871E+01 | 7.8271E−01 | −4.4717E−02 | −4.0634E−02 |
| A14 = | 4.9701E+01 | −1.0610E+01 | −1.9661E−01 | 1.2032E−02 | 8.1638E−03 |
| A16 = | −2.0652E+01 | 2.9779E+00 | 2.0406E−02 | −1.2746E−03 | −6.6844E−04 |

In the 8th embodiment, the equation of the aspheric surface profiles of the aforementioned lens elements is the same as the equation of the 1st embodiment. Also, the definitions of these parameters shown in the following Table 8C and Table 8D are the same as those stated in the 1st embodiment and the 7th embodiment with corresponding values for the 8th embodiment, so an explanation in this regard will not be provided again.

Moreover, in the 8th embodiment, the values of the parameters under Mode 1 and Mode 2 are shown in Tables 8C and 8D below.

TABLE 8C

8th Embodiment

| | Mode 1 | Mode 2 |
|---|---|---|
| Obj. [mm] | Infinity | 100.000 |
| ft [mm] | Infinity | 100.89 |
| Rt [mm] | Infinity | 57.000 |
| CTt [mm] | 0.400 | 0.400 |
| Dstr [mm] | 0.277 | 0.277 |
| Imd. [mm] | 0.538 | 0.538 |

TABLE 8D

8th Embodiment

| | Mode 1 | Mode 2 | | Mode 1 | Mode 2 |
|---|---|---|---|---|---|
| f [mm] | 2.89 | 2.79 | TL/|Δft| | 0.000 | |
| Fno. | 2.07 | 2.16 | TL/tan(HFOV) | 4.96 | 5.01 |
| HFOV [deg.] | 37.8 | 37.5 | BL/f | 0.32 | 0.33 |
| tan(HFOV) | 0.78 | 0.77 | Ycx/f, x = 1 | 0.21 | 0.22 |
| Obj. [mm] | Infinity | 100.00 | Ycx/f, x = 2 | 0.30 | 0.31 |
| Dt1/CTt | 0.15 | 0.15 | |Dstr/Dstf| | 0.41 | 0.41 |
| CTt/TDi | 0.16 | 0.16 | Nmax | 1.640 | |
| (R1 + R2)/(R1 − R2) | −1.12 | −1.12 | CRA [deg.] | 33.5 | 33.5 |
| |fi| | 2.89 | | |(CRA − MRA)/CRA| | 0.22 | 0.22 |
| |ft| | Infinity | 100.89 | | 0.26 | 0.24 |
| |fi/ft| | 0.000 | 0.029 | |(CRH − MRH) × 10| | 0.04 | 0.19 |
| f/f1 | 1.41 | 1.36 | [mm] | 0.11 | 0.16 |
| |f/ft| | 0.000 | 0.028 | |DIST| | 1.92% | 2.56% |
| |Δ(f/ft)| | 0.0276 | | N | 5 | |
| TL/ImgH | 1.68 | | | | |

9th Embodiment

Figure 21A:
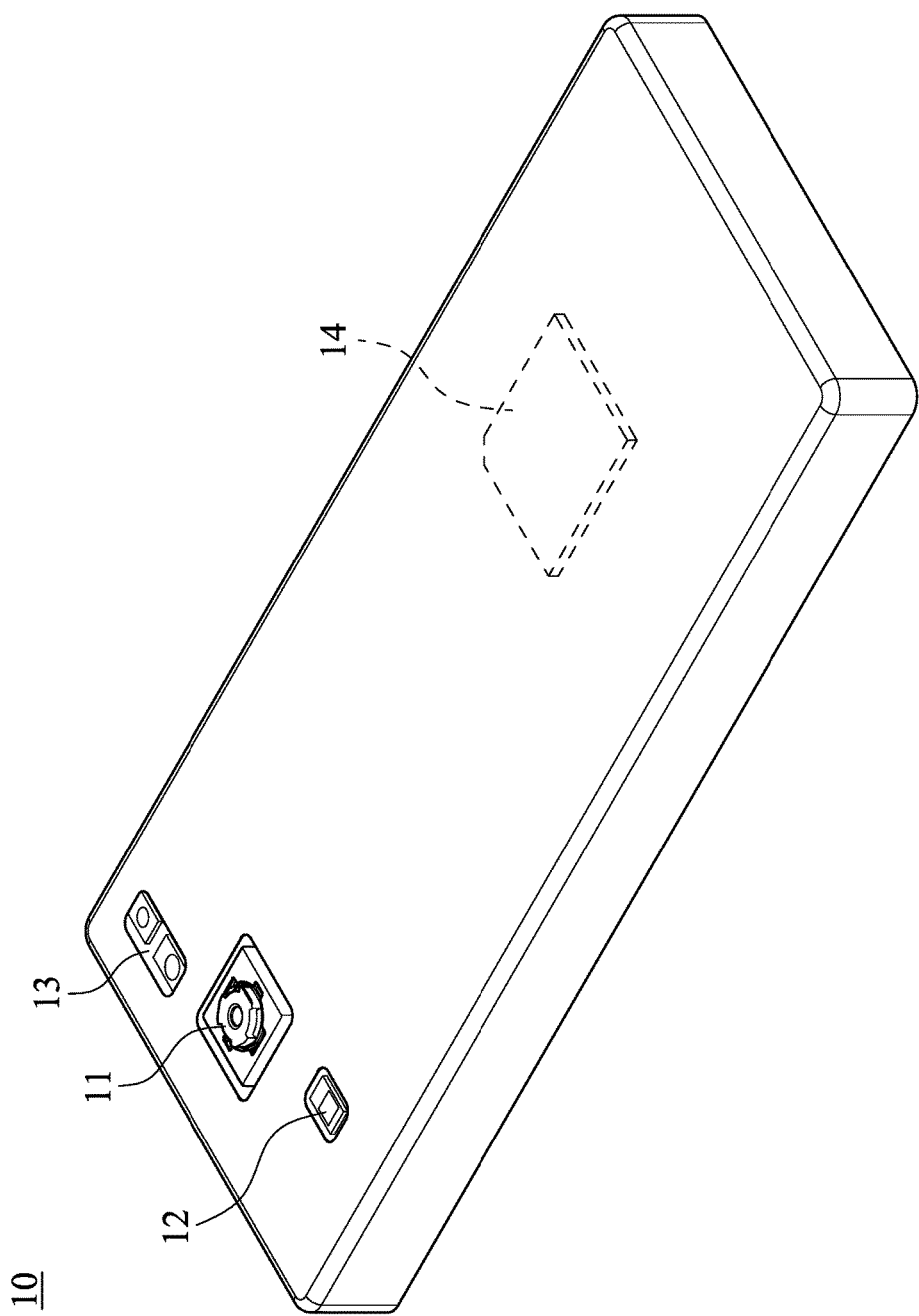
FIG. 21A is a schematic view of one side of an electronic device according to the 9th embodiment of the present disclosure.
Figure 21B:
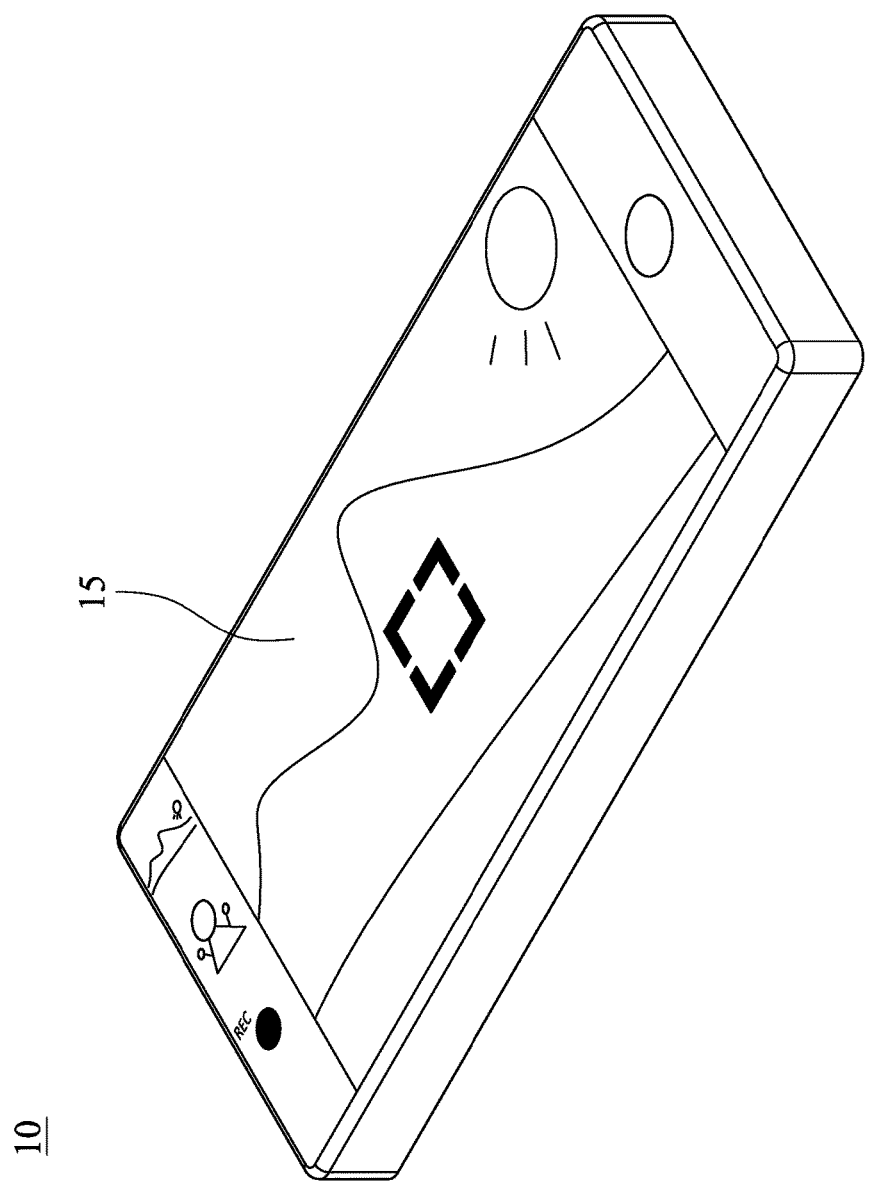
FIG. 21B is a schematic view of another side of the electronic device of FIG. 21A.
Figure 21C:
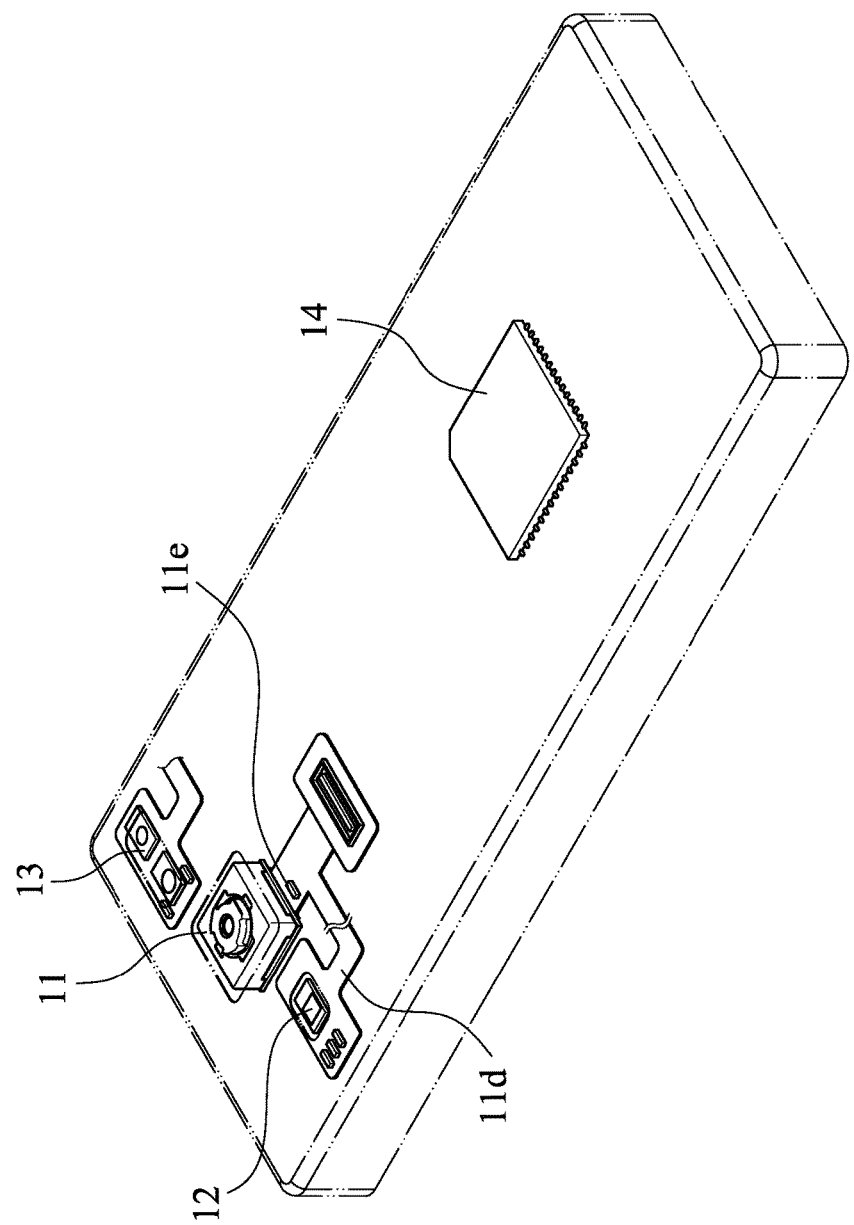
FIG. 21C is a system schematic view of the electronic device of FIG. 21A.

FIG. 21A is a schematic view of one side of an electronic device 10 according to the 9th embodiment of the present disclosure, FIG. 21B is a schematic view of another side of the electronic device 10 of FIG. 21A, FIG. 21C is a system schematic view of the electronic device 10 of FIG. 21A, and FIG. 21D is a system schematic view of an imaging apparatus 11 of FIG. 21A.

In detail, the electronic device 10 according to the 9th embodiment is a smartphone, wherein the electronic device 10 includes the imaging apparatus 11, a flash module 12, a focusing assisting module 13, an image signal processor 14 and a user interface 15. When the user captures images of an imaged object via the user interface 15, the electronic device 10 focuses and generates an image via the imaging apparatus 11 while compensating for low illumination via the flash module 12 when necessary. Then, the electronic device 10 quickly focuses on the imaged object according to its object distance information provided by the focusing assisting module 13, and optimizes the image via the image signal processor 14 (ISP) and the image software processor (not shown in drawings). Thus, the image quality can be further enhanced. The focusing assisting module 13 can adopt infrared or laser for obtaining quick focusing, and the user interface 15 can utilize a touch screen or a physical button for capturing and processing the image with various functions of the image processing software.

The imaging apparatus 11 is a camera module, the imaging apparatus 11 includes an imaging lens group 11a, a driving apparatus 11b and an image sensor 11c, wherein the imaging lens group 11a includes the image capturing lens assembly of the 1st embodiment and a lens barrel (not shown in drawings) for carrying the image capturing lens assembly. The imaging apparatus 11 can focus light from the imaged object via the imaging lens group 11a, perform image focusing by the driving apparatus 11b, and generate an image on the image sensor 11c, and the imaging information can be transmitted by a conducting wire circuit 11d.

The driving apparatus 11b can be an auto-focus module, which can be driven by driving systems, such as voice coil motors (VCM), micro electro-mechanical systems (MEMS), piezoelectric systems, and shape memory alloys etc. The image capturing lens assembly can obtain a favorable imaging position by the driving apparatus 11b so as to capture clear images when the imaged object is disposed at different object distances.

The imaging apparatus 11 can include the image sensor 11c located on the image surface of the image capturing lens assembly, such as CMOS and CCD, with superior photosensitivity and low noise. Thus, it is favorable for providing realistic images with high definition image quality thereof.

Moreover, the imaging apparatus 11 can further include an image stabilization module 11e, which can be a kinetic energy sensor, such as an accelerometer, a gyroscope, and a Hall Effect sensor. In the 9th embodiment, the image stabilization module 11e is a gyroscope, but is not limited thereto. Therefore, the variation of different axial directions of the image capturing lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

10th Embodiment

Figure 22:
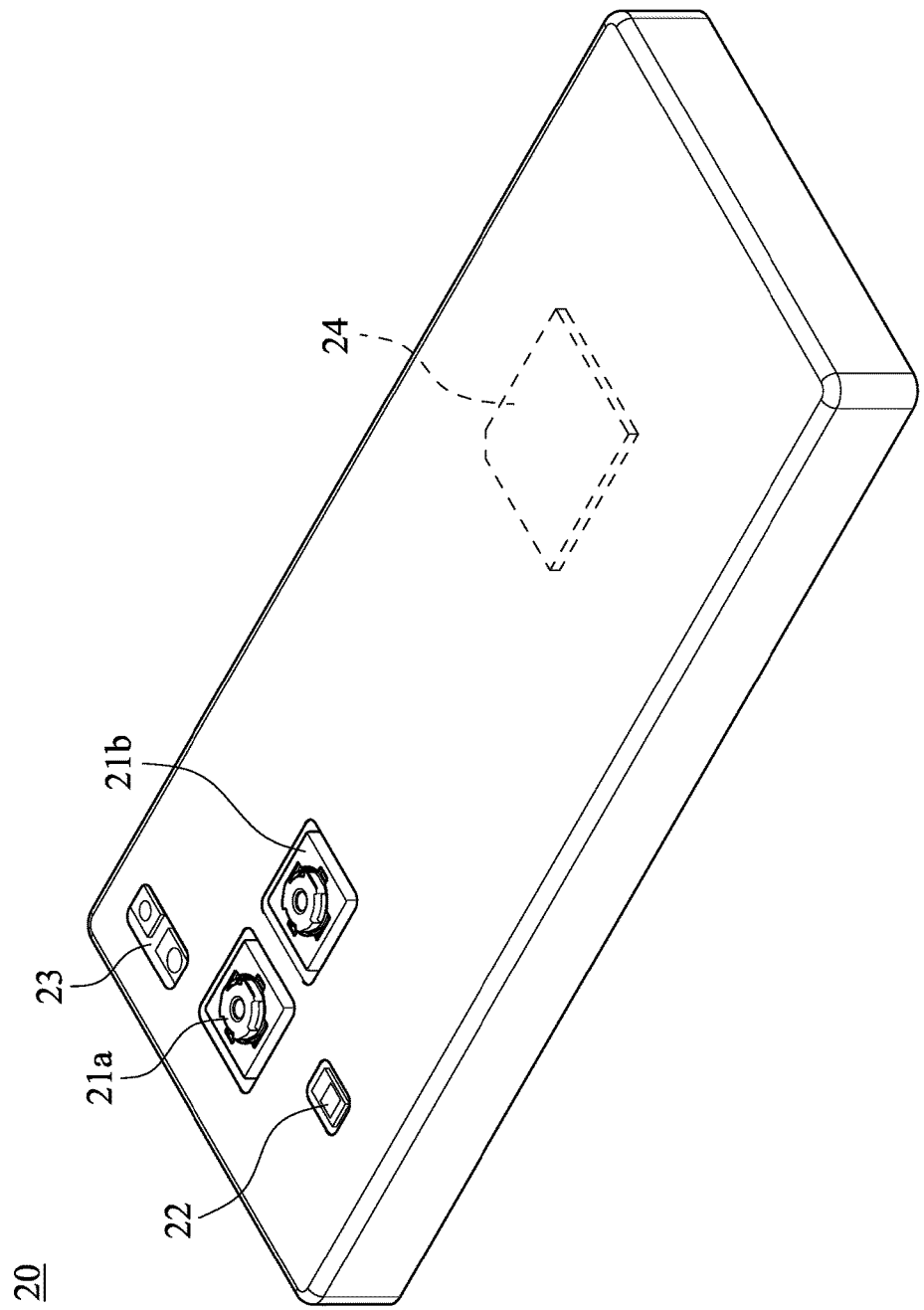
FIG. 22 is a schematic view of an electronic device according to the 10th embodiment of the present disclosure.

FIG. 22 is a schematic view of an electronic device 20 according to the 10th embodiment of the present disclosure.

In FIG. 22, the electronic device 20 according to the 10th embodiment is a smartphone, wherein the electronic device 20 includes two imaging apparatuses 21a, 21b, a flash module 22, a focusing assisting module 23 and an image signal processor 24, wherein the corresponding elements of the 10th and 9th embodiments are the same, and will not describe again herein. In the 10th embodiment, the electronic device 20 includes two imaging apparatuses 21a, 21b, that is, a dual lens arrangements, so that it is favorable for obtaining the quick focusing and enhancing the image quality.

11th Embodiment

Figure 23:
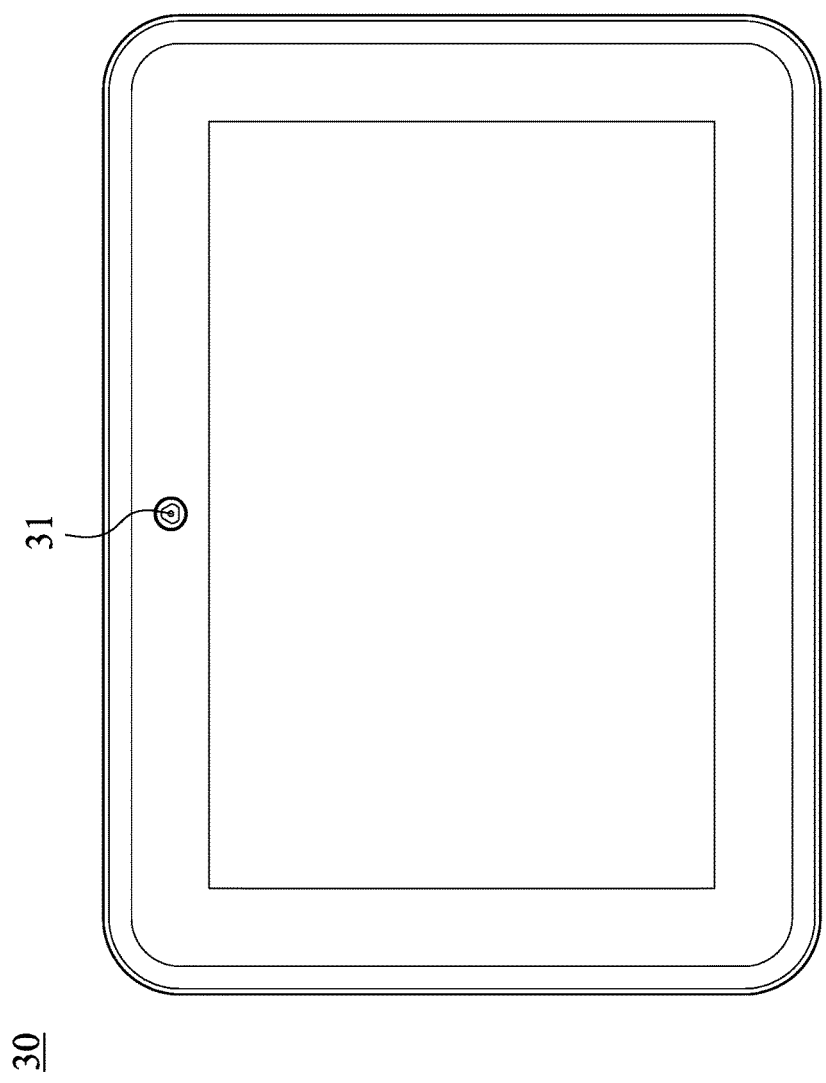
FIG. 23 is a schematic view of an electronic device according to the 11th embodiment of the present disclosure.

FIG. 23 is a schematic view of an electronic device 30 according to the 11th embodiment of the present disclosure. The electronic device 30 of the 11th embodiment is a tablet personal computer, wherein the electronic device 30 includes an imaging apparatus 31, wherein the imaging apparatus 31 is the same as stated in the 9th embodiment, and will not describe again herein.

12th Embodiment

Figure 24:
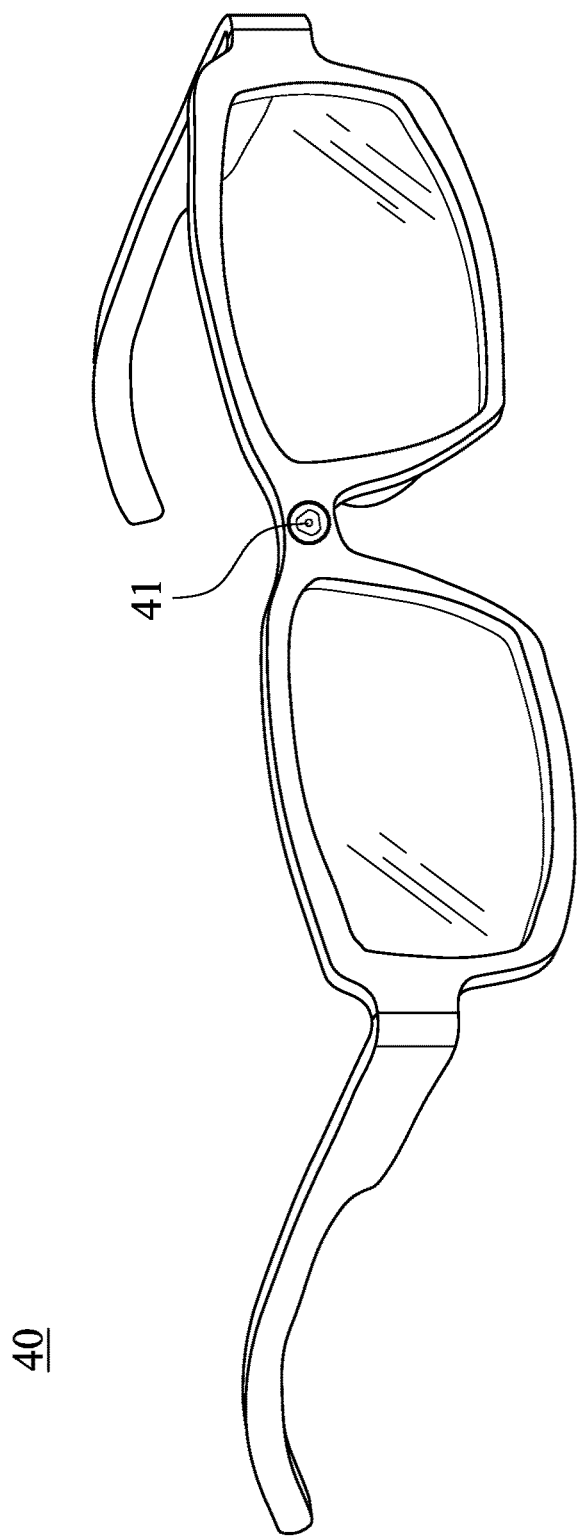
FIG. 24 is a schematic view of an electronic device according to the 12th embodiment of the present disclosure.

FIG. 24 is a schematic view of an electronic device 40 according to the 12th embodiment of the present disclosure. The electronic device 40 of the 12th embodiment is a wearable device, wherein the electronic device 40 includes an imaging apparatus 41, wherein the imaging apparatus 41 is the same as stated in the 9th embodiment, and will not describe again herein.

The foregoing description, for purpose of explanation, has been described with reference to specific embodiments. It is to be noted that Tables 1A-8D show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens assembly, comprising:
    a focus tunable component; and
    an imaging lens system comprising a plurality of lens elements, wherein each of the lens elements has an object-side surface facing towards an object side of the imaging lens system and an image-side surface facing towards an image side of the imaging lens system, and at least one surface of at least one of the lens elements comprises at least one inflection point;
    wherein a focal length of the image capturing lens assembly is f, an f-number of the image capturing lens assembly is Fno, a focal length of the focus tunable component is ft, a variation of a refractive power of the focus tunable component is $|\Delta(f/ft)|$, a focal length of the imaging lens system is fi, and the following conditions are satisfied:

$|fi|<|ft|;$ $0<|\Delta(f/ft)|<0.18;$ and $1.20<Fno<2.60.$

2. The image capturing lens assembly of claim 1, wherein the focus tunable component is located on the object side of the imaging lens system.

3. The image capturing lens assembly of claim 2, wherein the focal length of the focus tunable component is ft, the focal length of the imaging lens system is fi, and the following condition is satisfied:

$|fi/ft|<0.10.$

4. The image capturing lens assembly of claim 2, wherein a curvature radius of the object-side surface of a lens element closest to the object side of the imaging lens system is R1, a curvature radius of the image-side surface of the lens element closest to the object side of the imaging lens system is R2, and the following condition is satisfied:

$-3.0<(R1+R2)/(R1-R2)<0.$

5. The image capturing lens assembly of claim 2, wherein the focal length of the image capturing lens assembly is f, the focal length of the focus tunable component is ft, the variation of the refractive power of the focus tunable component is $|\Delta(f/ft)|$, and the following condition is satisfied:

$0<|\Delta(f/ft)|<0.10.$

6. The image capturing lens assembly of claim 2, further comprising:
an aperture stop located between the focus tunable component and the imaging lens system, wherein an axial distance between the aperture stop and a surface of the focus tunable component closest to an object side of the image capturing lens assembly is Dstf, an axial distance between the aperture stop and a surface of the focus tunable component closest to an image surface of the image capturing lens assembly is Dstr, and the following condition is satisfied:

$|Dstr/Dstf|<0.90.$

7. The image capturing lens assembly of claim 5, wherein an axial distance between the focus tunable component and a lens element of the imaging lens system closest to the object side thereof is Dt1, a central thickness of the focus tunable component is CTt, and the following condition is satisfied:

$0.05<Dt1/CTt<1.0.$

8. The image capturing lens assembly of claim 5, wherein an axial distance between a surface of the image capturing lens assembly which is closest to an object side thereof and an image surface is TL, half of a maximum field of view of the image capturing lens assembly is HFOV, and the following condition is satisfied:

$TL/\tan(HFOV)<6.50$ mm.

9. The image capturing lens assembly of claim 1, wherein at least one surface of a lens element of the imaging lens system closest to an image surface comprises at least one non-axial critical point, the focal length of the image capturing lens assembly is f, a vertical distance between the at least one non-axial critical point on the at least one surface of the lens element of the imaging lens system closest to the image surface and an optical axis is Ycx, and the following condition is satisfied:

$0.01<Ycx/f<1.50$, wherein $x=1$ or $2$.

10. The image capturing lens assembly of claim 1, wherein the focal length of the image capturing lens assembly is f, the focal length of the focus tunable component is ft, and the following condition is satisfied:

$|f/ft|<0.03.$

11. The image capturing lens assembly of claim 1, wherein an axial distance between a surface of the image capturing lens assembly closest to an object side thereof and an image surface is TL, the focal length of the focus tunable component is ft, a variation of the focal length of the focus tunable component is $|\Delta ft|$, and the following condition is satisfied:

$TL/|\Delta ft|<2.0.$

12. The image capturing lens assembly of claim 1, wherein a central thickness of the focus tunable component is CTt, an axial distance between the object-side surface of a lens element of the imaging lens system closest to an object side and the image-side surface of a lens element of the imaging lens system closest to an image surface is TDi, and the following condition is satisfied:

$0.01<CTt/TDi<0.45.$

13. The image capturing lens assembly of claim 1, wherein an axial distance between an imaged object and the image capturing lens assembly is Obj., and the following condition is satisfied:

$200$ mm$<$Obj.$<1800$ mm.

14. The image capturing lens assembly of claim 1, wherein the f-number of the image capturing lens assembly is Fno, and the following condition is satisfied:

$1.30<Fno<2.0.$

15. The image capturing lens assembly of claim 1, wherein the object-side surface and the image-side surface of each of the lens elements of the imaging lens system are aspheric, an axial distance between a surface of the image capturing lens assembly closest to an object side thereof and an image surface is TL, a maximum image height of the image capturing lens assembly is ImgH, and the following condition is satisfied:

$0.50<TL/ImgH<2.0.$

16. The image capturing lens assembly of claim 1, wherein half of a maximum field of view of the image capturing lens assembly is HFOV, and the following condition is satisfied:

$0.60<\tan(HFOV)<1.80.$

17. The image capturing lens assembly of claim 1, wherein an axial distance between an image-side surface of a lens element of the image capturing lens assembly closest to an image surface and the image surface is BL, the focal length of the image capturing lens assembly is f, and the following condition is satisfied:

$0.10<BL/f<0.50.$

18. The image capturing lens assembly of claim 1, wherein the focal length of the image capturing lens assembly is f, a focal length of a lens element of the imaging lens system closest to an object side thereof is f1, and the following condition is satisfied:

$0.50<f/f1<3.50.$

19. The image capturing lens assembly of claim 1, wherein an angle between a chief ray at a maximum image height position on an image surface of the image capturing lens assembly and a normal direction of the image surface in a paraxial region thereof is CRA, and the following condition is satisfied:

$30$ degrees$<CRA.$

20. The image capturing lens assembly of claim 1, wherein an optical distortion at a maximum image height position of the image capturing lens assembly is DIST, and the following condition is satisfied:

$$|DIST|<5\%.$$

21. The image capturing lens assembly of claim 1, wherein a vertical distance between a point at a maximum image height position on an image surface of the image capturing lens assembly in which a chief ray is incident and an optical axis is CRH, a vertical distance between a point at the maximum image height position on the image surface of the image capturing lens assembly in which a marginal ray on a meridional plane is incident and the optical axis is MRH, and the following condition is satisfied:

$$|(CRH-MRH)\times 10|<2.0 \text{ mm}.$$

22. The image capturing lens assembly of claim 1, wherein an angle between a chief ray at a maximum image height position on an image surface of the image capturing lens assembly and a normal direction of the image surface in a paraxial region thereof is CRA, an angle between a marginal ray on a meridional plane at the maximum image height position of the image capturing lens assembly and the normal direction of the image surface in the paraxial region thereof is MRA, and the following condition is satisfied:

$$0.01<|(CRA-MRA)/CRA|<0.80.$$

23. The image capturing lens assembly of claim 1, wherein at least one of the lens elements of the imaging lens system has an Abbe number smaller than 22.0.

24. The image capturing lens assembly of claim 1, wherein each of the lens elements of the imaging lens system is made of a plastic material, and a maximum value among all refractive indices of the lens elements of the imaging lens system is Nmax, and the following condition is satisfied:

$$N\text{max}<1.70.$$

25. The image capturing lens assembly of claim 1, wherein the object-side surface of a lens element of the imaging lens system closest to an object side thereof is convex, the image-side surface of a lens element of the imaging lens system closest to an image surface is concave.

26. The image capturing lens assembly of claim 1, wherein a total number of the lens elements of the imaging lens system is N, and the following condition is satisfied:

$$2\leq N\leq 7.$$

27. The image capturing lens assembly of claim 1, wherein the focus tunable component is a liquid lens set or a liquid crystal lens set.

28. The image capturing lens assembly of claim 1, further comprising:
   a mechanical member for controlling a range of light passing through the image capturing lens assembly.

29. An imaging apparatus, comprising:
   the image capturing lens assembly of claim 1; and
   an image sensor, wherein the image sensor is disposed on an image surface of the image capturing lens assembly.

30. An electronic device, comprising:
   the imaging apparatus of claim 29.

* * * * *